(12) United States Patent
Misaki

(10) Patent No.: US 12,111,555 B2
(45) Date of Patent: Oct. 8, 2024

(54) METHOD OF MANUFACTURING ACTIVE MATRIX SUBSTRATE AND LIQUID CRYSTAL DISPLAY DEVICE

(71) Applicant: Sharp Display Technology Corporation, Kameyama (JP)

(72) Inventor: Katsunori Misaki, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/136,275

(22) Filed: Apr. 18, 2023

(65) Prior Publication Data

US 2023/0367166 A1    Nov. 16, 2023

(30) Foreign Application Priority Data

May 11, 2022    (JP) .................................. 2022-078327

(51) Int. Cl.
G02F 1/1368    (2006.01)
G02F 1/1362    (2006.01)

(52) U.S. Cl.
CPC ...... *G02F 1/1368* (2013.01); *G02F 1/136209* (2013.01); *G02F 1/136222* (2021.01); *G02F 1/136227* (2013.01)

(58) Field of Classification Search
CPC ............. G02F 1/1368; G02F 1/136222; G02F 1/136209; G02F 1/136227

USPC ........................................................ 349/33
See application file for complete search history.

(56) References Cited

FOREIGN PATENT DOCUMENTS

JP          2017116821 A   *   6/2017

* cited by examiner

*Primary Examiner* — Michael H Caley
*Assistant Examiner* — William D Peterson
(74) *Attorney, Agent, or Firm* — ScienBiziP, P.C.

(57) ABSTRACT

A method of manufacturing an active matrix substrate includes forming multiple thin film transistors corresponding to multiple subpixels on a substrate; forming color filters provided with colored layers having predetermined colors disposed on the multiple thin film transistors, respectively, and having contact holes for electrical connection to the multiple thin film transistors, respectively; forming a first transparent electrode by forming a first transparent conductive film above the color filters and patterning the first transparent conductive film; forming an inorganic protection film made of an inorganic insulating film on the first transparent electrode; forming a second transparent conductive film on the inorganic protection film; forming antireflection layers on the second transparent conductive film, each of the antireflection layers formed by layering a metal layer and an inorganic insulating layer and overlapping a boundary portion between the colored layers; and forming a second transparent electrode by patterning the second transparent conductive film.

13 Claims, 50 Drawing Sheets

METHOD OF MANUFACTURING ACTIVE MATRIX SUBSTRATE AND LIQUID CRYSTAL DISPLAY DEVICE

CROSS-REFERENCE TO RELATED APPLICATIONS

This application claims the benefit of priority to Japanese Patent Application Number 2022-078327 filed on May 11, 2022. The entire contents of the above-identified application are hereby incorporated by reference.

BACKGROUND

Technical Field

The disclosure relates to a method of manufacturing an active matrix substrate and a liquid crystal display device.

In recent years, a color filter on array (hereinafter also referred to as COA) structure is often used in liquid crystal display devices, in which color filters are provided on an active matrix substrate (array substrate) and alignment with a counter substrate is not required.

For example, JP 2017-116821 A discloses a liquid crystal display device in which pixel electrodes and a common electrode are provided on a substrate having a COA structure and which uses a fringe field switching (FFS) mode, which is one transverse electrical field driving method.

SUMMARY

In a liquid crystal display device including an active matrix substrate having a COA structure in which pixel electrodes (first transparent electrodes), an inorganic protection film made of an inorganic insulating film, and a common electrode (second transparent electrode) with a notch or the like for liquid crystal alignment are provided in order, antireflection layers, each of which includes a metal layer and is disposed above a boundary of colored layers of color filters, are formed on the second transparent electrode in some cases. In this case, when the antireflection layers are formed by dry etching, the inorganic protection film exposed out of the second transparent electrode is etched. Thus, steps may be formed in the inorganic protection film at edges of the second transparent electrode. When this happens, light leakage due to alignment disorder of the liquid crystal layer is likely to occur due to the steps, thereby degrading optical characteristics of the liquid crystal display device.

The disclosure has been made in view of this point, and an object according to the disclosure is to suppress etching of the inorganic protection film exposed out of the second transparent electrode when forming the antireflection layer by dry etching.

According to the disclosure in order to achieve the object, a method of manufacturing an active matrix substrate includes: forming multiple thin film transistors corresponding to multiple subpixels on a base substrate; forming color filters provided with colored layers having predetermined colors disposed on the multiple thin film transistors, respectively, and having contact holes for electrical connection to the multiple thin film transistors, respectively; forming a first transparent electrode by forming a first transparent conductive film above the color filters and patterning the first transparent conductive film; forming an inorganic protection film made of an inorganic insulating film on the first transparent electrode; forming a second transparent conductive film on the inorganic protection film; forming antireflection layers on the second transparent conductive film, each of the antireflection layers formed by layering a metal layer and an inorganic insulating layer and overlapping a boundary portion between the colored layers; and forming a second transparent electrode by patterning the second transparent conductive film.

According to the disclosure, a liquid crystal display device includes an active matrix substrate provided with multiple thin film transistors corresponding to multiple subpixels, a counter substrate facing the active matrix substrate, and a liquid crystal layer provided between the active matrix substrate and the counter substrate, in which the active matrix substrate includes color filters with colored layers having predetermined colors disposed on the multiple thin film transistors, respectively, antireflection layers overlapping boundary portions of the colored layers, each of the antireflection layers including a metal layer and an inorganic insulating layer layered, a first transparent electrode, a second transparent electrode, and a third transparent electrode provided in order above the color filters, and an inorganic protection film made of an inorganic insulating film provided between the first transparent electrode and the second transparent electrode, the antireflection layers are provided on the second transparent electrode, and the third transparent electrode is in contact with the second transparent electrode at least in the multiple subpixels.

According to the disclosure, etching of the inorganic protection film exposed out of the second transparent electrode when forming the antireflection layers by dry etching can be suppressed.

BRIEF DESCRIPTION OF DRAWINGS

The disclosure will be described with reference to the accompanying drawings, wherein like numbers reference like elements.

FIG. 2 is a cross-sectional view of the active matrix substrate taken along line II-II in

FIG. 1.

DESCRIPTION OF EMBODIMENTS

Embodiments of a technique according to the disclosure will be described below in detail with reference to the drawings. Note that the technique according to the disclosure is not limited to the embodiments to be described below.

First Embodiment

Figure 1:
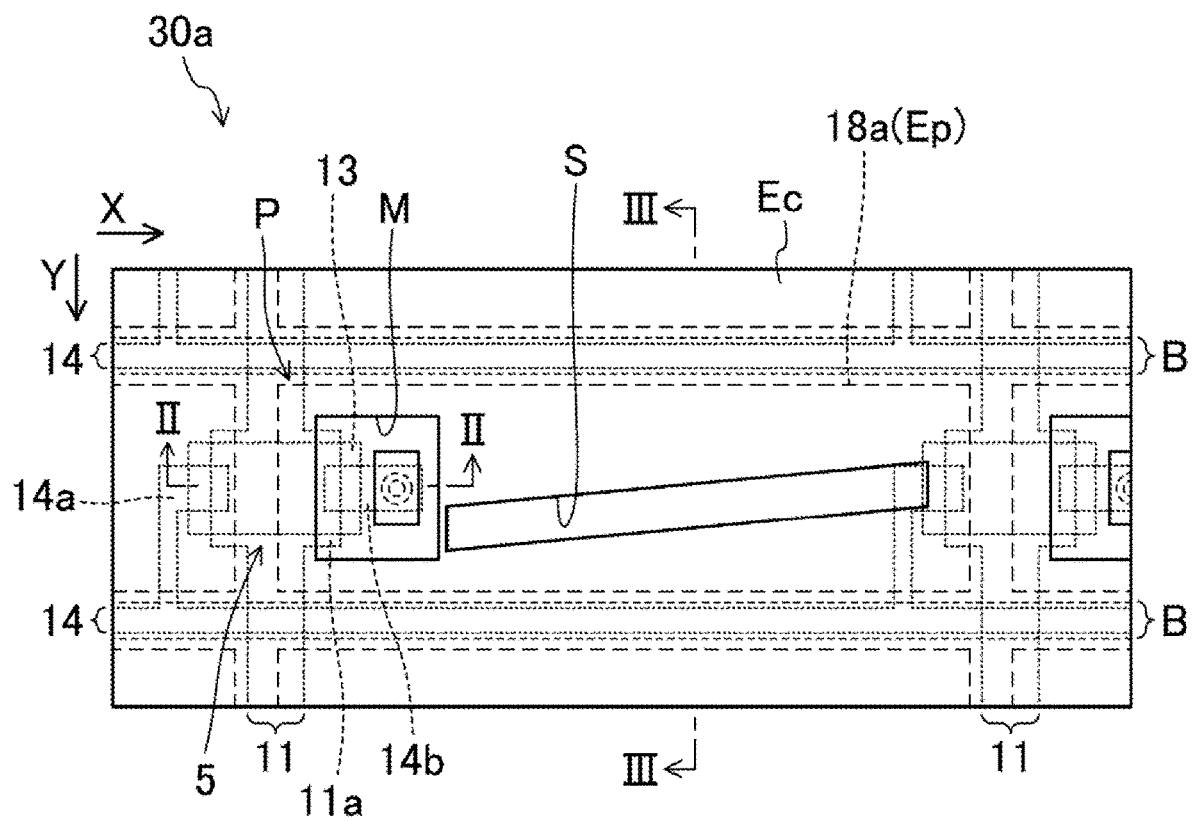
FIG. 1 is a plan view of an active matrix substrate that is a component of a liquid crystal display device according to a first embodiment of the disclosure.
Figure 2:
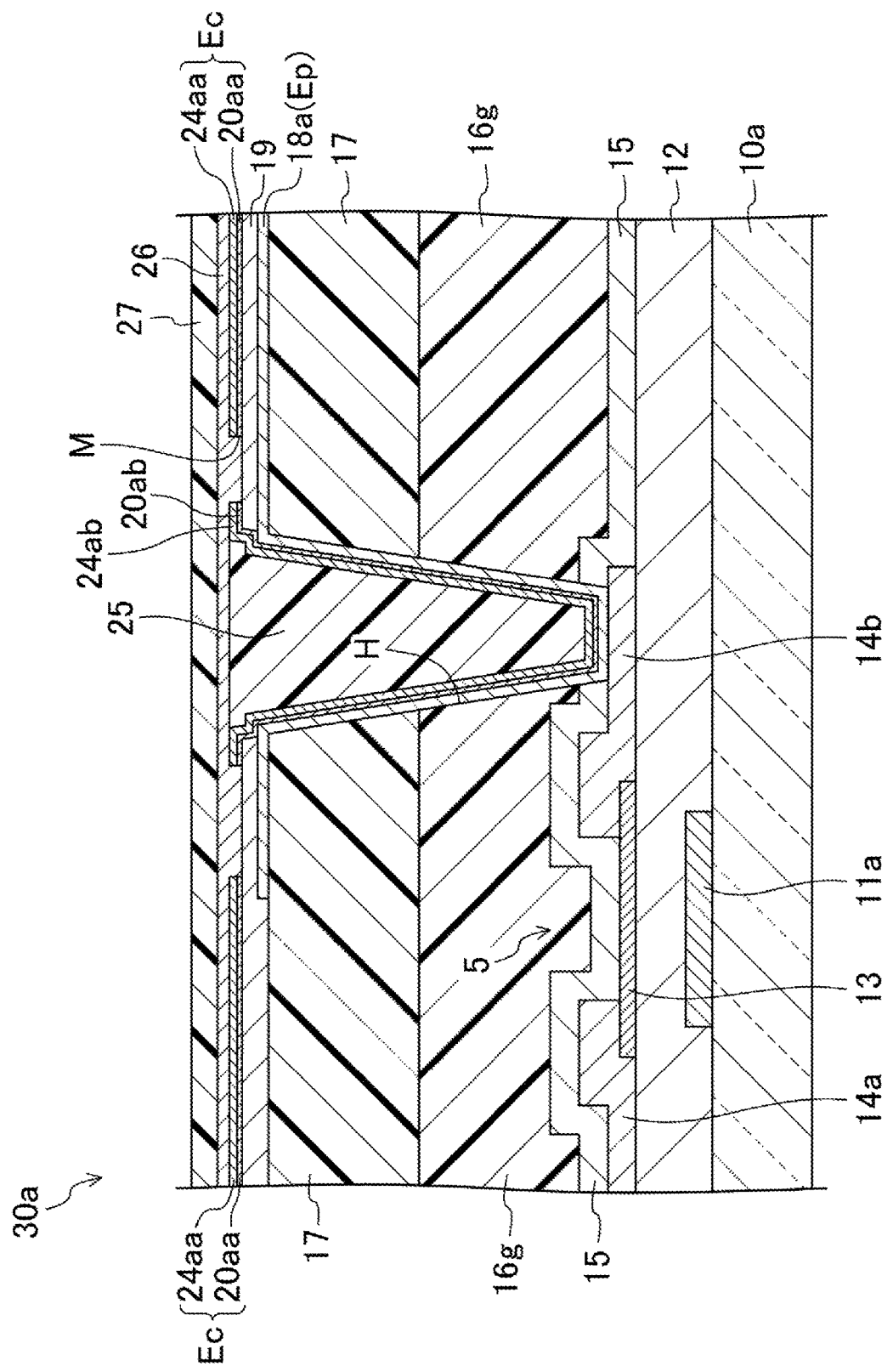
Figure 3:
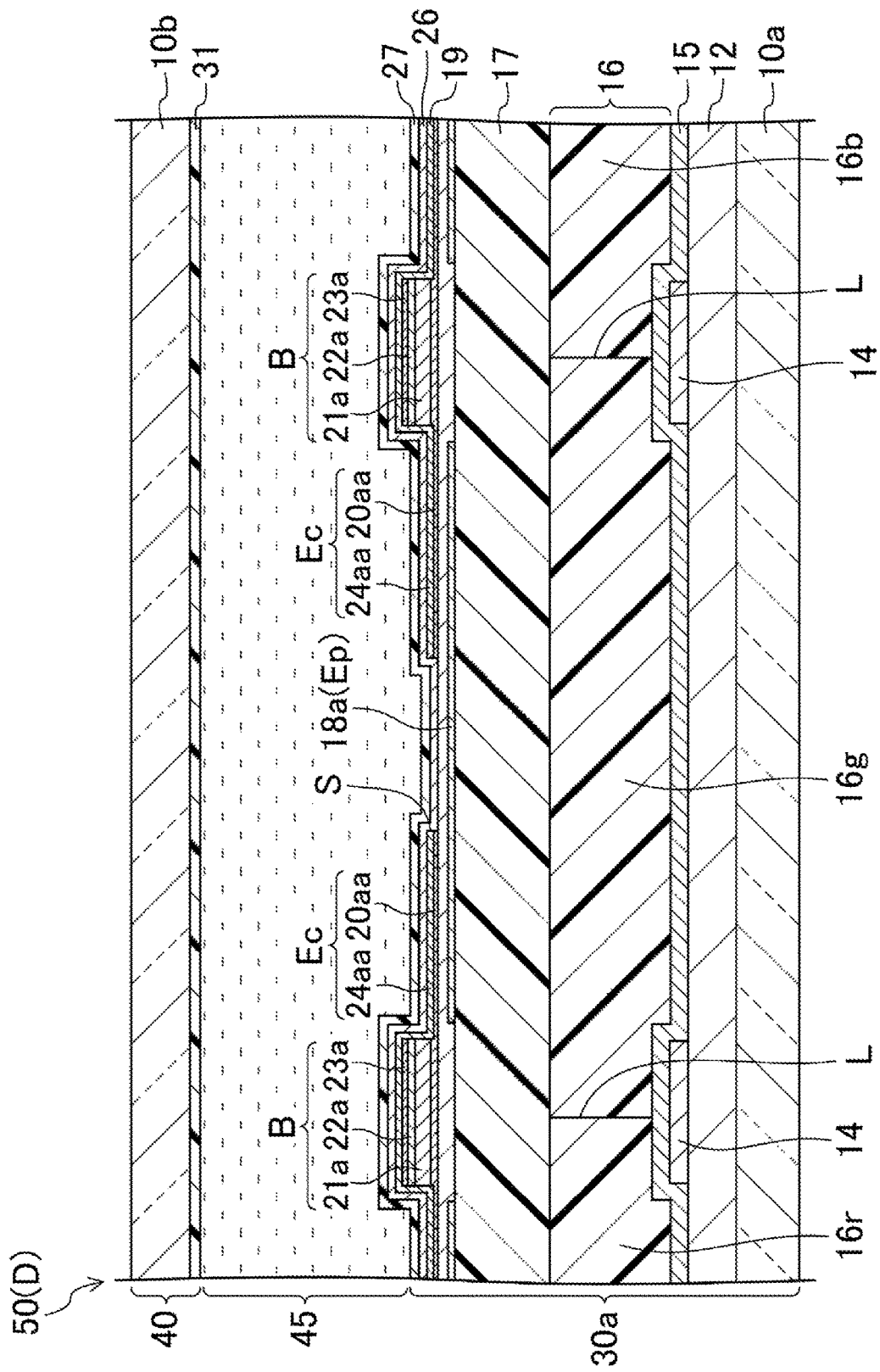
FIG. 3 is a cross-sectional view of the active matrix substrate and the liquid crystal display device including the active matrix substrate taken along line in FIG. 1.

FIGS. 1 to 28 illustrate a method of manufacturing an active matrix substrate and a liquid crystal display device according to a first embodiment of the disclosure. FIG. 1 is a plan view of an active matrix substrate $30a$ that is a component of the liquid crystal display device according to the present embodiment. FIG. 2 is a cross-sectional view of the active matrix substrate $30a$ taken along line II-II in FIG. 1. FIG. 3 is a cross-sectional view of the active matrix substrate $30a$ and a liquid crystal display device 50 including the active matrix substrate $30a$ taken along line in FIG. 1.

As illustrated in FIG. 3, the liquid crystal display device 50 includes the active matrix substrate $30a$ having a COA structure, a counter substrate 40 provided to face the active matrix substrate $30a$, and a liquid crystal layer 45 provided between the active matrix substrate $30a$ and the counter substrate 40. In the liquid crystal display device 50, multiple subpixels P (see FIG. 1) are arranged in a matrix in a display region D. In the display region D, as illustrated in FIG. 3, subpixels P for gray scale display of red with red layers $16r$, subpixels P for gray scale display of green with green layers 16g, and subpixels P for gray scale display of blue with blue layers 16b are disposed adjacent to one another. Note that in the display region D, one pixel is constituted by three adjacent subpixels P for displaying red, green, and blue.

As illustrated in FIG. 2, the active matrix substrate 30a includes a base substrate 10a such as a glass substrate, multiple thin film transistors (hereinafter also referred to as TFTs) 5 provided on the base substrate 10a corresponding to the multiple subpixels P, color filters 16 provided on the TFTs 5, respectively, an organic protection film 17 provided on the color filters 16, multiple pixel electrodes Ep provided on the organic protection film 17, an inorganic protection film 19 provided on the pixel electrodes Ep, a common electrode Ec provided on the inorganic protection film 19, a surface protection film 26 provided on the common electrode Ec, and an alignment film 27 provided on the surface protection film 26. As illustrated in FIG. 1, the active matrix substrate 30a includes, on the base substrate 10a in the display region D, multiple gate lines 11 extending parallel to each other in the Y direction in the figure, and multiple source lines 14 extending parallel to each other in the X direction in the figure so as to intersect the gate lines 11 with a gate insulating film 12 interposed therebetween.

As illustrated in FIG. 2, the TFT 5 includes a gate electrode 11a provided on the base substrate 10a, the gate insulating film 12 provided to cover the gate electrode 11a, a semiconductor layer 13 provided in an island shape on the gate insulating film 12 so as to overlap the gate electrode 11a, and a source electrode 14a and a drain electrode 14b provided on the semiconductor layer 13 so as to be separated from each other. The TFT 5 is provided for each of intersections of the gate lines 11 and the source lines 14, that is, for each subpixel P. The gate electrode 11a is a wide portion of the gate line 11, as illustrated in FIG. 1. The semiconductor layer 13 includes, for example, an intrinsic amorphous silicon layer provided on the gate insulating film 12 side, and a pair of $n^+$ amorphous silicon layers provided on the intrinsic amorphous silicon layer and arranged so that a channel region of the intrinsic amorphous silicon layer is exposed and separated from each other. As illustrated in FIG. 1, the source electrode 14a is an L-shaped protrusion on the side of the source line 14 and is provided so as to be in contact with one of the pair of $n^+$ amorphous silicon layers of the semiconductor layer 13. The drain electrode 14b is provided so as to be in contact with the other of the pair of $n^+$ amorphous silicon layers of the semiconductor layer 13, and is electrically connected to the pixel electrode Ep via a contact hole H formed in the color filter 16 and the organic protection film 17, as illustrated in FIG. 2. Although the semiconductor layer 13 including the intrinsic amorphous silicon layer is exemplified in the present embodiment, the semiconductor layer 13 may be made of, for example, low temperature polysilicon (LTPS), an In—Ga—Zn—O-based oxide semiconductor, or the like.

As described above, the color filters 16 include the red layer 16r provided as a colored layer in the subpixel P for gray scale display of red, the green layer 16g provided as a colored layer in the subpixel P for gray scale display of green, and the blue layer 16b provided as a colored layer in the subpixel P for gray scale display of blue, as illustrated in FIG. 3. An interlayer insulating film 15 is provided between the TFT 5 and the color filter 16. Note that the gate insulating film 12, the interlayer insulating film 15, the inorganic protection film 19, and the surface protection film 26 are each constituted of a single-layer or a multi-layer of inorganic insulating films made of, for example, silicon nitride, silicon oxide, or silicon oxynitride.

The organic protection film 17 is made of, for example, a transparent organic resin material such as an acrylic resin.

As illustrated in FIGS. 1 to 3, the pixel electrode Ep is configured by a first transparent electrode 18a provided in a rectangular shape on the organic protection film 17. As illustrated in FIG. 1, one pixel electrode Ep is provided for each subpixel P. The pixel electrode Ep constitutes an auxiliary capacity of each subpixel P together with the common electrode Ec and the inorganic protection film 19 provided between the pixel electrode Ep and the common electrode Ec.

As illustrated in FIGS. 2 and 3, the common electrode Ec is constituted by a second transparent electrode 20aa provided on the inorganic protection film 19 and a third transparent electrode 24aa provided on the second transparent electrode 20aa. The common electrode Ec is provided in common to the multiple subpixels P. As illustrated in FIGS. 1 and 3, the common electrode Ec is provided with slits S for aligning the liquid crystal layer 45. As illustrated in FIGS. 1 and 2, openings M are formed in the common electrode Ec so as to overlap the contact holes H. As illustrated in FIG. 2, inside the opening M of the common electrode Ec, a layered body of a pixel electrode first protection layer 20ab formed in the same layer with the same material as the second transparent electrode 20aa and a pixel electrode second protection layer 24ab formed in the same layer with the same material as the third transparent electrode 24aa is provided apart from the common electrode Ec so as to overlap a bottom face and a side surface of the contact hole H. As illustrated in FIG. 2, a resin-filled layer 25 is provided between the concave-shaped layered body of the pixel electrode first protection layer 20ab and the pixel electrode second protection layer 24ab and the surface protection film 26. As illustrated in FIG. 1, the second transparent electrode 20aa and the third transparent electrode 24aa have the same shape in a plan view. Between the second transparent electrode 20aa and the third transparent electrode 24aa, antireflection layers B are provided on the second transparent electrode 20aa. Each of the antireflection layers B overlaps a boundary portion L between any two of the red layer 16r, the green layer 16g, and the blue layer 16b, as illustrated in FIG. 3. The third transparent electrode 24aa is provided so as to be in contact with the second transparent electrode 20aa at least in each subpixel. As illustrated in FIG. 3, the second transparent electrode 20aa, the antireflection layer B, and the third transparent electrode 24aa are layered in order on the inorganic protection film 19, and the third transparent electrode 24aa is provided so as to cover the antireflection layer B.

As illustrated in FIG. 1, the antireflection layers B are linearly provided so as to overlap source lines 14, respectively. As illustrated in FIG. 3, the antireflection layer B includes a first metal layer 21a, an inorganic insulating layer 22a, and a second metal layer 23a, which are layered in order on the second transparent electrode 20aa, and is configured to absorb external light to reduce external light reaching the first metal layer 21a and to absorb external light reflected by the first metal layer 21a. As illustrated in FIG. 3, the second transparent electrode 20aa is provided so as to be in contact with the first metal layer 21a, and the third transparent electrode 24aa is provided so as to be in contact with the second metal layer 23a. In the second transparent electrode 20aa, a film thickness of a portion in contact with the first metal layer 21a (e.g., approximately 70 nm) is larger than a film thickness of a portion not in contact with the first metal layer 21a (e.g., approximately 50 nm).

The alignment film 27 and an alignment film 31, which will be described later, are made of, for example, a polyimide resin having a rubbed surface.

As illustrated in FIG. 3, the counter substrate 40 includes a base substrate 10b such as a glass substrate, and the alignment film 31 provided on the base substrate 10b.

The liquid crystal layer 45 is made of, for example, a nematic liquid crystal material having electro-optical properties. The liquid crystal layer 45 is sealed between the active matrix substrate 30a and the counter substrate 40 by a sealing member having a frame-like shape that bonds the active matrix substrate 30a and the counter substrate 40 in a frame region around the display region D.

In the liquid crystal display device 50 having the above-described configuration, a predetermined voltage is applied to the liquid crystal layer 45 disposed between each pixel electrode Ep and the common electrode Ec and the auxiliary capacity, and the alignment state of the liquid crystal layer 45 is changed by an electrical field generated in a direction along the surface of the substrate, that is, in a transverse direction, thereby adjusting the transmittance of light passing through the panel of each subpixel P to display images.

Next, a method of manufacturing the liquid crystal display device 50 according to the present embodiment will be described, focusing on a method of manufacturing the active matrix substrate 30a. FIGS. 4, 6, 8, 9, 11, 13, 15, 17, 20, 23, 25, and 27 are 1st to 12th cross-sectional views of a portion corresponding to the portion illustrated in FIG. 2, sequentially illustrating the manufacturing process of the active matrix substrate 30a. FIGS. 5, 7, 10, 12, 14, 16, 18, 19, 21, 22, 24, 26, and 28 are 1st to 13th cross-sectional views of a portion corresponding to the portion illustrated in FIG. 3, sequentially illustrating the manufacturing process of the active matrix substrate 30a. The manufacturing process of the active matrix substrate 30a includes a TFT forming step, a color filter forming step, a first transparent electrode forming step, an inorganic protection film forming step, a second transparent conductive film forming step, an antireflection layer forming step, a third transparent conductive film forming step, and a second transparent electrode forming step.

First, an aluminum film (thickness of approximately 300 nm) and a molybdenum niobium film (thickness of approximately 50 nm) are formed in order on the base substrate 10a such as a glass substrate by, for example, sputtering to form a metal layered film, and then the metal layered film is subjected to photolithography, etching, and resist stripping and cleaning, thereby forming the gate lines 11 including the gate electrodes 11a.

Subsequently, an inorganic insulating film (thickness of approximately 350 nm) such as a silicon nitride film or a silicon oxide film, an intrinsic amorphous silicon film (thickness of approximately 120 nm), and a phosphorus-doped n$^+$ amorphous silicon film (thickness of approximately 30 nm) are formed in order on the surface of the substrate on which the gate lines 11 are formed by, for example, plasma chemical vapor deposition (CVD), and then the layered film of the intrinsic amorphous silicon film and the n$^+$ amorphous silicon film is subjected to photolithography, etching, and resist stripping and cleaning, thereby forming the gate insulating film 12 and a semiconductor layer forming layer.

Thereafter, a titanium film (thickness of approximately 30 nm), an aluminum film (thickness of approximately 300 nm), and a titanium film (thickness of approximately 50 nm) are formed in order on the surface of the substrate on which the gate insulating film 12 and the semiconductor layer forming layer are formed by, for example, sputtering to form a metal layered film, and then the metal layered film is subjected to photolithography, etching, and resist stripping and cleaning, thereby forming the source lines 14, the source electrodes 14a, and the drain electrodes 14b.

Further, the n$^+$ amorphous silicon film of the semiconductor layer forming layer is removed by etching using the source electrodes 14a and the drain electrodes 14b as masks, thereby forming the semiconductor layers 13 and the TFTs 5 including the semiconductor layers 13 (TFT forming step).

Figure 4:
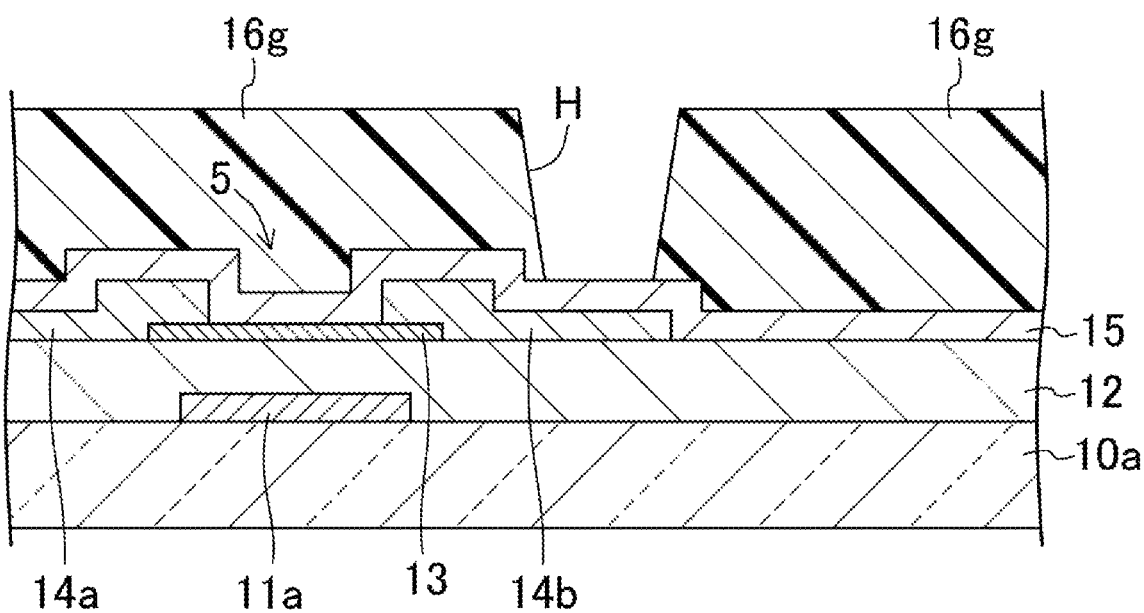
FIG. 4 is a first cross-sectional view of a portion corresponding to the portion illustrated in FIG. 2, illustrating part of a manufacturing process of the active matrix substrate that is a component of the liquid crystal display device according to the first embodiment of the disclosure.
Figure 5:
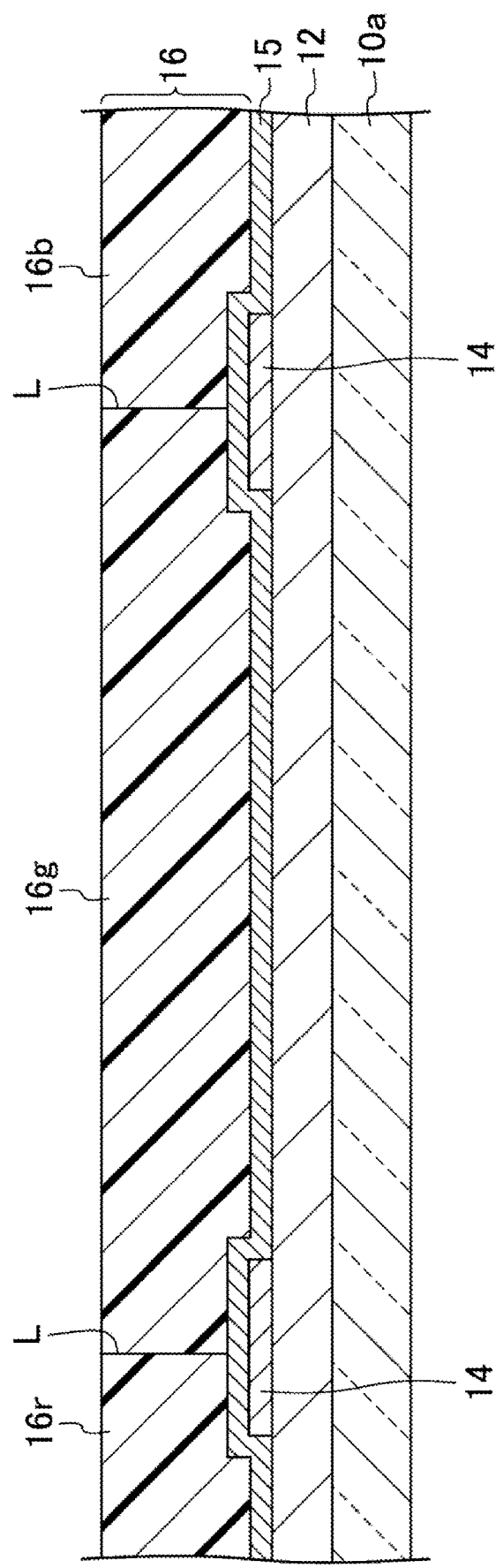
FIG. 5 is a first cross-sectional view of a portion corresponding to the portion illustrated in FIG. 3, illustrating part of the manufacturing process of the active matrix substrate that is a component of the liquid crystal display device according to the first embodiment of the disclosure.
Figure 6:
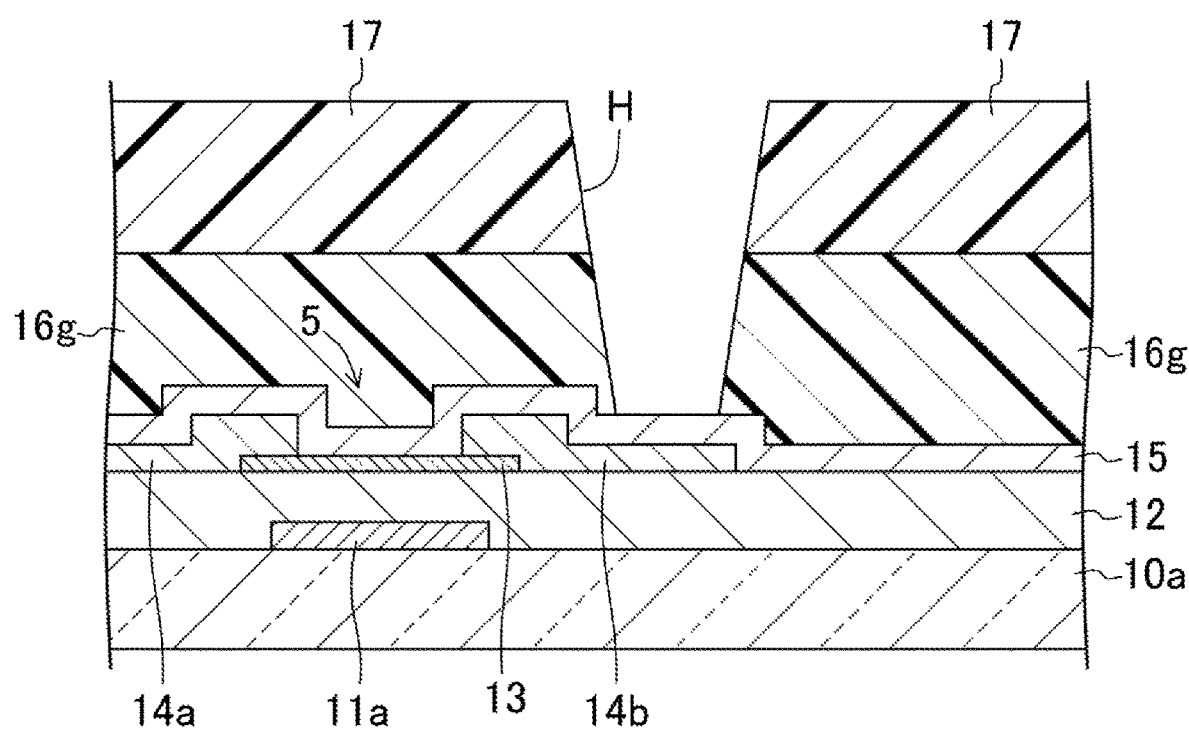
FIG. 6 is a second cross-sectional view of the portion corresponding to the portion illustrated in FIG. 2, subsequent to FIG. 4, illustrating part of the manufacturing process of the active matrix substrate that is a component of the liquid crystal display device according to the first embodiment of the disclosure.
Figure 7:
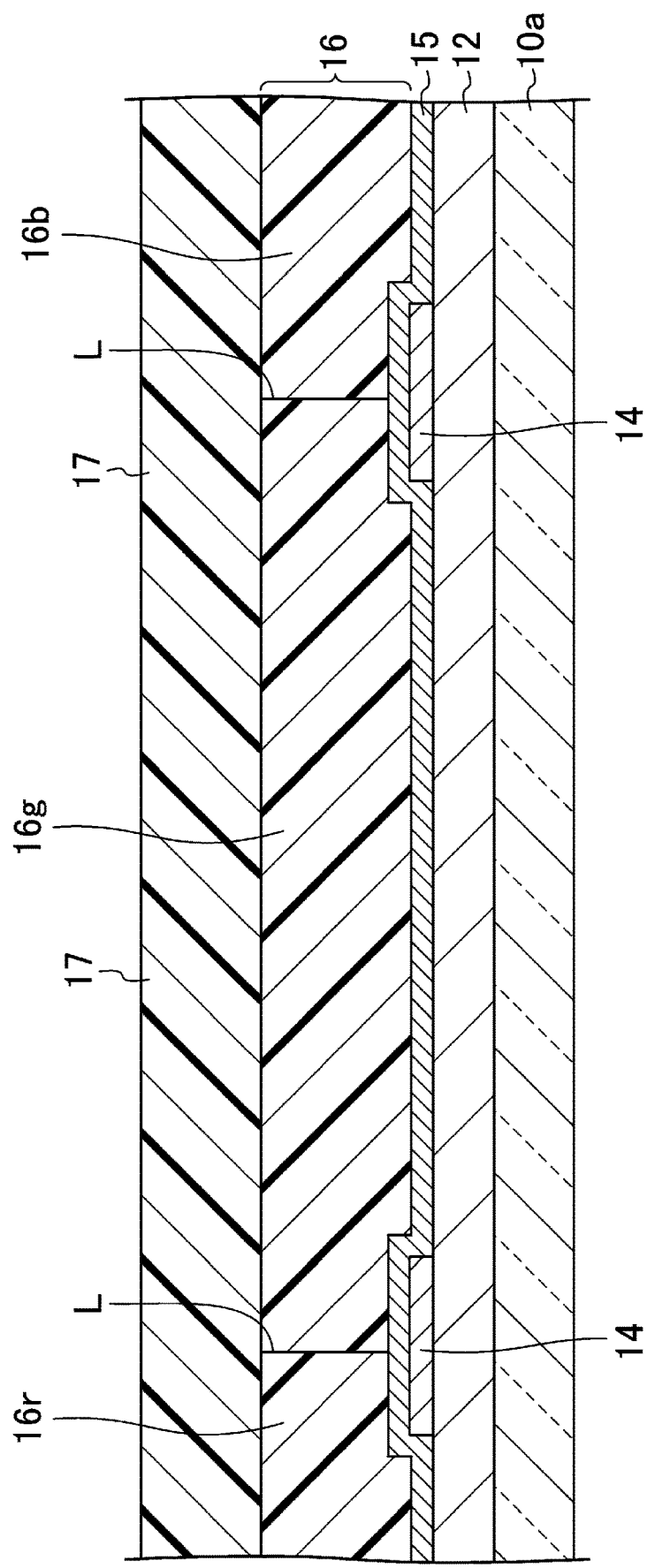
FIG. 7 is a second cross-sectional view of the portion corresponding to the portion illustrated in FIG. 3, subsequent to FIG. 5, illustrating part of the manufacturing process of the active matrix substrate that is a component of the liquid crystal display device according to the first embodiment of the disclosure.

Subsequently, an inorganic insulating film (thickness of approximately 750 nm) such as a silicon nitride film or a silicon oxide film is formed on the surface of the substrate on which the TFTs 5 are formed by, for example, plasma CVD to form the interlayer insulating film 15, and then a red, green, or blue colored acrylic photosensitive resin (thickness of approximately 1.6 µm) is applied by spin coating or slit coating, and the applied photosensitive resin is partially exposed, and then patterned by development, thereby forming a colored layer having a selected color (e.g., red layer 16r). Further, the similar step is repeated for the other two colors to form the colored layers of the other two colors (e.g., green layer 16g and blue layer 16b), thereby forming the color filters 16 having the contact holes H as illustrated in FIGS. 4 and 5 (color filter forming step).

Thereafter, an acrylic photosensitive resin (thickness of approximately 2.0 µm) is applied to the surface of the substrate on which the color filters 16 are formed, by, for example, spin coating or slit coating, and the applied photosensitive resin is partially exposed and then patterned by development, thereby forming the organic protection film 17 having the contact holes H.

Figure 8:
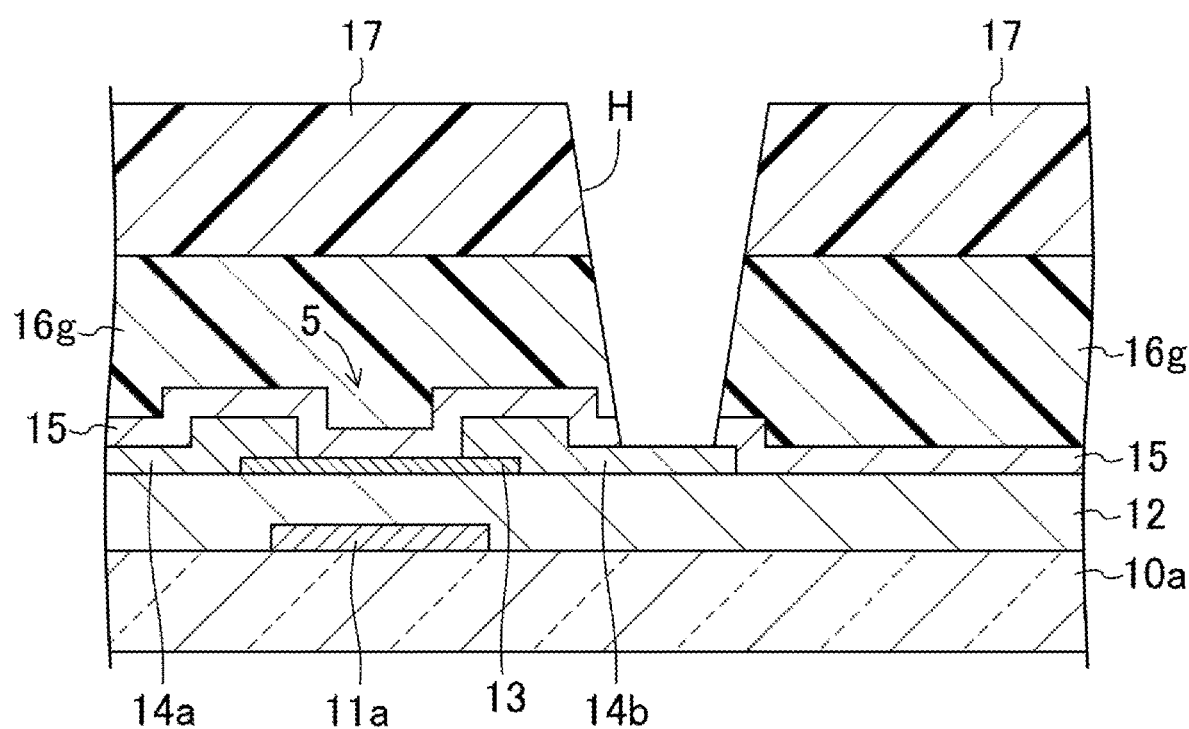
FIG. 8 is a third cross-sectional view of the portion corresponding to the portion illustrated in FIG. 2, subsequent to FIG. 6, illustrating part of the manufacturing process of the active matrix substrate that is a component of the liquid crystal display device according to the first embodiment of the disclosure.

Further, the interlayer insulating film 15 exposed out of the contact holes H is etched to form the contact holes H in the interlayer insulating film 15 as illustrated in FIG. 8, thereby exposing the drain electrodes 14b out of the contact holes H.

Figure 9:
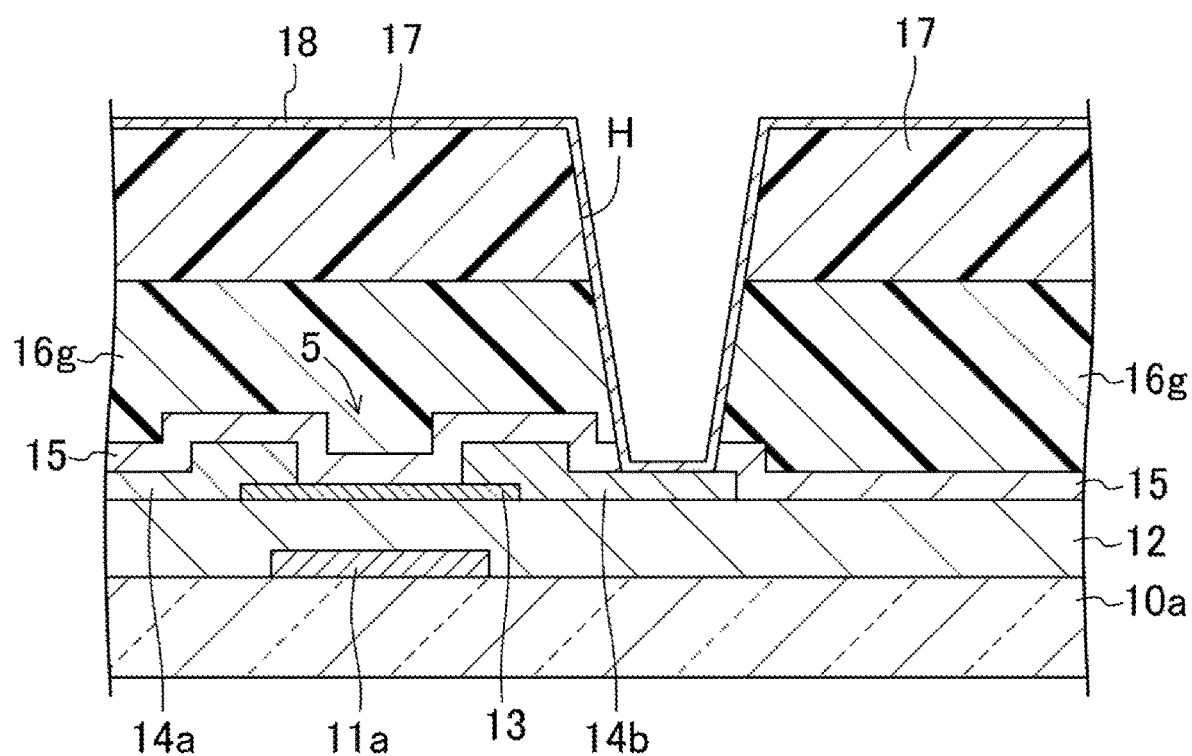
FIG. 9 is a fourth cross-sectional view of the portion corresponding to the portion illustrated in FIG. 2, subsequent to FIG. 8, illustrating part of the manufacturing process of the active matrix substrate that is a component of the liquid crystal display device according to the first embodiment of the disclosure.
Figure 10:
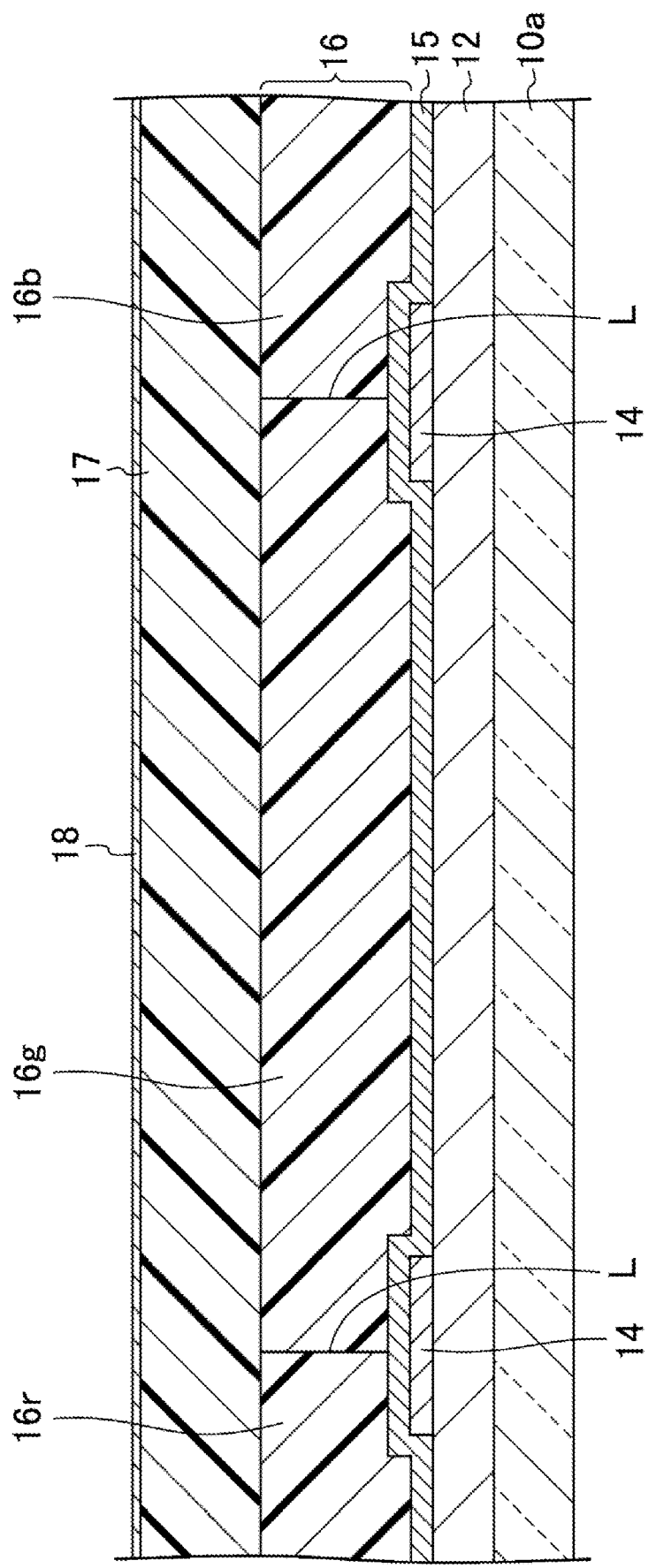
FIG. 10 is a third cross-sectional view of the portion corresponding to the portion illustrated in FIG. 3, subsequent to FIG. 7, illustrating part of the manufacturing process of the active matrix substrate that is a component of the liquid crystal display device according to the first embodiment of the disclosure.
Figure 11:
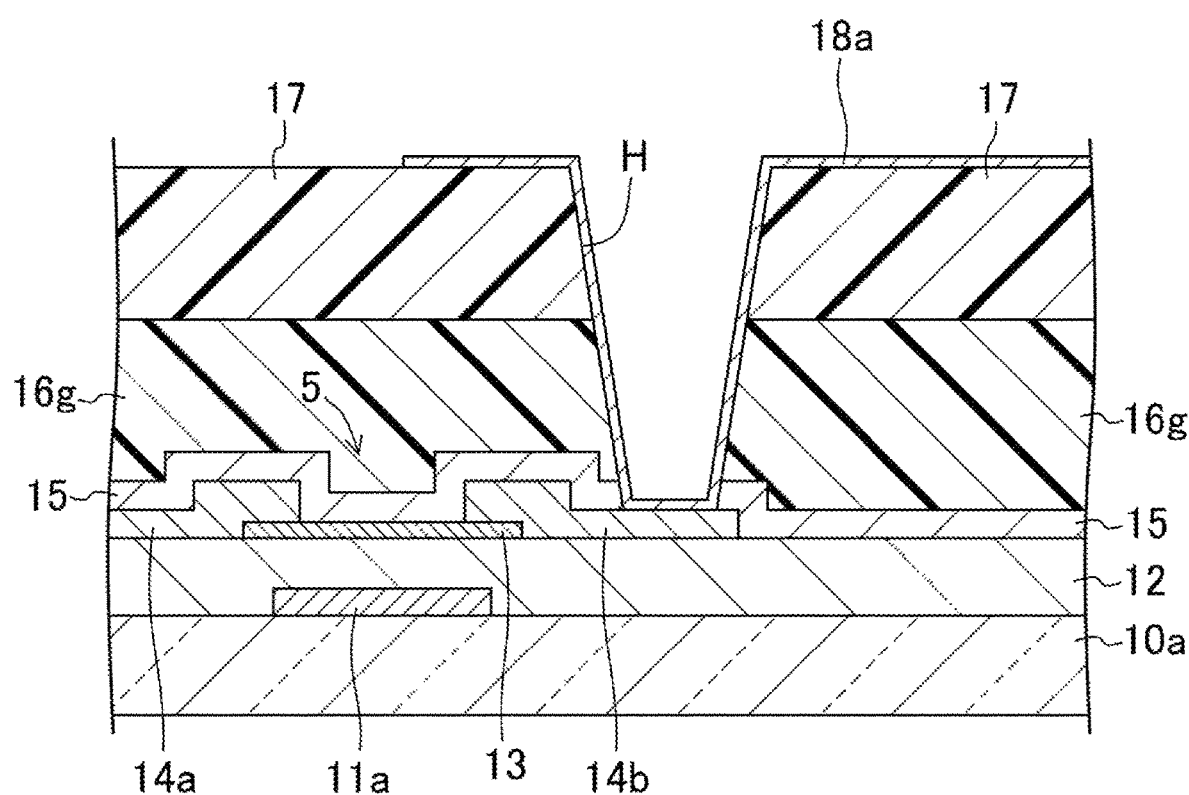
FIG. 11 is a fifth cross-sectional view of the portion corresponding to the portion illustrated in FIG. 2, subsequent to FIG. 9, illustrating part of the manufacturing process of the active matrix substrate that is a component of the liquid crystal display device according to the first embodiment of the disclosure.
Figure 12:
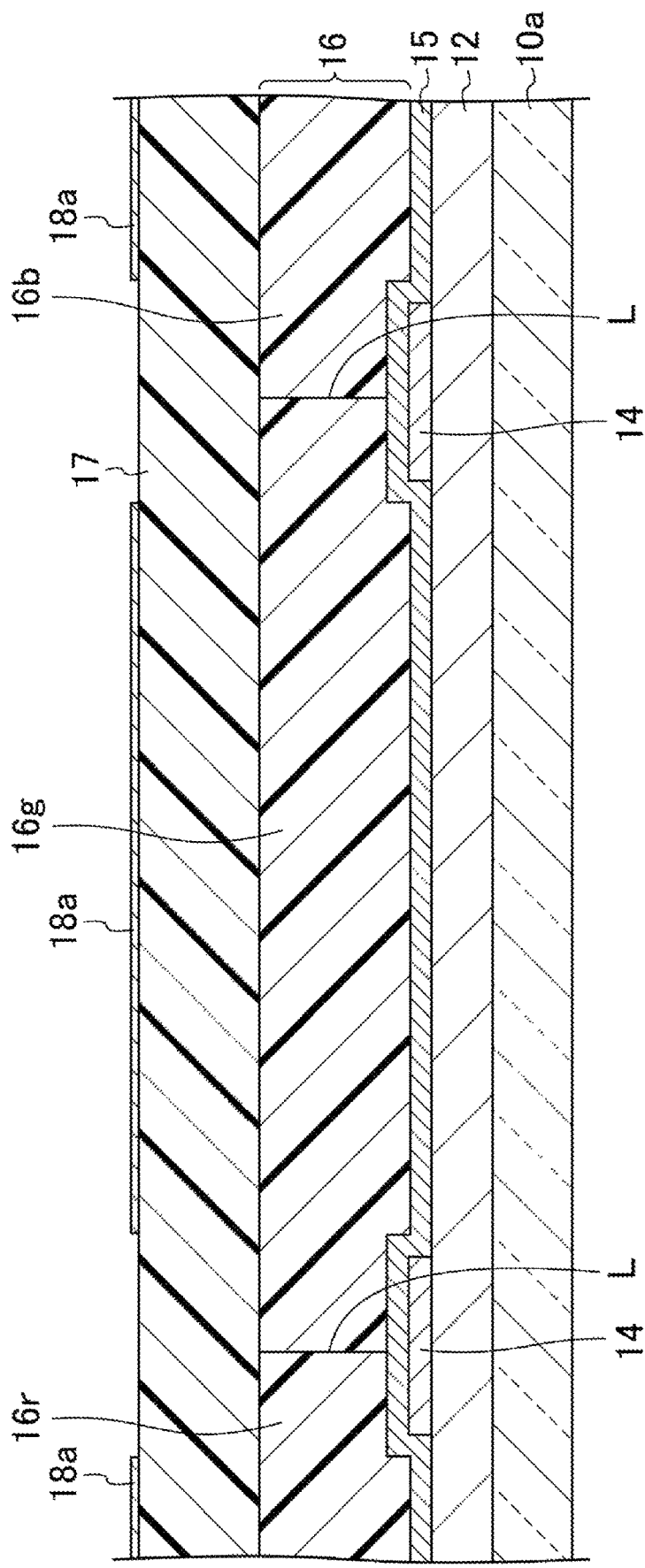
FIG. 12 is a fourth cross-sectional view of the portion corresponding to the portion illustrated in FIG. 3, subsequent to FIG. 10, illustrating part of the manufacturing process of the active matrix substrate that is a component of the liquid crystal display device according to the first embodiment of the disclosure.

Subsequently, as illustrated in FIGS. 9 and 10, a first transparent conductive film (thickness of approximately 70 nm) 18 such as an indium tin oxide (ITO) film or an indium zinc oxide (IZO) film is formed on the surface of the substrate on which the contact holes H are formed in the interlayer insulating film 15 by, for example, sputtering, and then the first transparent conductive film 18 is subjected to photolithography, etching, and resist stripping and cleaning, thereby forming the first transparent electrodes 18a (pixel electrodes Ep) as illustrated in FIGS. 11 and 12 (first transparent electrode forming step).

Figure 13:
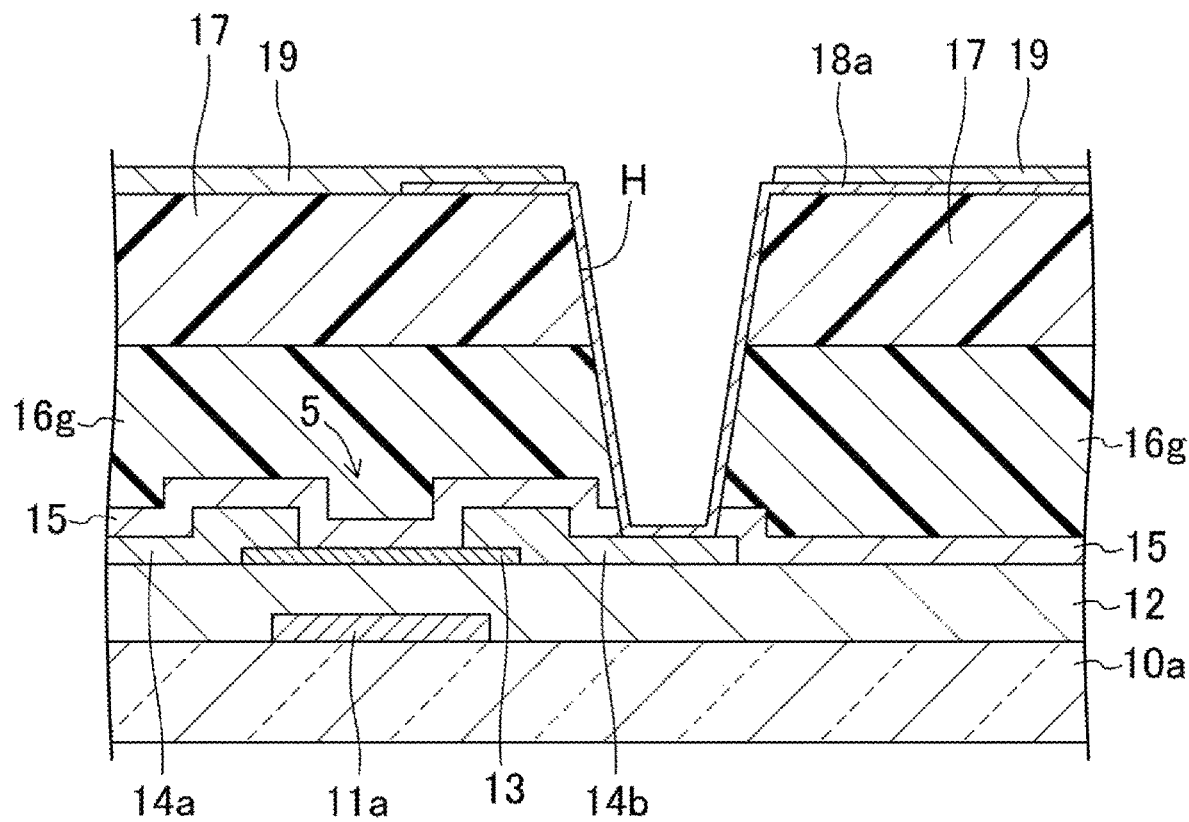
FIG. 13 is a sixth cross-sectional view of the portion corresponding to the portion illustrated in FIG. 2, subsequent to FIG. 11, illustrating part of the manufacturing process of the active matrix substrate that is a component of the liquid crystal display device according to the first embodiment of the disclosure.
Figure 14:
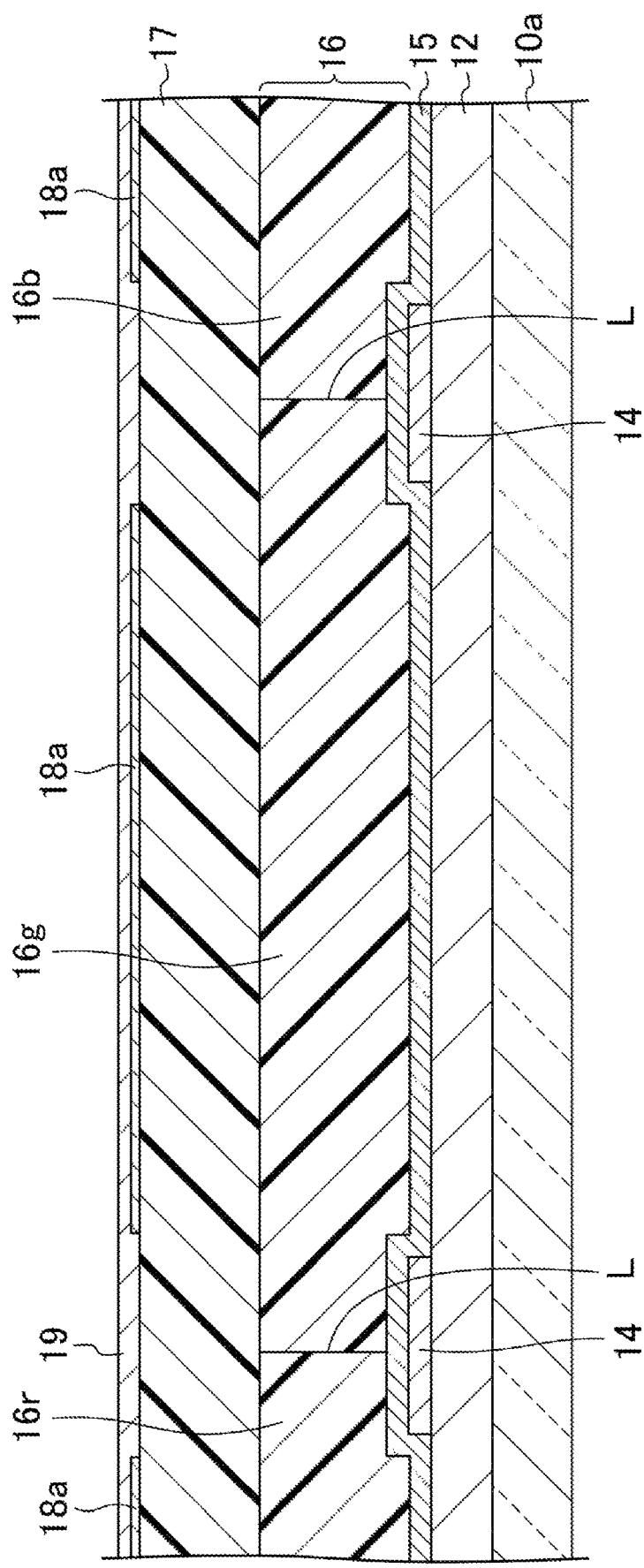
FIG. 14 is a fifth cross-sectional view of the portion corresponding to the portion illustrated in FIG. 3, subsequent to FIG. 12, illustrating part of the manufacturing process of the active matrix substrate that is a component of the liquid crystal display device according to the first embodiment of the disclosure.

Thereafter, an inorganic insulating film (thickness of approximately 100 nm) such as a silicon nitride film is formed on the surface of the substrate on which the first transparent electrodes 18a are formed by, for example, plasma CVD, and then the inorganic insulating film is subjected to photolithography, etching, and resist stripping and cleaning, thereby forming the inorganic protection film 19 as illustrated in FIGS. 13 and 14 (inorganic protection film forming step).

Figure 15:
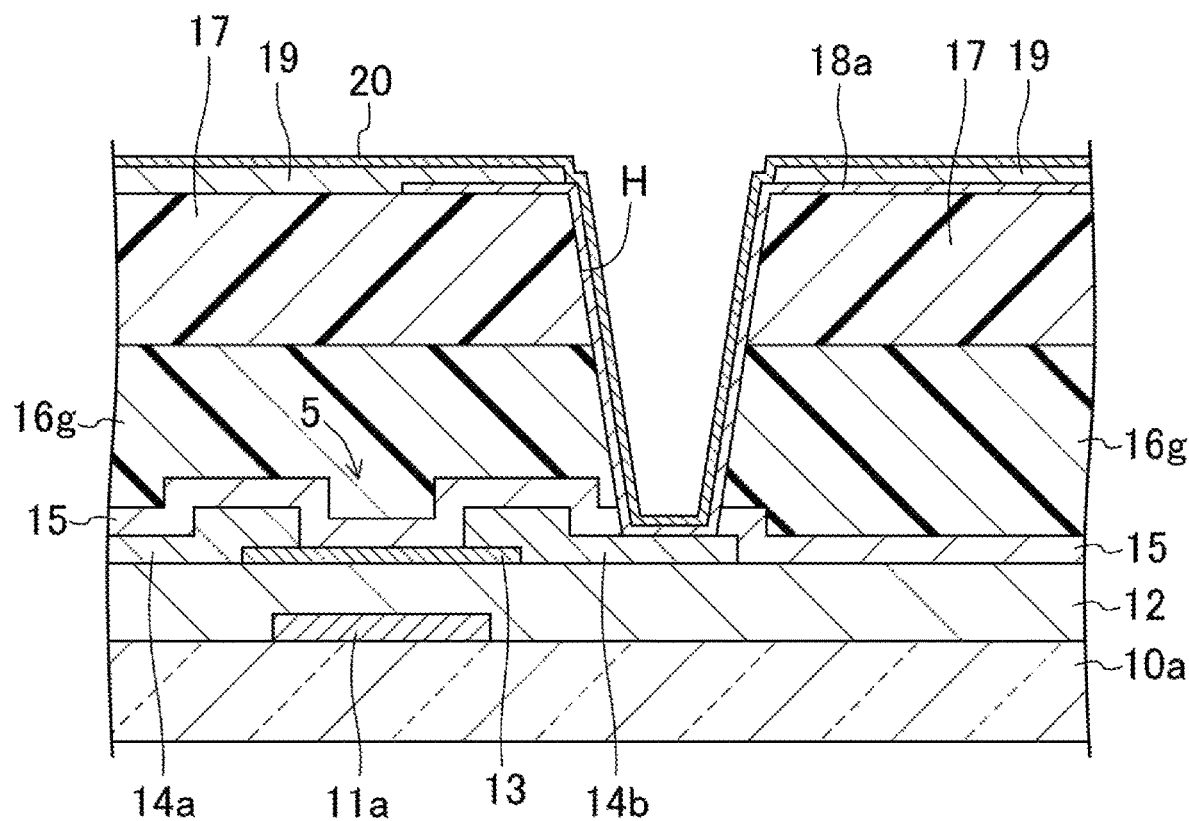
FIG. 15 is a seventh cross-sectional view of the portion corresponding to the portion illustrated in FIG. 2, subsequent to FIG. 13, illustrating part of the manufacturing process of the active matrix substrate that is a component of the liquid crystal display device according to the first embodiment of the disclosure.
Figure 16:
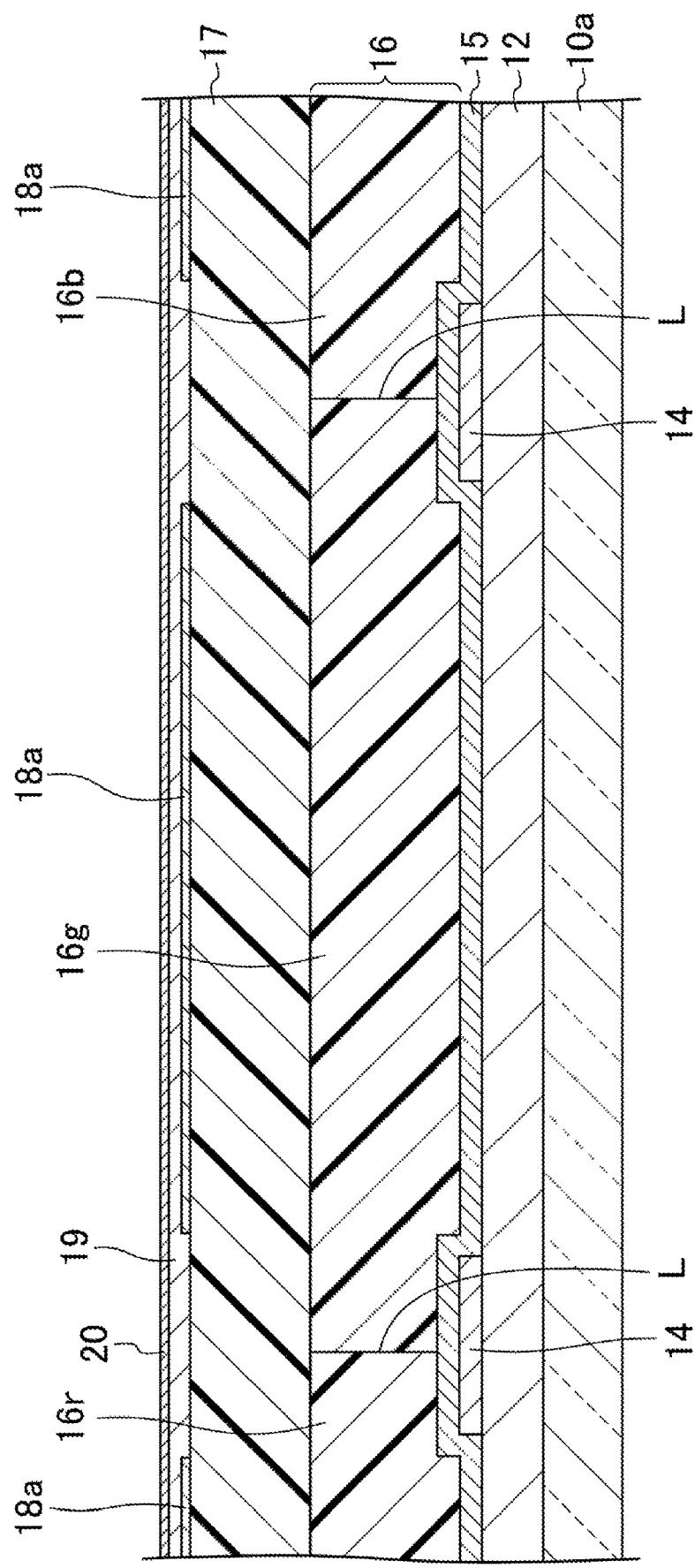
FIG. 16 is a sixth cross-sectional view of the portion corresponding to the portion illustrated in FIG. 3, subsequent to FIG. 14, illustrating part of the manufacturing process of the active matrix substrate that is a component of the liquid crystal display device according to the first embodiment of the disclosure.

Further, as illustrated in FIGS. 15 and 16, the second transparent conductive film 20 (thickness of approximately 70 nm) such as an IZO film is formed on the surface of the substrate on which the second inorganic protection film 19 is formed by, for example, sputtering (second transparent conductive film forming step).

Figure 17:
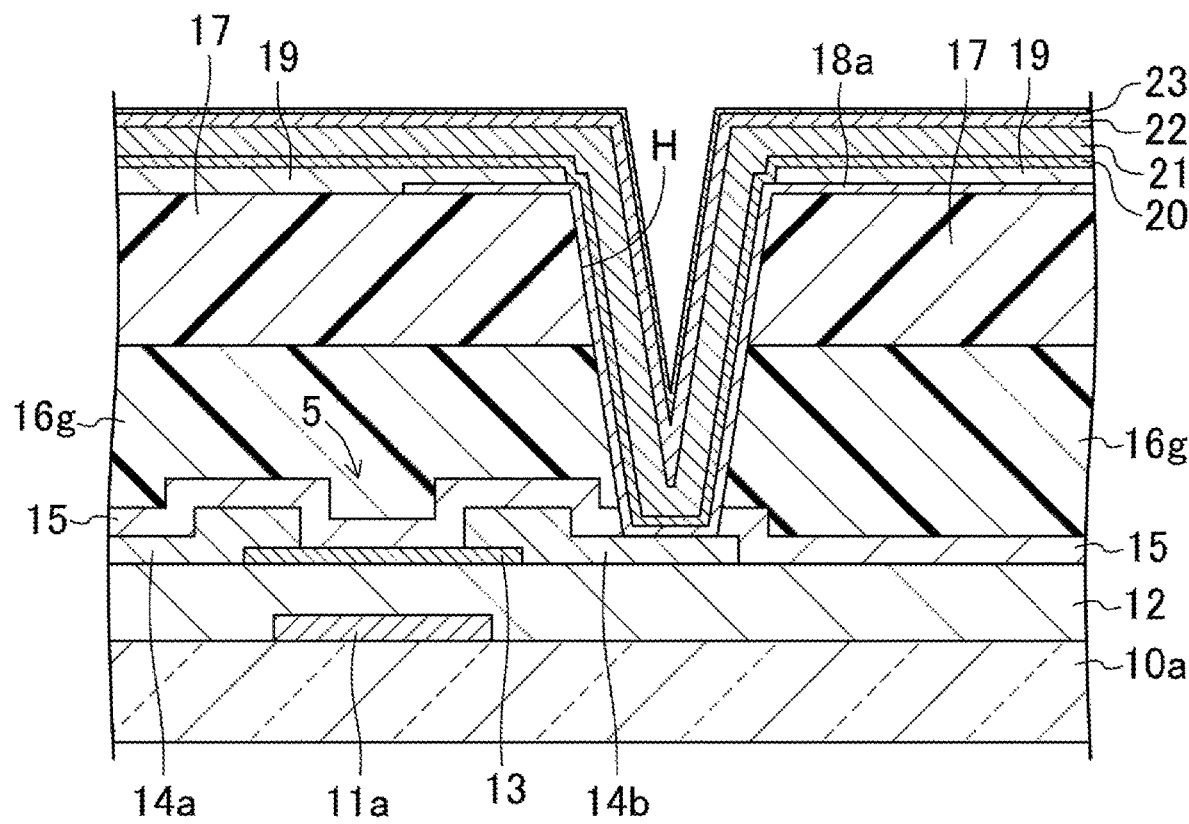
FIG. 17 is an eighth cross-sectional view of the portion corresponding to the portion illustrated in FIG. 2, subsequent to FIG. 15, illustrating part of the manufacturing process of the active matrix substrate that is a component of the liquid crystal display device according to the first embodiment of the disclosure.
Figure 18:
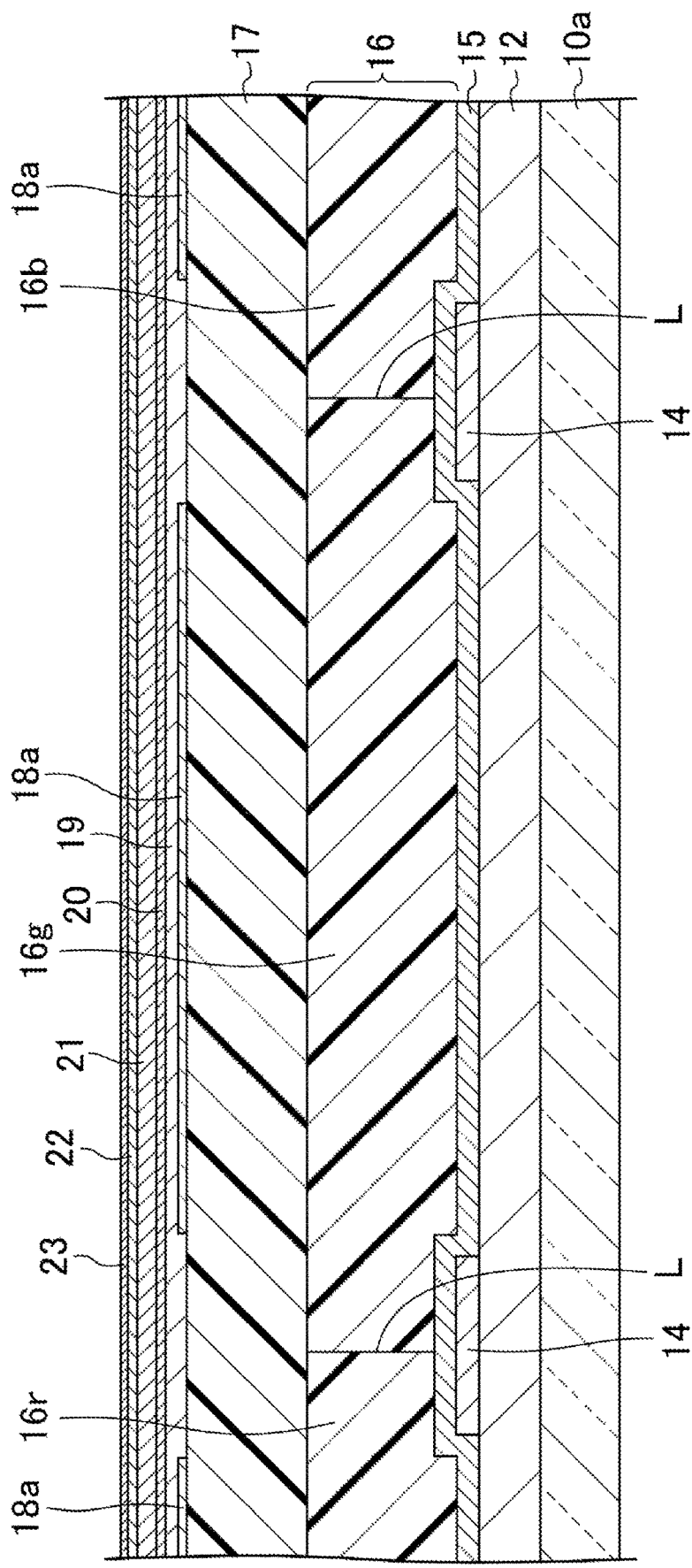
FIG. 18 is a seventh cross-sectional view of the portion corresponding to the portion illustrated in FIG. 3, subsequent to FIG. 16, illustrating part of the manufacturing process of the active matrix substrate that is a component of the liquid crystal display device according to the first embodiment of the disclosure.

Subsequently, as illustrated in FIGS. 17 and 18, a first metal film (thickness of approximately 100 nm) 21 such as a tungsten film, an inorganic insulating film (thickness of approximately 60 nm) 22 such as a silicon nitride film, and a second metal film (thickness of approximately 5 nm) 23 such as a tungsten film are formed on the surface of the substrate on which the second transparent conductive film 20 is formed by, for example, sputtering, plasma CVD, and sputtering in order.

Figure 19:
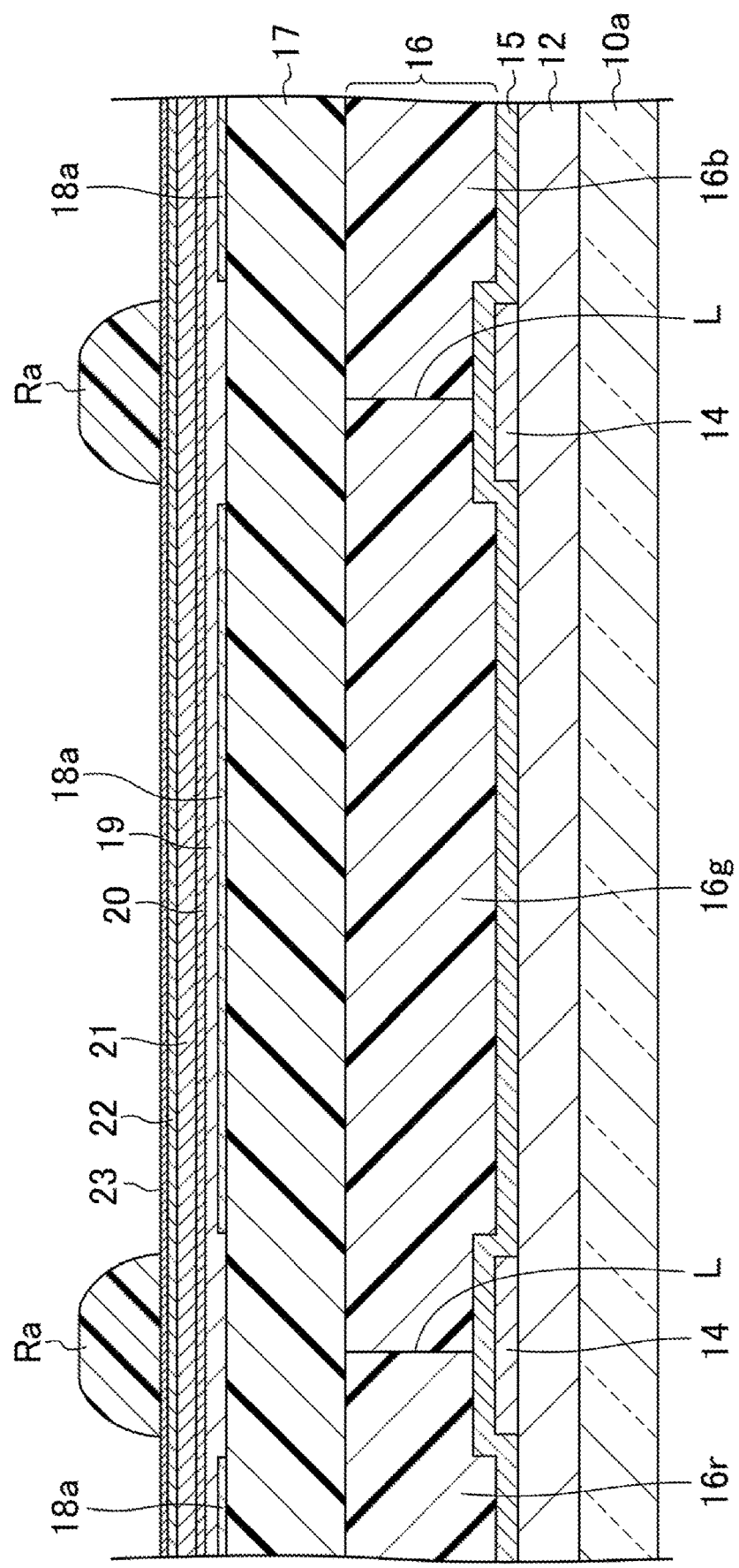
FIG. 19 is an eighth cross-sectional view of the portion corresponding to the portion illustrated in FIG. 3, subsequent to FIG. 18, illustrating part of the manufacturing process of the active matrix substrate that is a component of the liquid crystal display device according to the first embodiment of the disclosure.
Figure 20:
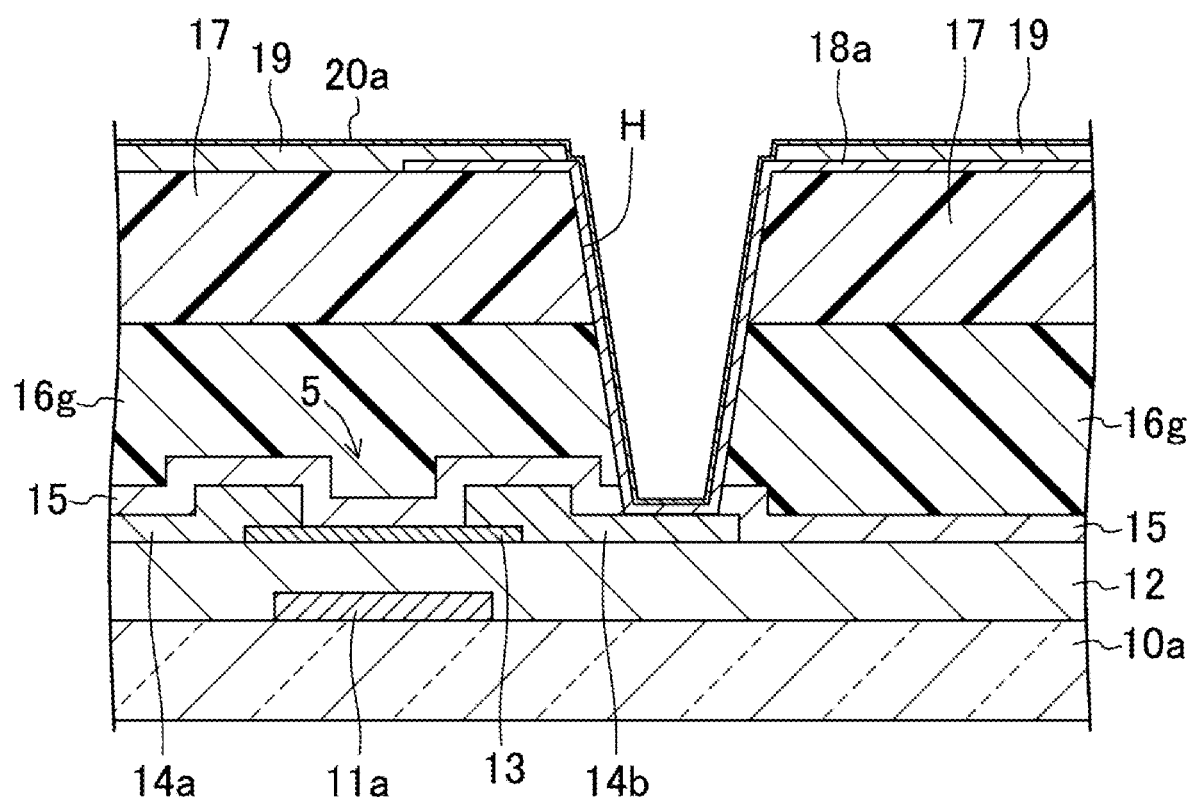
FIG. 20 is a ninth cross-sectional view of the portion corresponding to the portion illustrated in FIG. 2, subsequent to FIG. 17, illustrating part of the manufacturing process of the active matrix substrate that is a component of the liquid crystal display device according to the first embodiment of the disclosure.
Figure 21:
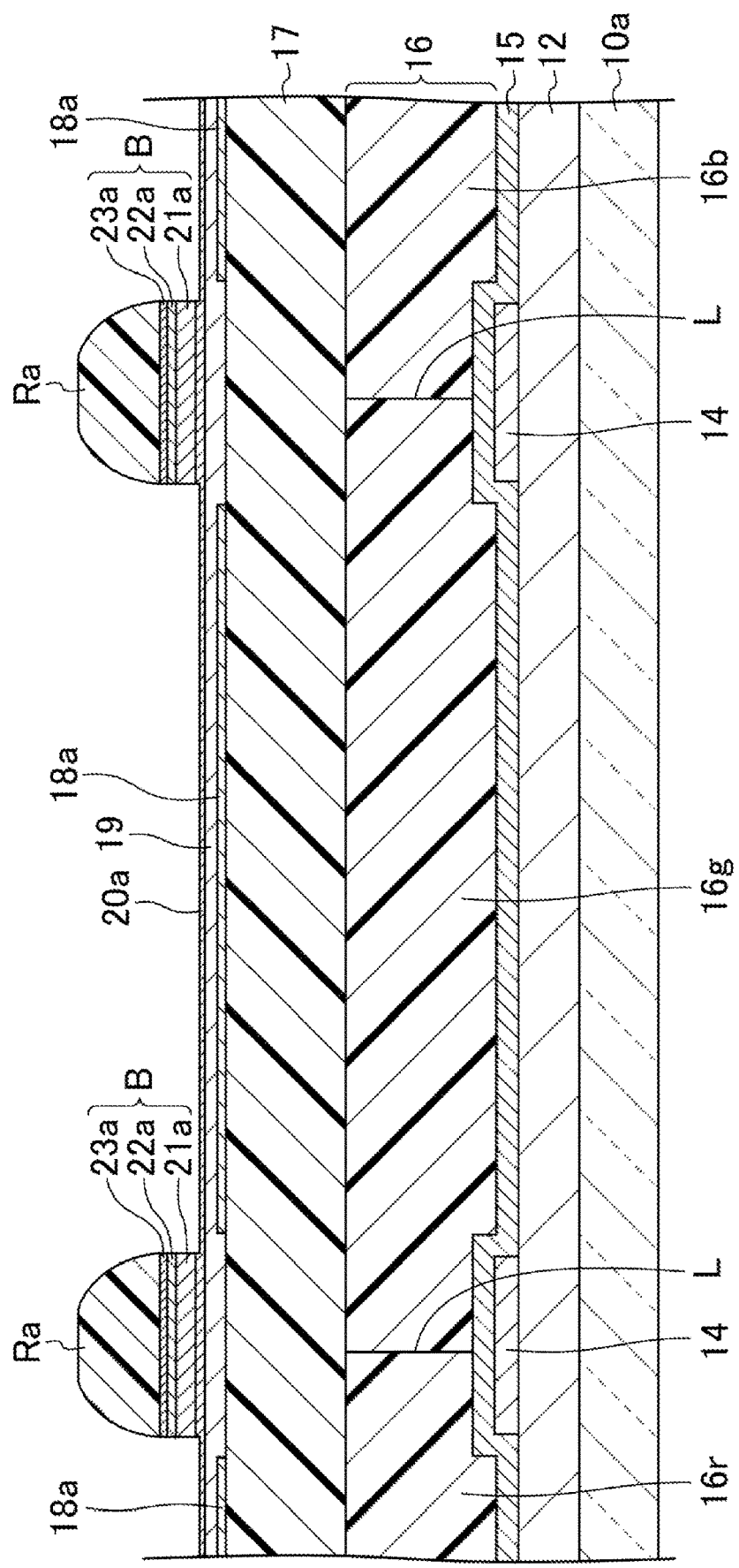
FIG. 21 is a ninth cross-sectional view of the portion corresponding to the portion illustrated in FIG. 3, subsequent to FIG. 20, illustrating part of the manufacturing process of the active matrix substrate that is a component of the liquid crystal display device according to the first embodiment of the disclosure.
Figure 22:
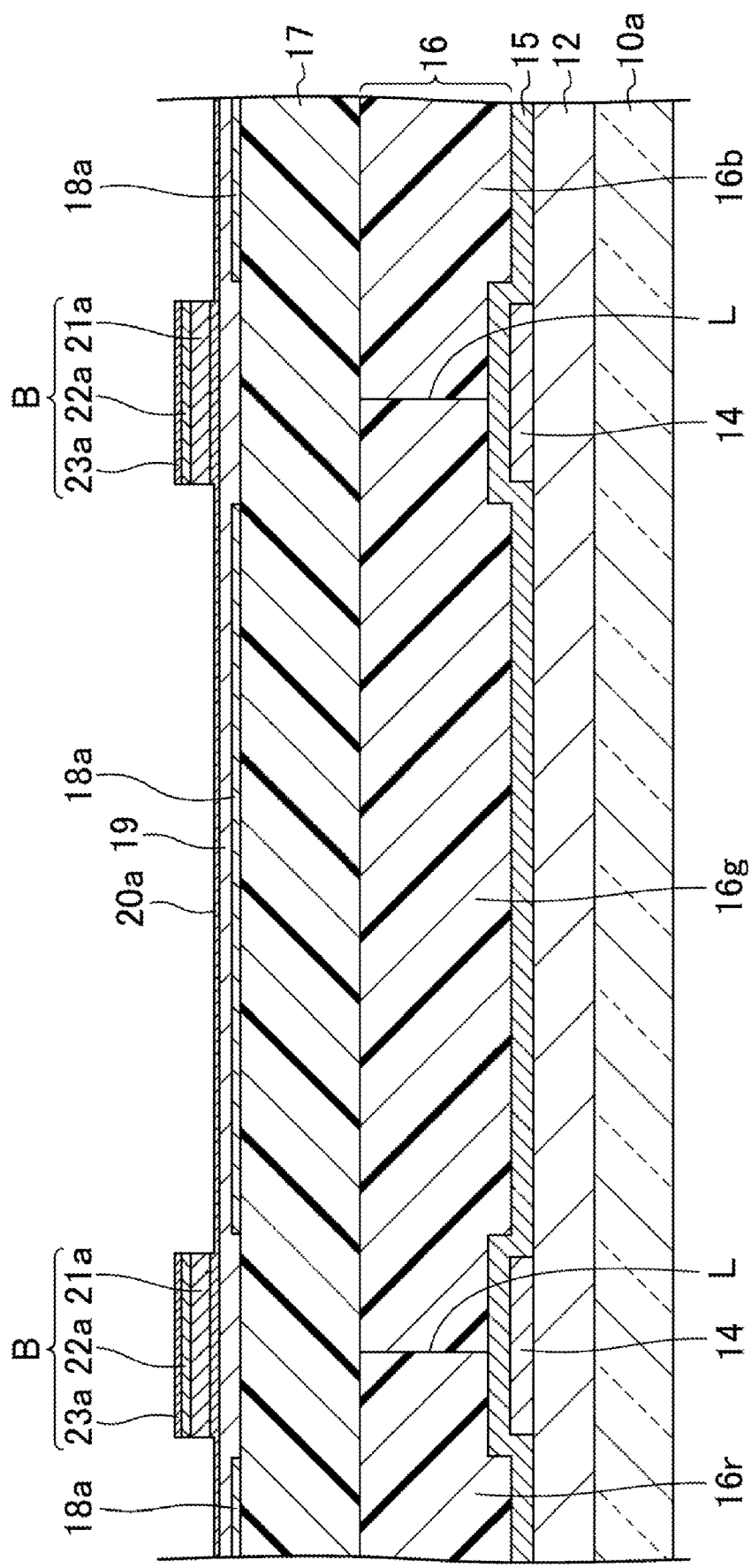
FIG. 22 is a 10th cross-sectional view of the portion corresponding to the portion illustrated in FIG. 3, subsequent to FIG. 21, illustrating part of the manufacturing process of the active matrix substrate that is a component of the liquid crystal display device according to the first embodiment of the disclosure.

Thereafter, as illustrated in FIG. 19, resists Ra are formed on the surface of the substrate on which the first metal film 21, the inorganic insulating film 22, and the second metal film 23 are formed by photolithography, and as illustrated in FIGS. 20 and 21, the first metal film 21, the inorganic insulating film 22, and the second metal film 23 exposed out of the resists Ra are subjected to dry etching using a fluorine-based gas, and the resists Ra are stripped and cleaned, thereby forming the antireflection layers B in each of which the first metal layer 21a, the inorganic insulating layer 22a, and the second metal layer 23a are layered as illustrated in FIG. 21 (antireflection layer forming step). In the antireflection layer forming step, a surface layer of the second transparent conductive film 20 exposed out of the resists Ra is also etched to form a second transparent conductive film 20a, so that a film thickness of a portion of the second transparent electrode 20aa in contact with the first metal layer 21a is larger than a film thickness of a portion of the second transparent electrode 20aa not in contact with the first metal layer 21a.

Figure 23:
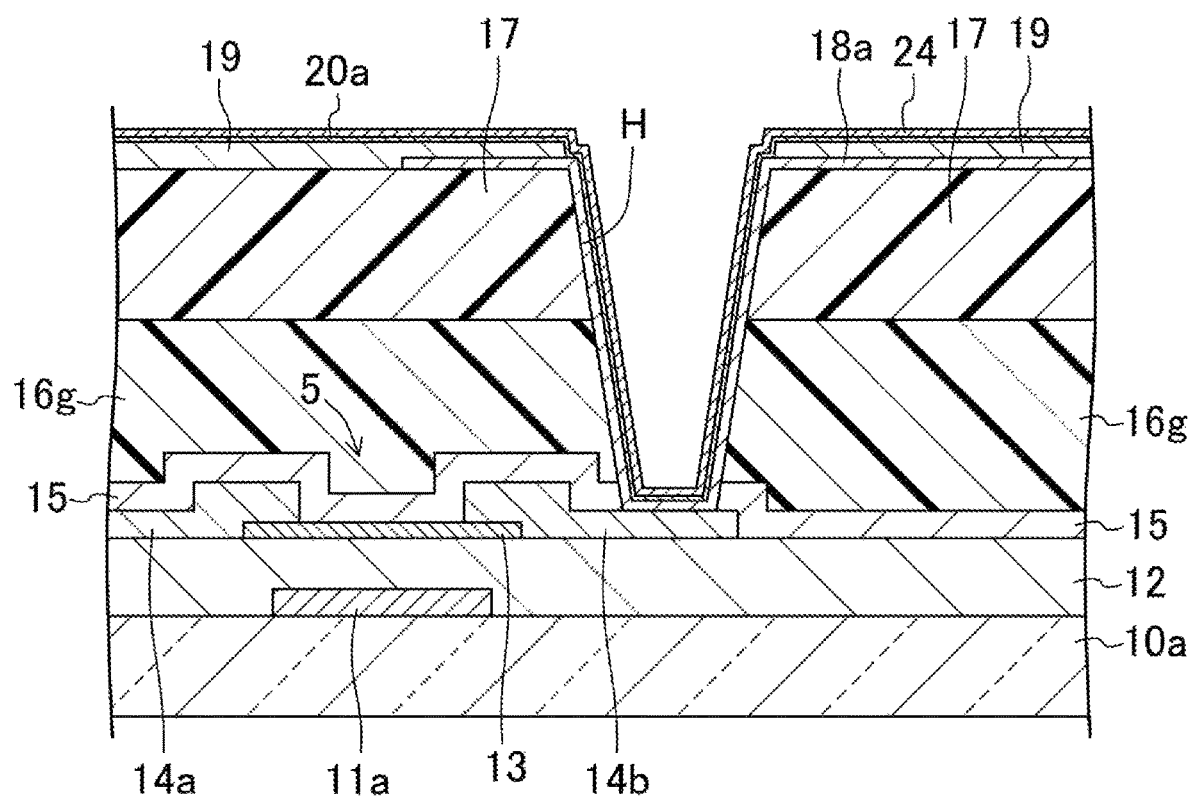
FIG. 23 is a 10th cross-sectional view of the portion corresponding to the portion illustrated in FIG. 2, subsequent to FIG. 20, illustrating part of the manufacturing process of the active matrix substrate that is a component of the liquid crystal display device according to the first embodiment of the disclosure.
Figure 24:
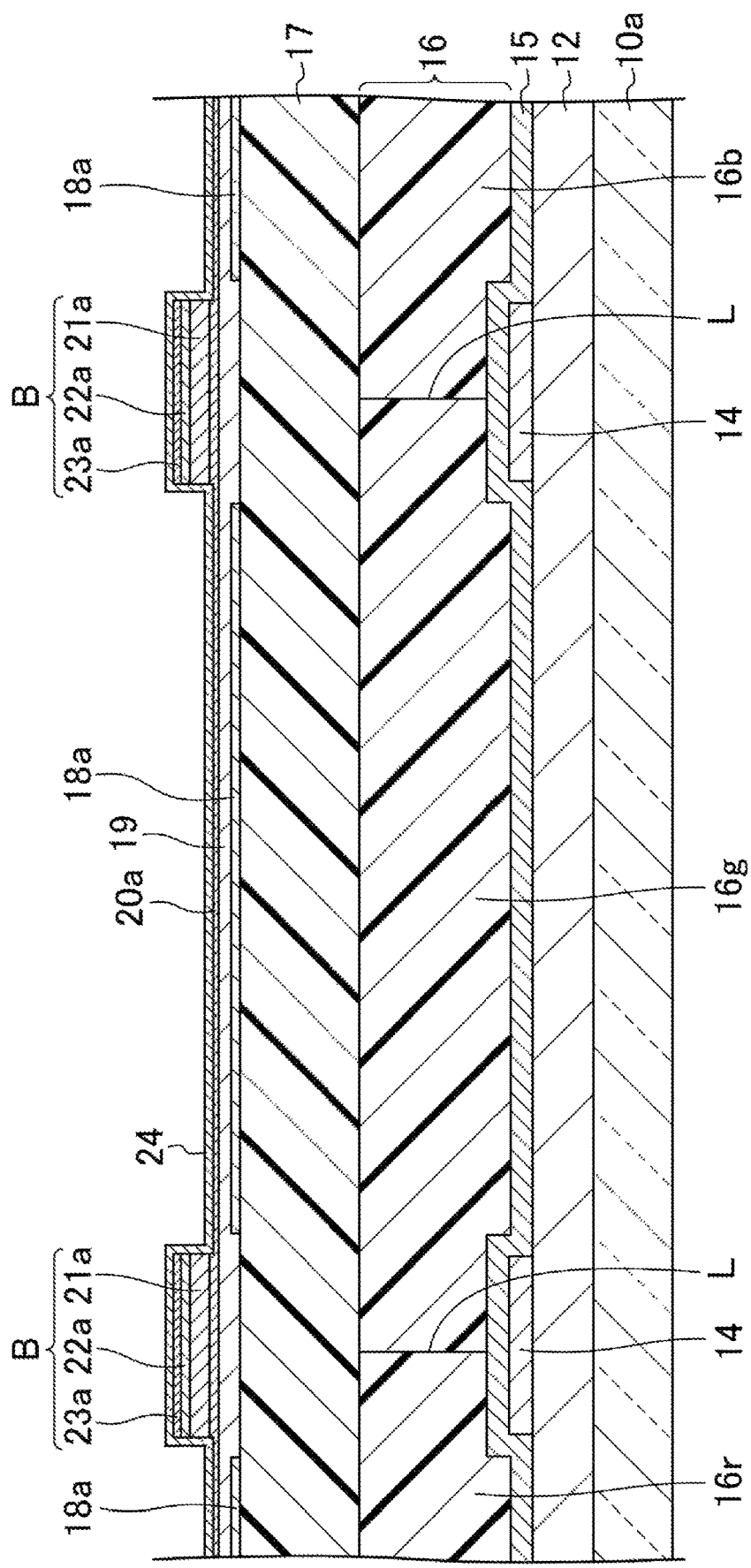
FIG. 24 is an 11th cross-sectional view of the portion corresponding to the portion illustrated in FIG. 3, subsequent to FIG. 22, illustrating part of the manufacturing process of the active matrix substrate that is a component of the liquid crystal display device according to the first embodiment of the disclosure.

Further, as illustrated in FIGS. 23 and 24, a third transparent conductive film 24 (thickness of approximately 60 nm) such as an IZO film is formed on the surface of the substrate on which the antireflection layers B are formed by, for example, sputtering (third transparent conductive film forming step).

Figure 25:
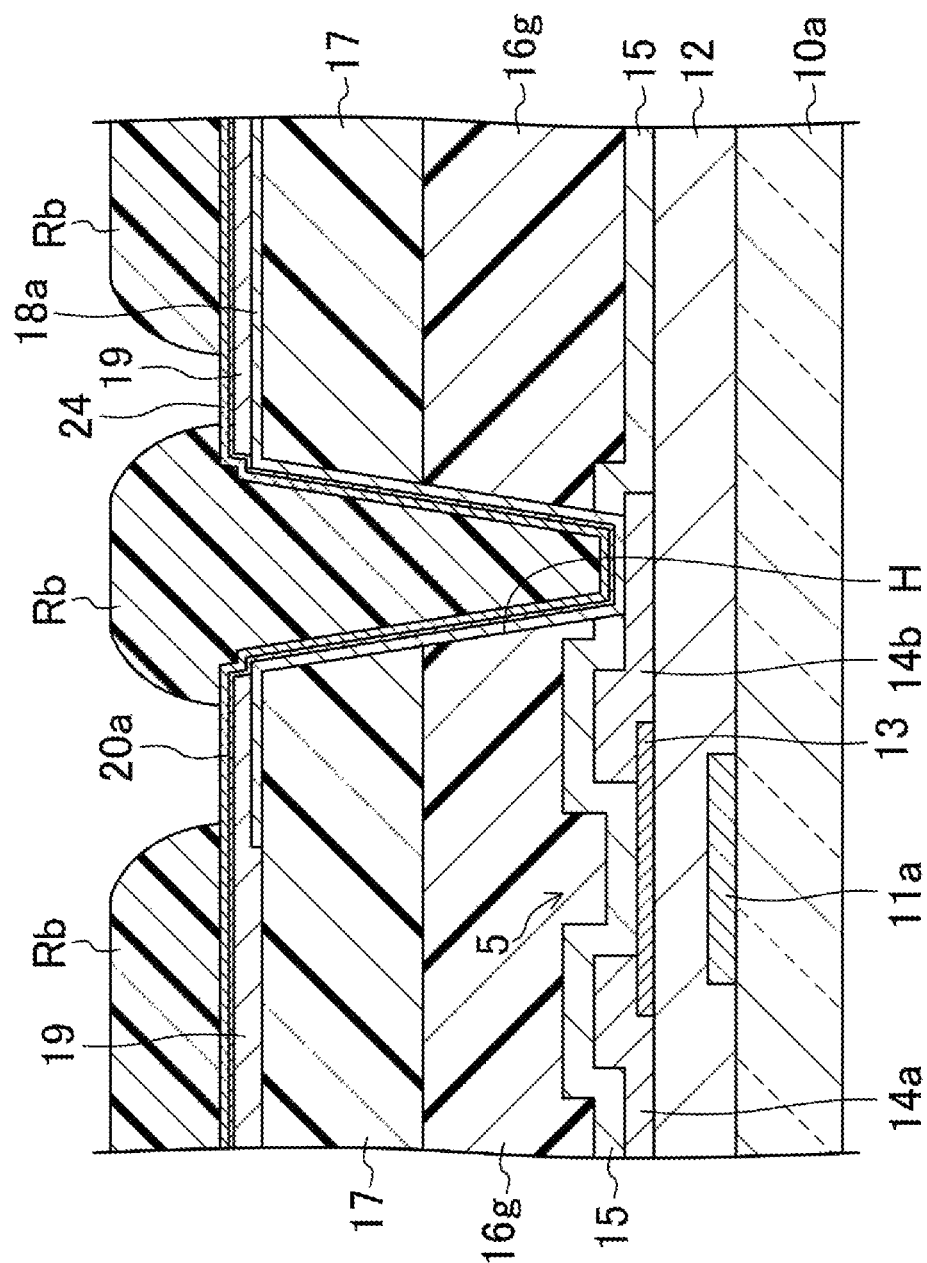
FIG. 25 is an 11th cross-sectional view of the portion corresponding to the portion illustrated in FIG. 2, subsequent to FIG. 23, illustrating part of the manufacturing process of the active matrix substrate that is a component of the liquid crystal display device according to the first embodiment of the disclosure.
Figure 26:
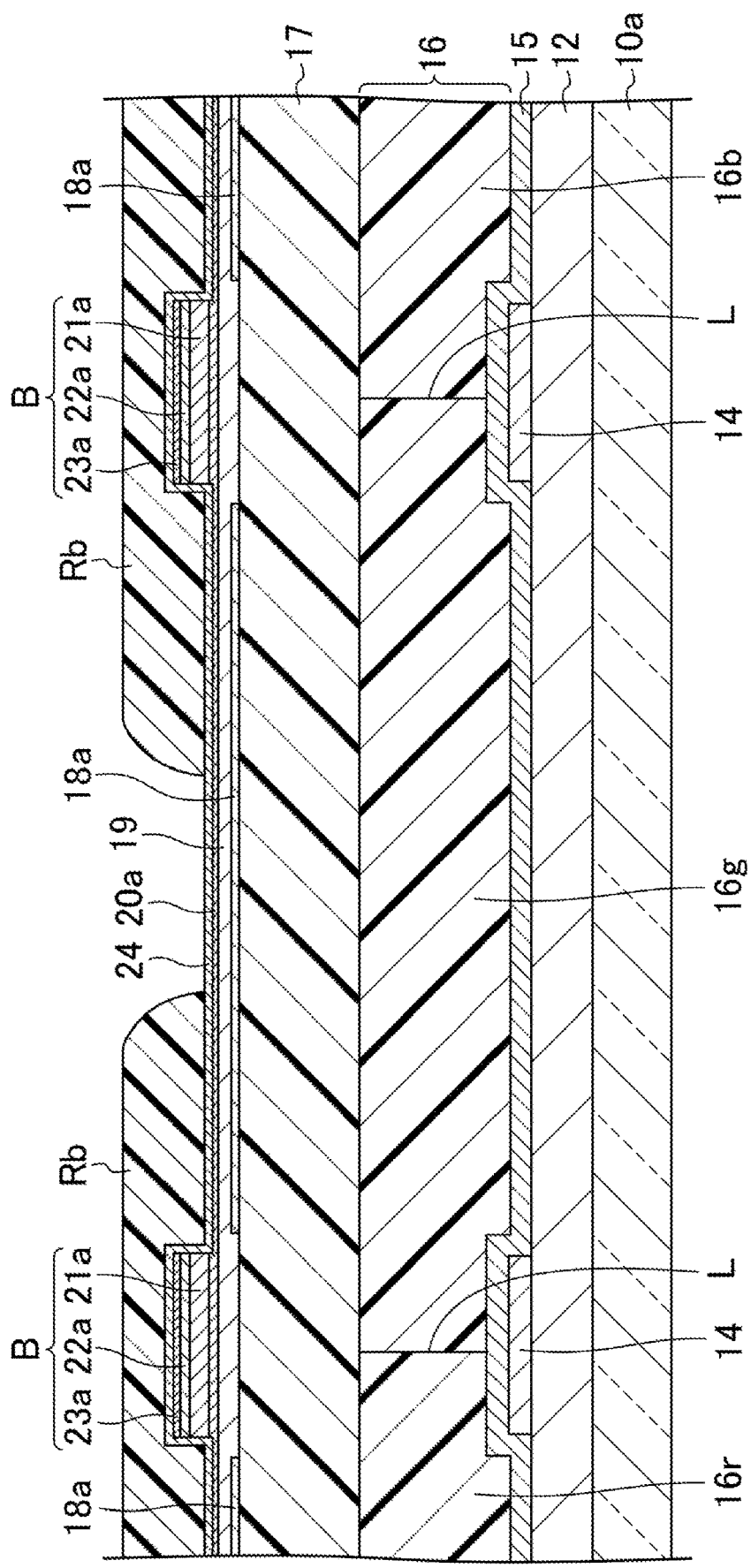
FIG. 26 is a 12th cross-sectional view of the portion corresponding to the portion illustrated in FIG. 3, subsequent to FIG. 24, illustrating part of the manufacturing process of the active matrix substrate that is a component of the liquid crystal display device according to the first embodiment of the disclosure.
Figure 27:
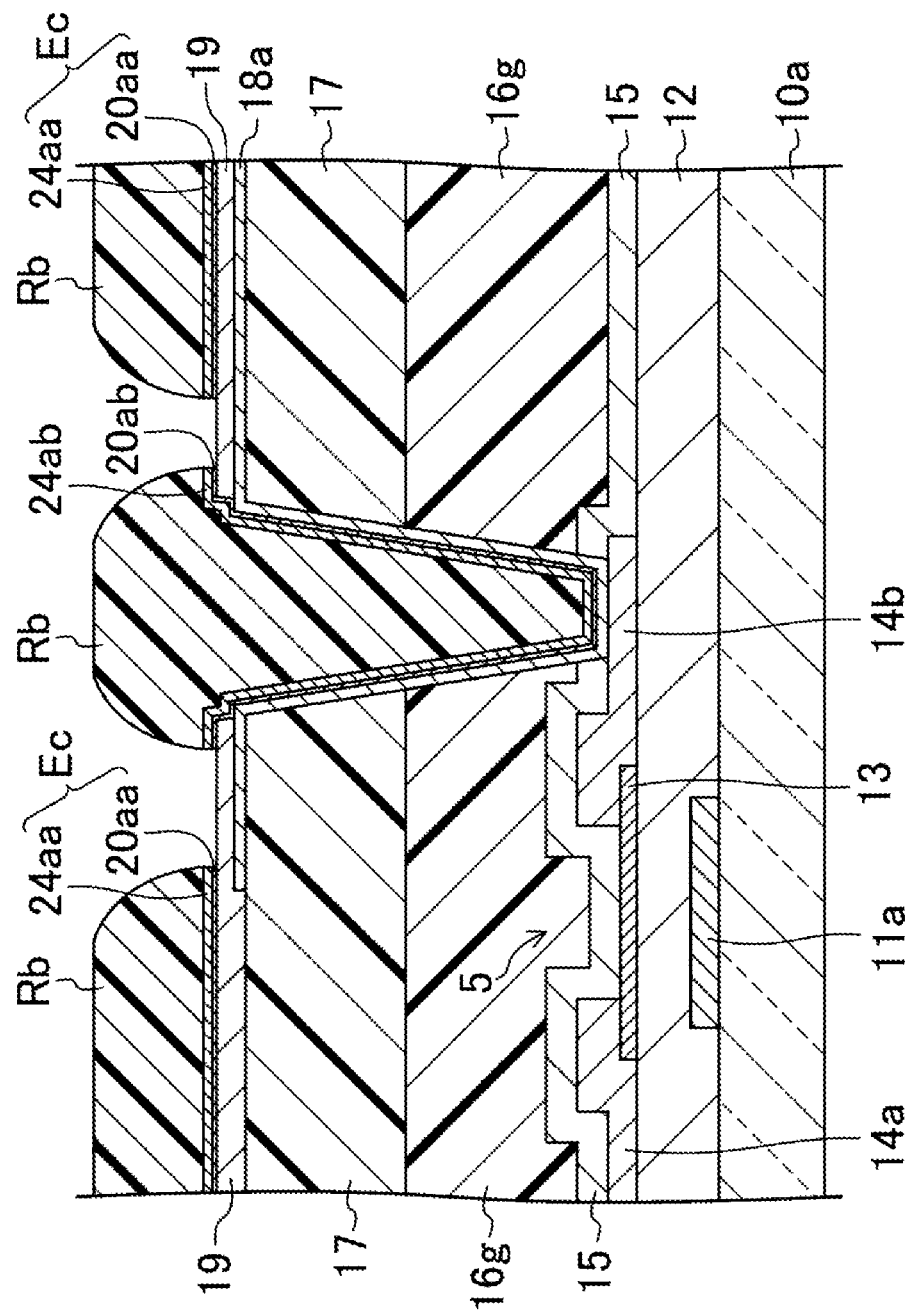
FIG. 27 is a 12th cross-sectional view of the portion corresponding to the portion illustrated in FIG. 2, subsequent to FIG. 25, illustrating part of the manufacturing process of the active matrix substrate that is a component of the liquid crystal display device according to the first embodiment of the disclosure.
Figure 28:
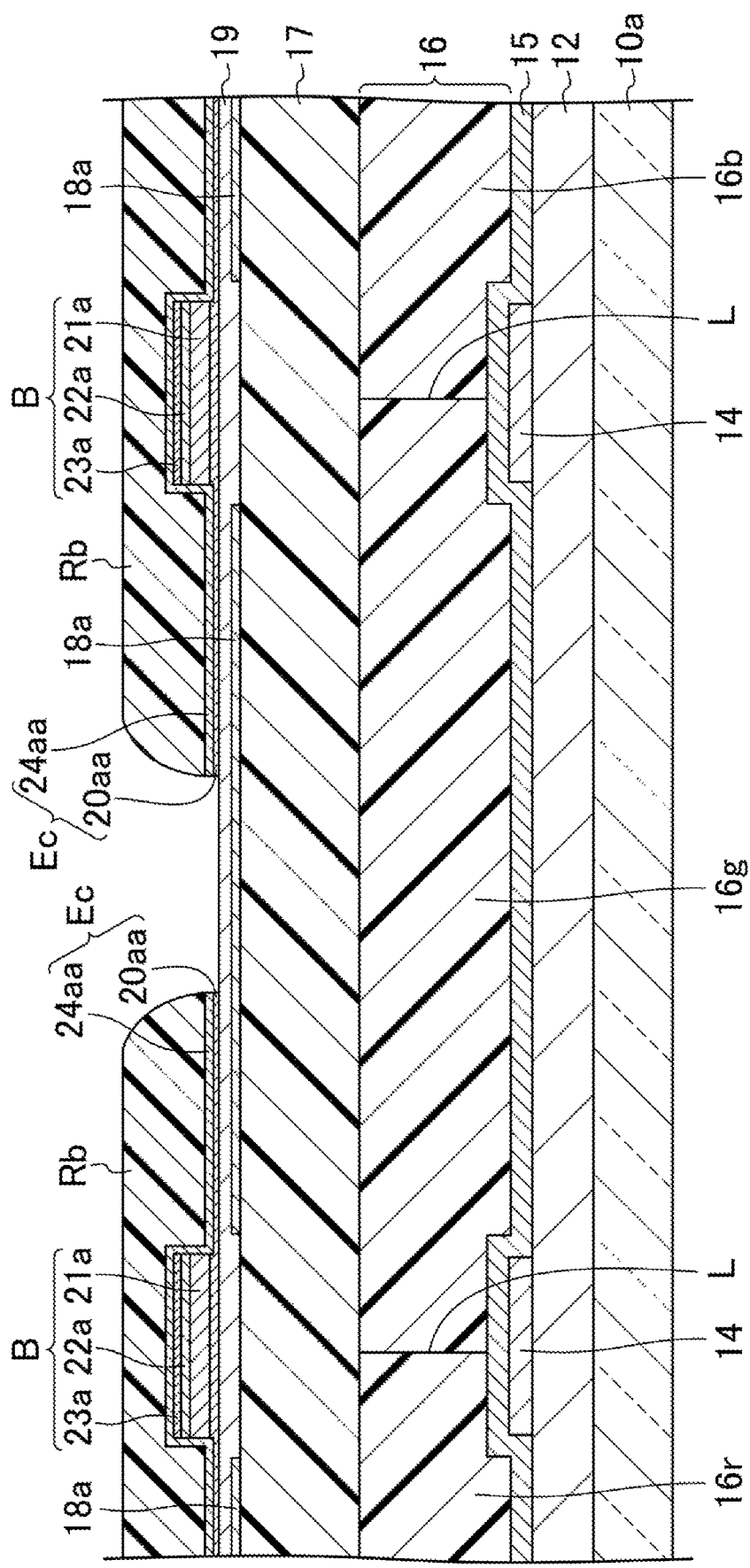
FIG. 28 is a 13th cross-sectional view of the portion corresponding to the portion illustrated in FIG. 3, subsequent to FIG. 26, illustrating part of the manufacturing process of the active matrix substrate that is a component of the liquid crystal display device according to the first embodiment of the disclosure.

Subsequently, as illustrated in FIGS. 25 and 26, resists Rb are formed by photolithography on the surface of the substrate on which the third transparent conductive film 24 is formed, and as illustrated in FIGS. 27 and 28, the third transparent conductive film 24 and the second transparent conductive film 20a exposed out of the resists Rb are subjected to wet etching using a mixed solution of phosphoric acid, nitric acid, and acetic acid, thereby forming the common electrode Ec by forming the second transparent electrode 20aa and the third transparent electrode 24aa, and forming the pixel electrode first protection layer 20ab and the pixel electrode second protection layer 24ab (second transparent electrode forming step).

Thereafter, an acrylic photosensitive resin (thickness of approximately 2.5 μm) is applied to the surface of the substrate on which the second transparent electrode 20aa and the like are formed by, for example, spin coating or slit coating, and the applied photosensitive resin is partially exposed and then patterned by developing, thereby forming the resin-filled layers 25.

Further, an inorganic insulating film (thickness of approximately 30 nm) such as a silicon nitride film is formed on the surface of the substrate on which the resin-filled layers 25 are formed by, for example, plasma CVD, thereby forming the surface protection film 26.

Finally, a polyimide resin film is applied to the entire substrate on which the surface protection film 26 is formed by, for example, a printing method, and then the resin film is subjected to baking and rubbing treatment, thereby forming the alignment film 27.

As described above, the active matrix substrate 30a can be manufactured.

Further, the active matrix substrate 30a manufactured as described above and the counter substrate 40 are bonded with a sealing member, and a liquid crystal material is sealed between the active matrix substrate 30a and the counter substrate 40 to form the liquid crystal layer 45, thereby manufacturing the liquid crystal display device 50.

As described above, according to the method of manufacturing the active matrix substrate 30a and the liquid crystal display device 50 of the present embodiment, the second transparent conductive film 20 is formed so as to cover the inorganic protection film 19 on the first transparent electrodes 18a (pixel electrodes Ep) in the second transparent conductive film forming step, the antireflection layers B are formed in each of which the first metal layer 21a, the inorganic insulating layer 22a, and the second metal layer 23a are layered in order on the second transparent conductive film 20 in the antireflection layer forming step, the third transparent conductive film 24 is formed so as to cover the antireflection layers B in the third transparent conductive film forming step, and the common electrode Ec is formed by patterning the second transparent conductive film 20 and the third transparent conductive film 24 to form the second transparent electrode 20aa and the third transparent electrode 24aa in the second transparent electrode forming step. In the antireflection layer forming step, when the first metal film 21, the inorganic insulating film 22, and the second metal film 23 formed in order are patterned by dry etching to form the first metal layers 21a, the inorganic insulating layers 22a, and the second metal layers 23a, the surface layer of the second transparent conductive film 20 exposed out of the resists Ra is etched, but the inorganic protection film 19 under the second transparent conductive film 20 (second transparent conductive film 20a) is not easily etched. In the second transparent electrode forming step, the second transparent conductive film 20a (having the surface layer etched) and the third transparent conductive film 24 are patterned by wet etching to form the second transparent electrode 20aa and the third transparent electrode 24aa. Thus, etching of the inorganic protection film 19 exposed out of the second transparent electrode 20aa is suppressed. Therefore, etching of the inorganic protection film 19 exposed out of the second transparent electrode 20aa when forming the antireflection layers B by dry etching can be suppressed. As a result, steps are less likely to be formed in the inorganic protection film 19 at the edges of the second transparent electrode 20aa, thereby suppressing the occurrence of light leakage due to alignment disorder of the liquid crystal layer 45.

Second Embodiment

Figure 29:
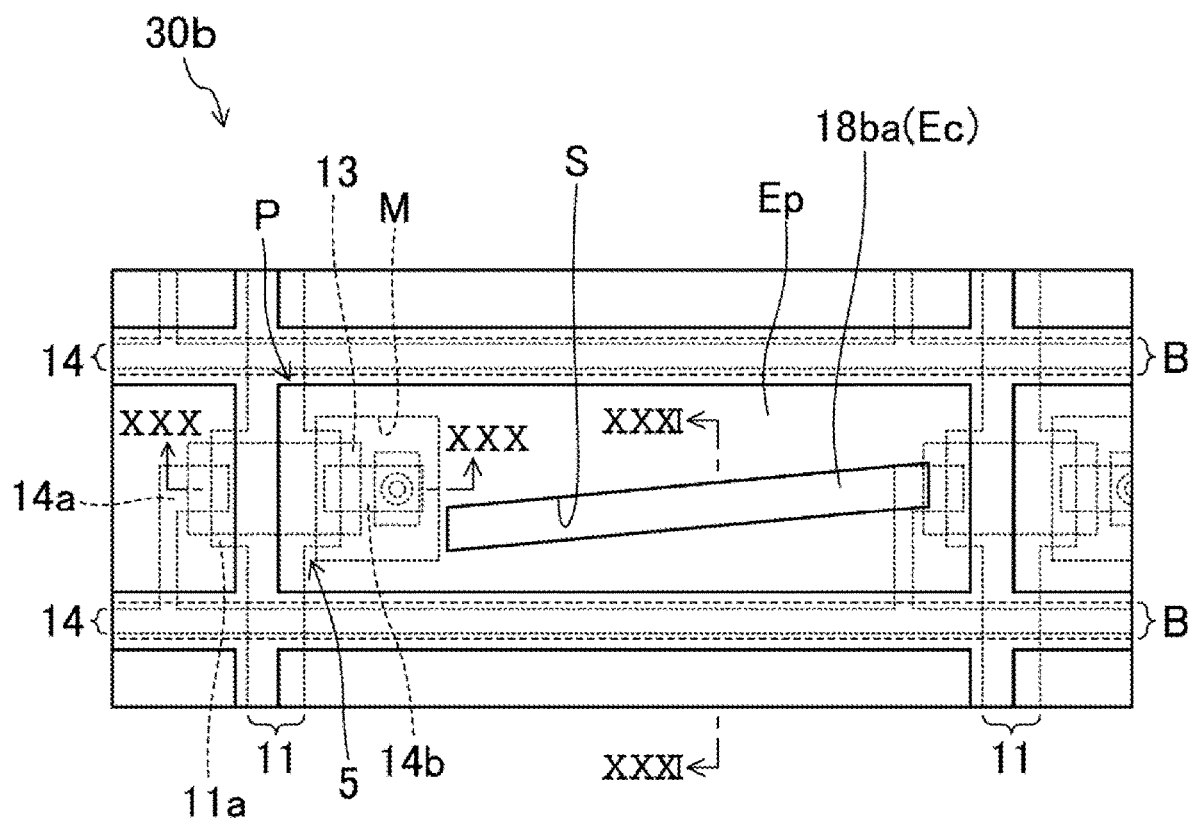
FIG. 29 is a plan view of an active matrix substrate that is a component of a liquid crystal display device according to a second embodiment of the disclosure.
Figure 30:
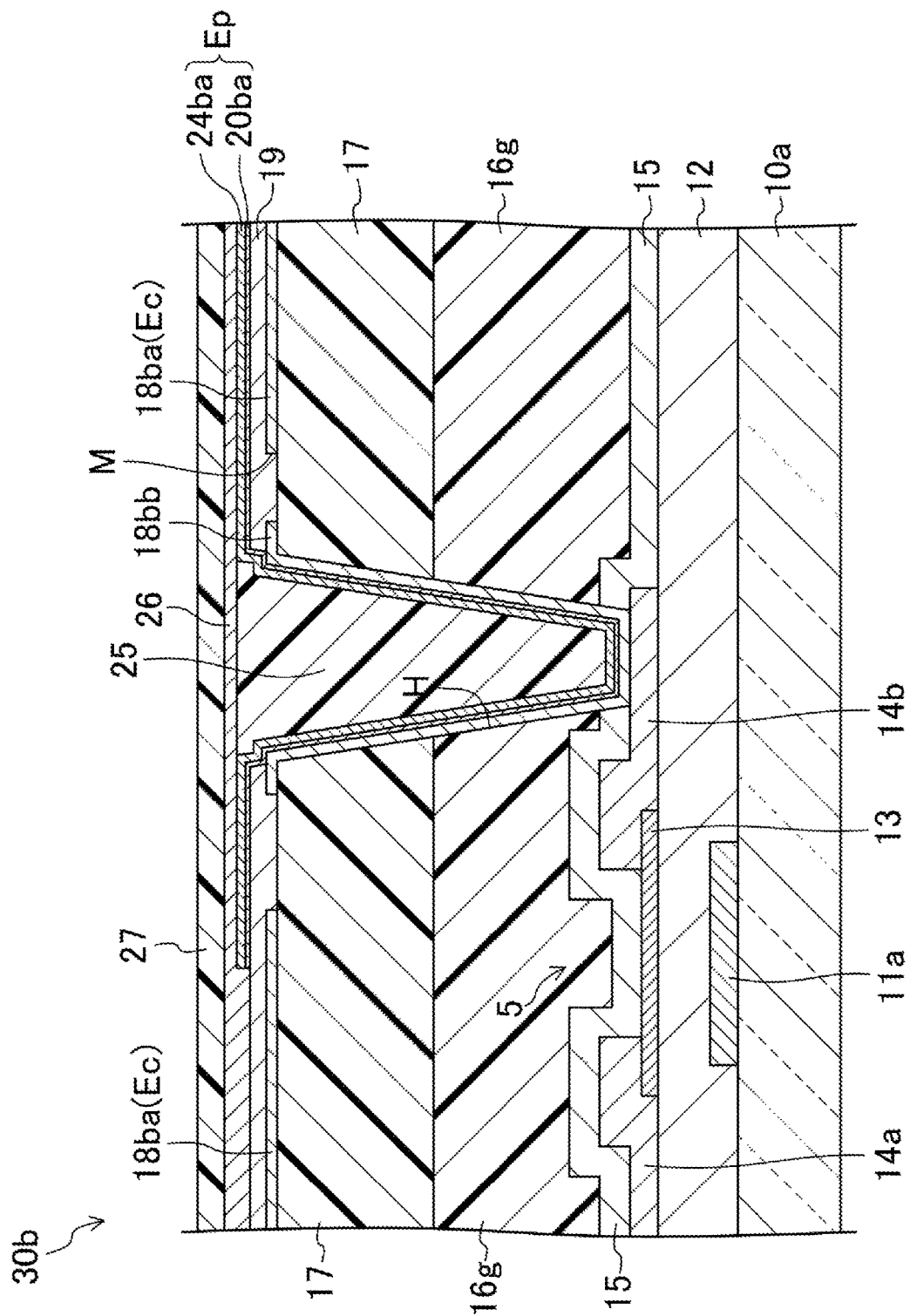
FIG. 30 is a cross-sectional view of the active matrix substrate taken along line XXX-XXX in FIG. 29.
Figure 31:
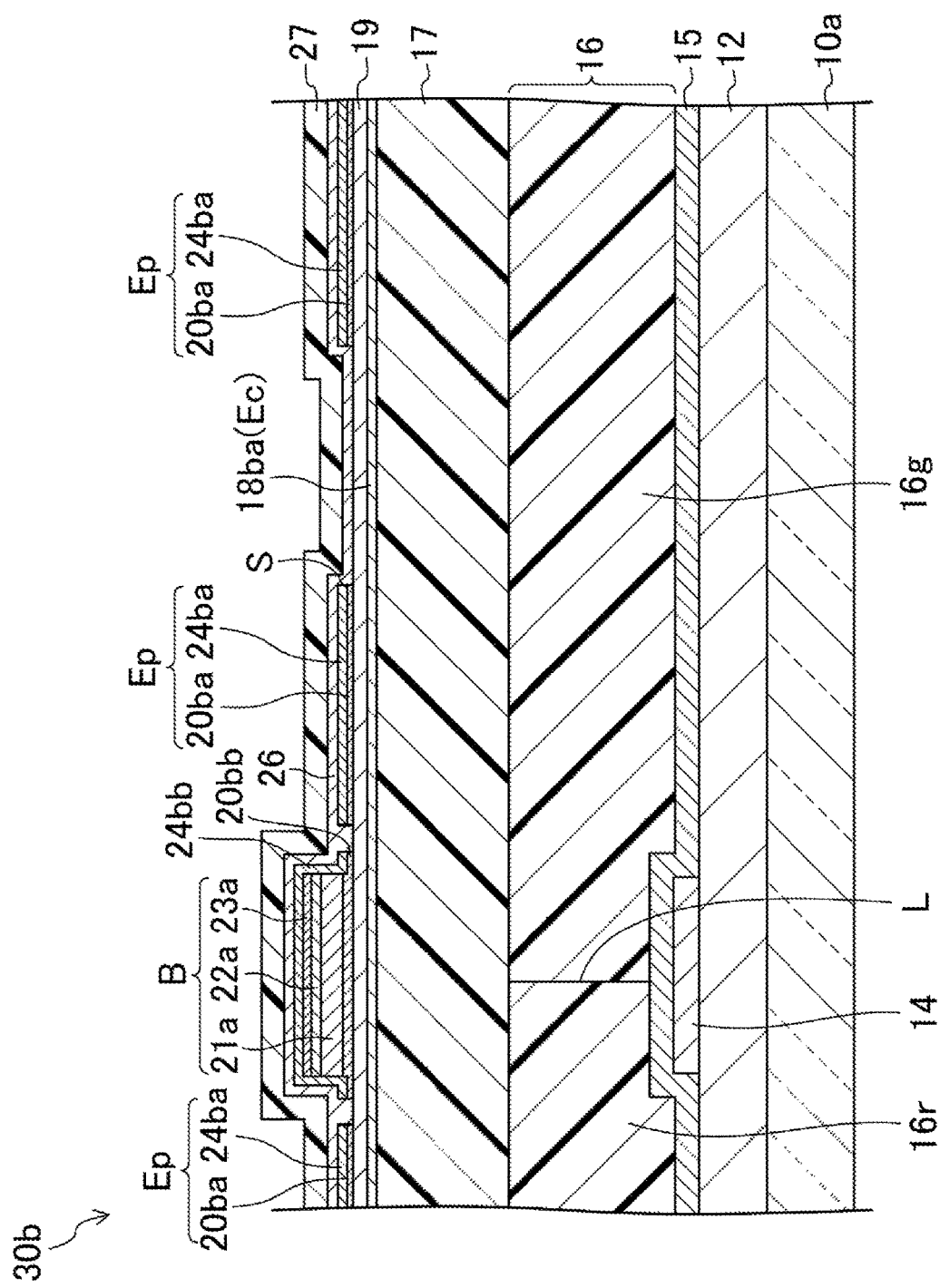
FIG. 31 is a cross-sectional view of the active matrix substrate taken along line XXXI-XXXI in FIG. 29.

FIGS. 29 to 47 illustrate a method of manufacturing an active matrix substrate and a liquid crystal display device according to a second embodiment of the disclosure. FIG. 29 is a plan view of an active matrix substrate 30b that is a component of the liquid crystal display device according to the present embodiment. FIGS. 30 and 31 are cross-sectional views of the active matrix substrate 30b taken along line XXX-XXX and line XXXI-XXXI in FIG. 29. Note that, in each of the following embodiments, the same portions as those in FIG. 1 to FIG. 28 are denoted by the same reference signs, and the detailed description of these portions are omitted.

In the first embodiment, the liquid crystal display device 50 including the active matrix substrate 30a in which the common electrode Ec is provided above the pixel electrodes Ep and the slits S are formed in the common electrode Ec is exemplified. In the present embodiment, the liquid crystal display device including the active matrix substrate 30b in which pixel electrodes Ep are provided above a common electrode Ec and slits S are formed in the pixel electrodes Ep.

The liquid crystal display device according to the present embodiment includes the active matrix substrate 30b having a COA structure, a counter substrate 40 (see FIG. 3) provided so as to face the active matrix substrate 30b, and a liquid crystal layer 45 (see FIG. 3) provided between the active matrix substrate 30b and the counter substrate 40. In the liquid crystal display device according to the present embodiment, multiple subpixels P are arranged in a matrix in a display region D, as in the liquid crystal display device 50 according to the first embodiment. In the display region D, as in the liquid crystal display device 50 according to the first embodiment, subpixels P having red layers 16r, subpixels P having green layers 16g, and subpixels P having blue layers 16b are provided so as to be adjacent to one another.

As illustrated in FIG. 30, the active matrix substrate 30b includes a base substrate 10a such as a glass substrate, multiple TFTs 5 provided on the base substrate 10a corresponding to the multiple subpixels P, color filters 16 provided on the TFTs 5, respectively, an organic protection film 17 provided on the color filters 16, a common electrode Ec provided on the organic protection film 17, an inorganic protection film 19 provided on the common electrode Ec, multiple pixel electrodes Ep provided on the inorganic protection film 19, a surface protection film 26 provided on the pixel electrodes Ep, and an alignment film 27 provided on the surface protection film 26. As illustrated in FIG. 29, the active matrix substrate 30b includes, on the base substrate 10a in the display region D, multiple gate lines 11 extending parallel to each other in the Y direction in the figure, and multiple source lines 14 extending parallel to each other in the X direction in the figure so as to intersect the gate lines 11 with a gate insulating film 12 interposed therebetween.

As illustrated in FIGS. 29 to 31, the common electrode Ec is constituted by a first transparent electrode 18ba provided in a rectangular shape on the organic protection film 17. The common electrode Ec is provided in common to the multiple subpixels P. The common electrode Ec constitutes an auxiliary capacity of each subpixel P together with the pixel electrode Ep and the inorganic protection film 19 provided between the common electrode Ec and the pixel electrode Ep. As illustrated in FIGS. 29 and 30, openings M are formed in the common electrode Ec so as to overlap contact holes H. As illustrated in FIG. 30, inside the opening M of the common electrode Ec, a relay layer 18bb formed in the same layer with the same material as the first transparent electrode 18ba is provided apart from the common electrode Ec so as to overlap a bottom face and a side surface of the contact hole H.

As illustrated in FIGS. 30 and 31, the pixel electrode Ep is constituted by a second transparent electrode 20ba provided on the inorganic protection film 19 and a third transparent electrode 24ba provided on the second transparent electrode 20ba. As illustrated in FIG. 29, one pixel electrode Ep is provided for each subpixel P. As illustrated in FIGS. 29 and 31, the pixel electrode Ep is provided with a slit S for aligning the liquid crystal layer 45. The second transparent electrode 20ba and the third transparent electrode 24ba have the same shape in a plan view. Between a second transparent conductive layer 20bb formed in the same layer with the same material as the second transparent electrode 20ba and a third transparent conductive layer 24bb formed in the same layer with the same material as the third transparent electrode 24ba, an antireflection layer B is provided on the second transparent conductive layer 20bb so as to overlap a boundary portion L between any two of the red layer 16r, the green layer 16g, and the blue layer 16b, as illustrated in FIG. 31. As illustrated in FIG. 31, the second transparent conductive layer 20bb, the antireflection layer B, and the third transparent conductive layer 24bb are layered in order on the inorganic protection film 19, and the third transparent conductive layer 24bb is provided so as to cover the antireflection layer B. Therefore, as illustrated in FIG. 31, the second transparent conductive layer 20bb is provided so as to be in contact with a first metal layer 21a of the antireflection layer B, and the third transparent conductive layer 24bb is provided so as to be in contact with a second metal layer 23a of the antireflection layer B. In the second transparent conductive layer 20bb, a film thickness of a portion in contact with the first metal layer 21a (e.g., approximately 70 nm) is larger than a film thickness of a portion not in contact with the first metal layer 21a (e.g., approximately 50 nm). As illustrated in FIG. 30, a resin-filled layer 25 is provided between a concave-shaped layered body of the second transparent electrode 20ba and the third transparent electrode 24ba and the surface protection film 26.

In the liquid crystal display device of the present embodiment, as in the liquid crystal display device 50 of the first embodiment, a predetermined voltage is applied to the liquid crystal layer 45 disposed between each pixel electrode Ep and the common electrode Ec and to the auxiliary capacity, and the alignment state of the liquid crystal layer 45 is changed by an electrical field generated in a direction along the surface of the substrate, that is, in a transverse direction, thereby adjusting the transmittance of light passing through the panel of each subpixel P to display images.

Next, a method of manufacturing the liquid crystal display device of the present embodiment will be described, focusing on a method of manufacturing the active matrix substrate 30b. FIGS. 32, 34, 36, 38, 41, 44, and 46 are first to seventh cross-sectional views of a portion corresponding to the portion illustrated in FIG. 30 sequentially illustrating the manufacturing process of the active matrix substrate 30b. FIGS. 33, 35, 37, 39, 40, 42, 43, 45, and 47 are first to ninth cross-sectional views of a portion corresponding to the portion illustrated in FIG. 31, sequentially illustrating the manufacturing process of the active matrix substrate 30b.

Figure 32:
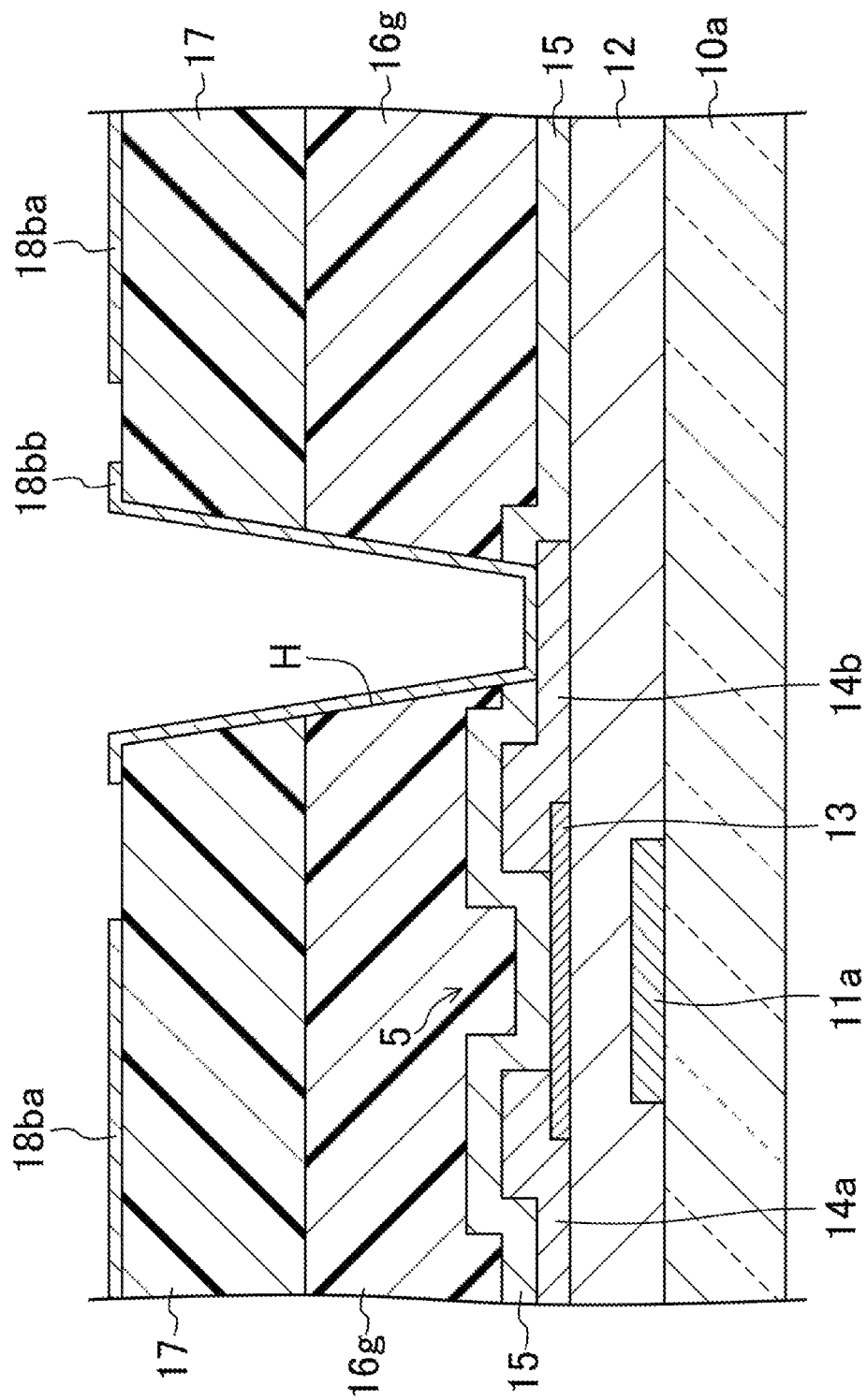
FIG. 32 is a first cross-sectional view of a portion corresponding to the portion illustrated in FIG. 30, illustrating part of a manufacturing process of the active matrix substrate that is a component of the liquid crystal display device according to the second embodiment of the disclosure.
Figure 33:
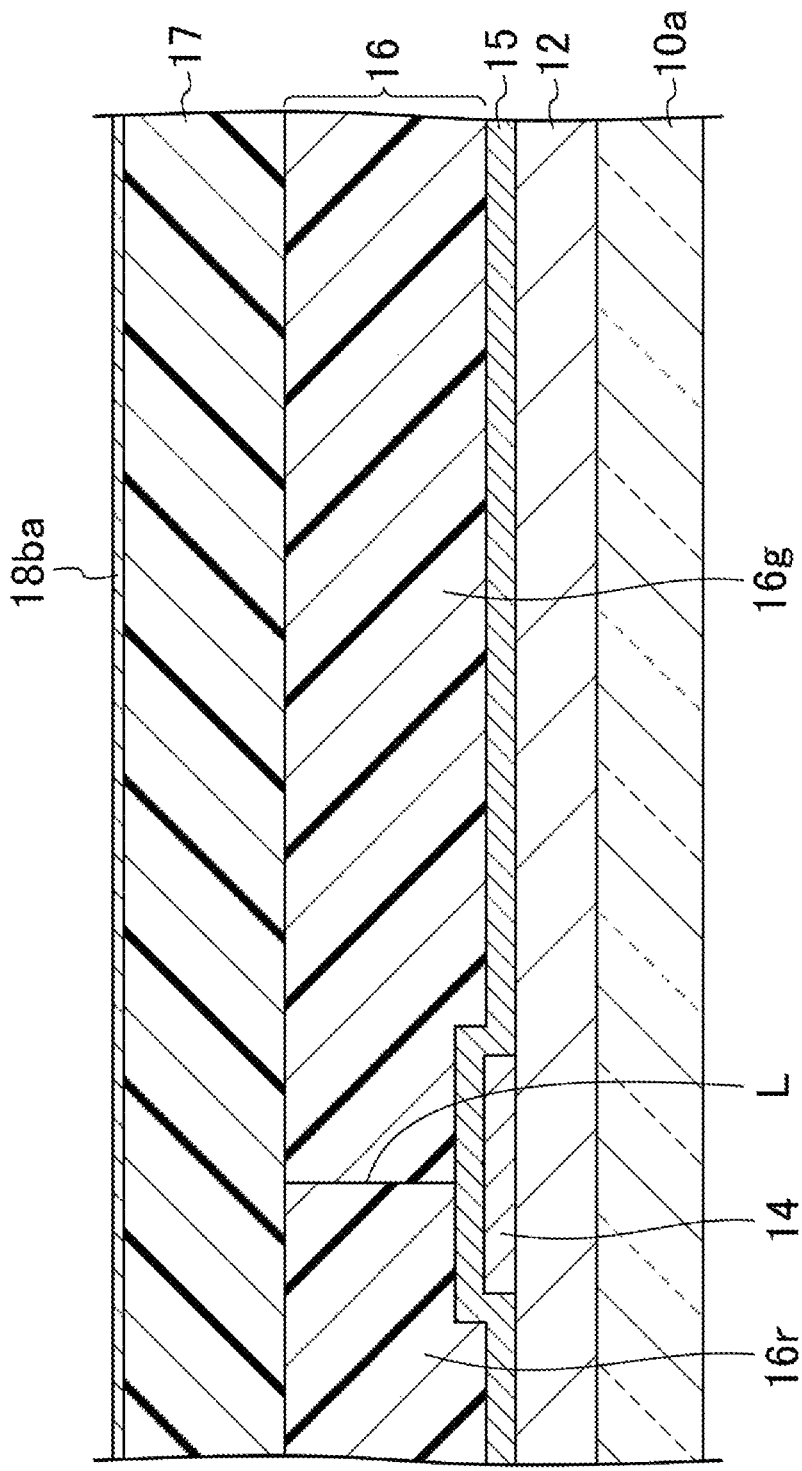
FIG. 33 is a first cross-sectional view of a portion corresponding to the portion illustrated in FIG. 31, illustrating part of the manufacturing process of the active matrix substrate that is a component of the liquid crystal display device according to the second embodiment of the disclosure.

First, in the method of manufacturing the active matrix substrate 30a according to the first embodiment, a first transparent conductive film 18 (see FIGS. 9 and 10) such as an ITO film or an IZO film is formed on the surface of the substrate on which the contact holes H are formed in an interlayer insulating film 15 by, for example, sputtering, and then the first transparent conductive film 18 is subjected to photolithography, etching, and resist stripping and cleaning, thereby forming the first transparent electrode 18ba (common electrode Ec) and the relay layers 18bb as illustrated in FIGS. 32 and 33 (first transparent electrode forming step).

Figure 34:
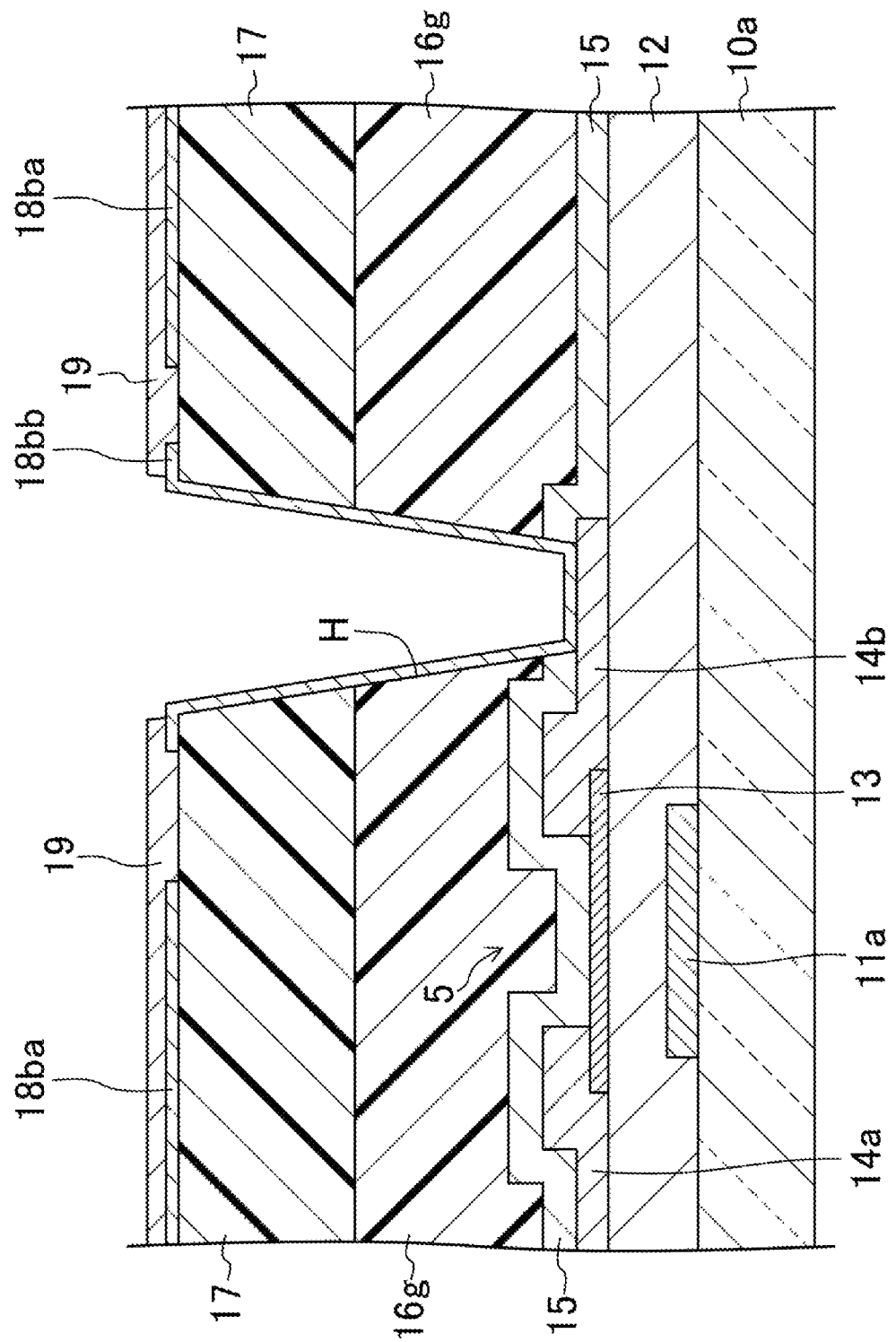
FIG. 34 is a second cross-sectional view of the portion corresponding to the portion illustrated in FIG. 30, subsequent to FIG. 32, illustrating part of the manufacturing process of the active matrix substrate that is a component of the liquid crystal display device according to the second embodiment of the disclosure.
Figure 35:
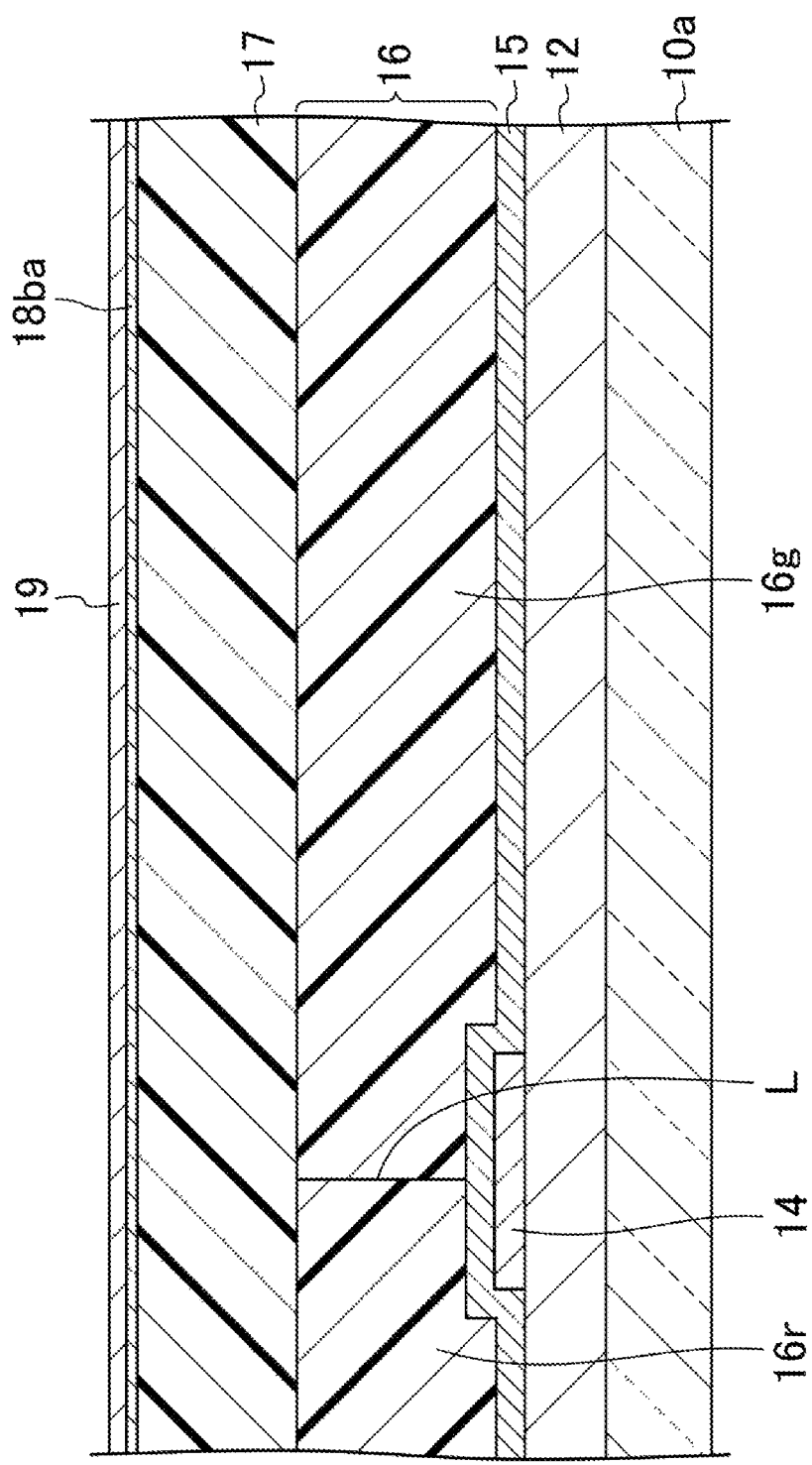
FIG. 35 is a second cross-sectional view of the portion corresponding to the portion illustrated in FIG. 31, subsequent to FIG. 33, illustrating part of the manufacturing process of the active matrix substrate that is a component of the liquid crystal display device according to the second embodiment of the disclosure.

Thereafter, an inorganic insulating film (thickness of approximately 100 nm) such as a silicon nitride film is formed on the surface of the substrate on which the first transparent electrode 18ba and the like are formed by, for example, plasma CVD, and then the inorganic insulating film is subjected to photolithography, etching, and resist stripping and cleaning, thereby forming the inorganic protection film 19 as illustrated in FIGS. 34 and 35 (inorganic protection film forming step).

Figure 36:
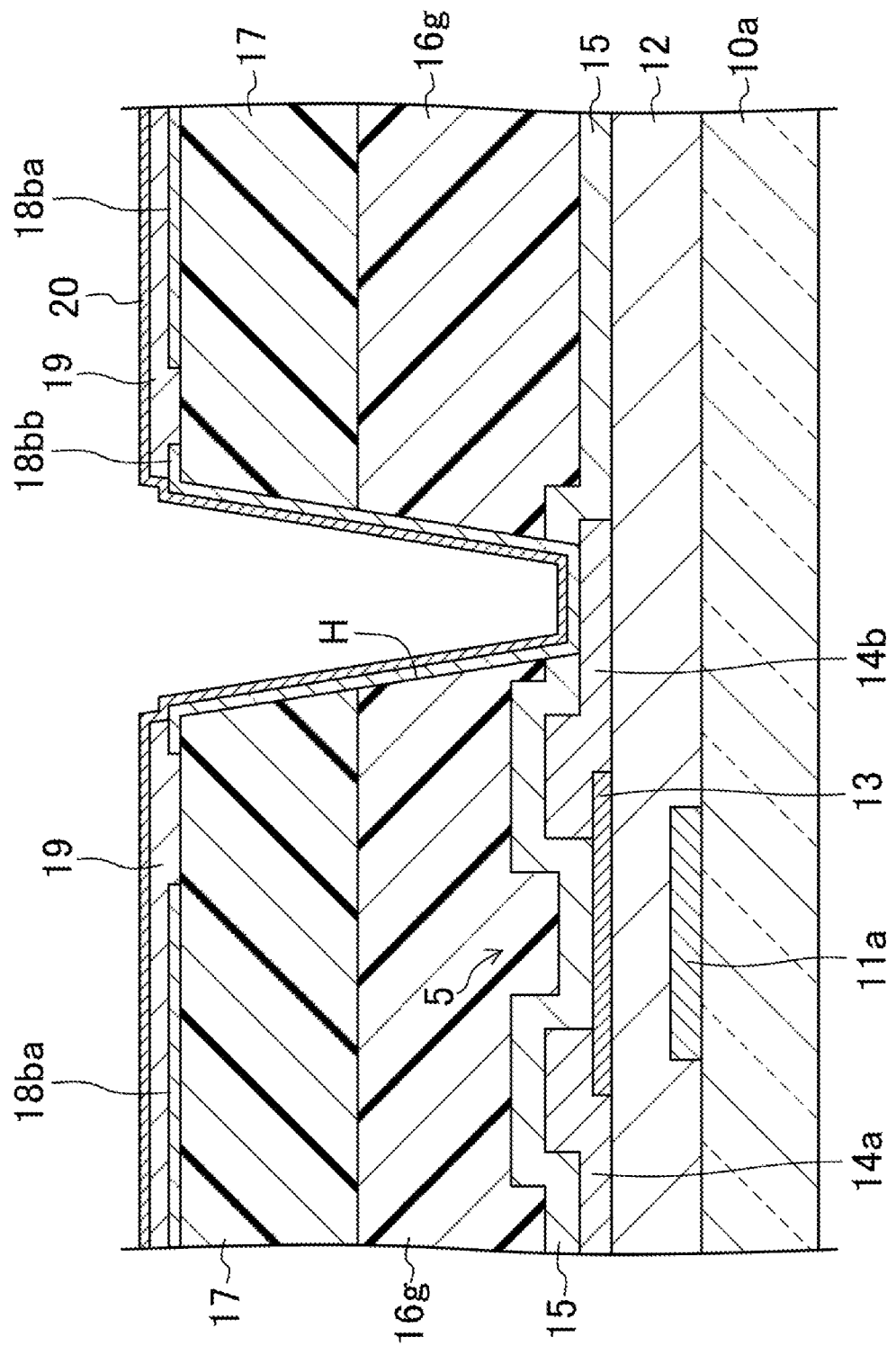
FIG. 36 is a third cross-sectional view of the portion corresponding to the portion illustrated in FIG. 30, subsequent to FIG. 34, illustrating part of the manufacturing process of the active matrix substrate that is a component of the liquid crystal display device according to the second embodiment of the disclosure.
Figure 37:
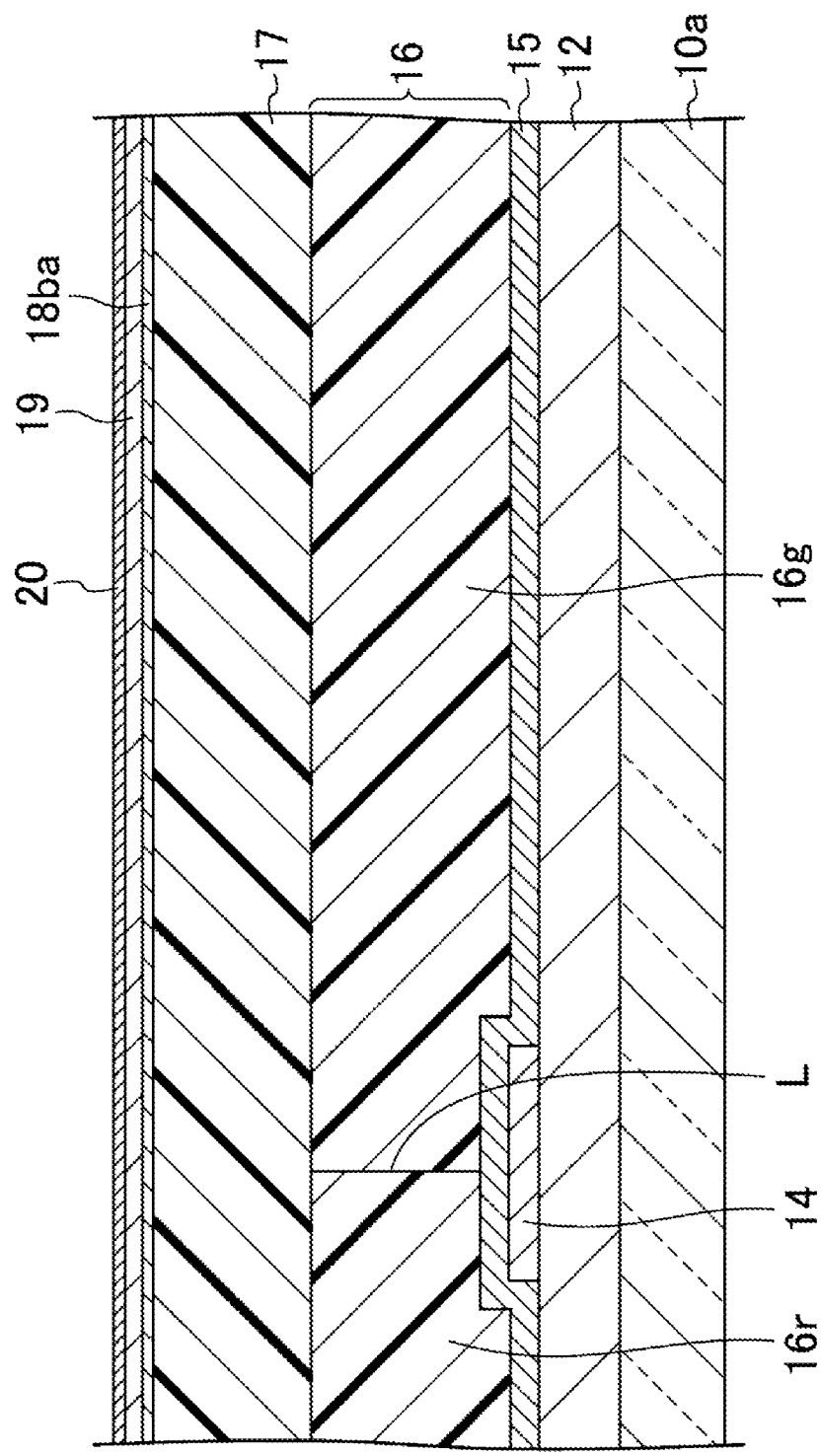
FIG. 37 is a third cross-sectional view of the portion corresponding to the portion illustrated in FIG. 31, subsequent to FIG. 35, illustrating part of the manufacturing process of the active matrix substrate that is a component of the liquid crystal display device according to the second embodiment of the disclosure.

Further, as illustrated in FIGS. 36 and 37, a second transparent conductive film 20 (thickness of approximately 70 nm) such as an IZO film is formed on the surface of the substrate on which the second inorganic protection film 19 is formed by, for example, sputtering (second transparent conductive film forming step).

Figure 38:
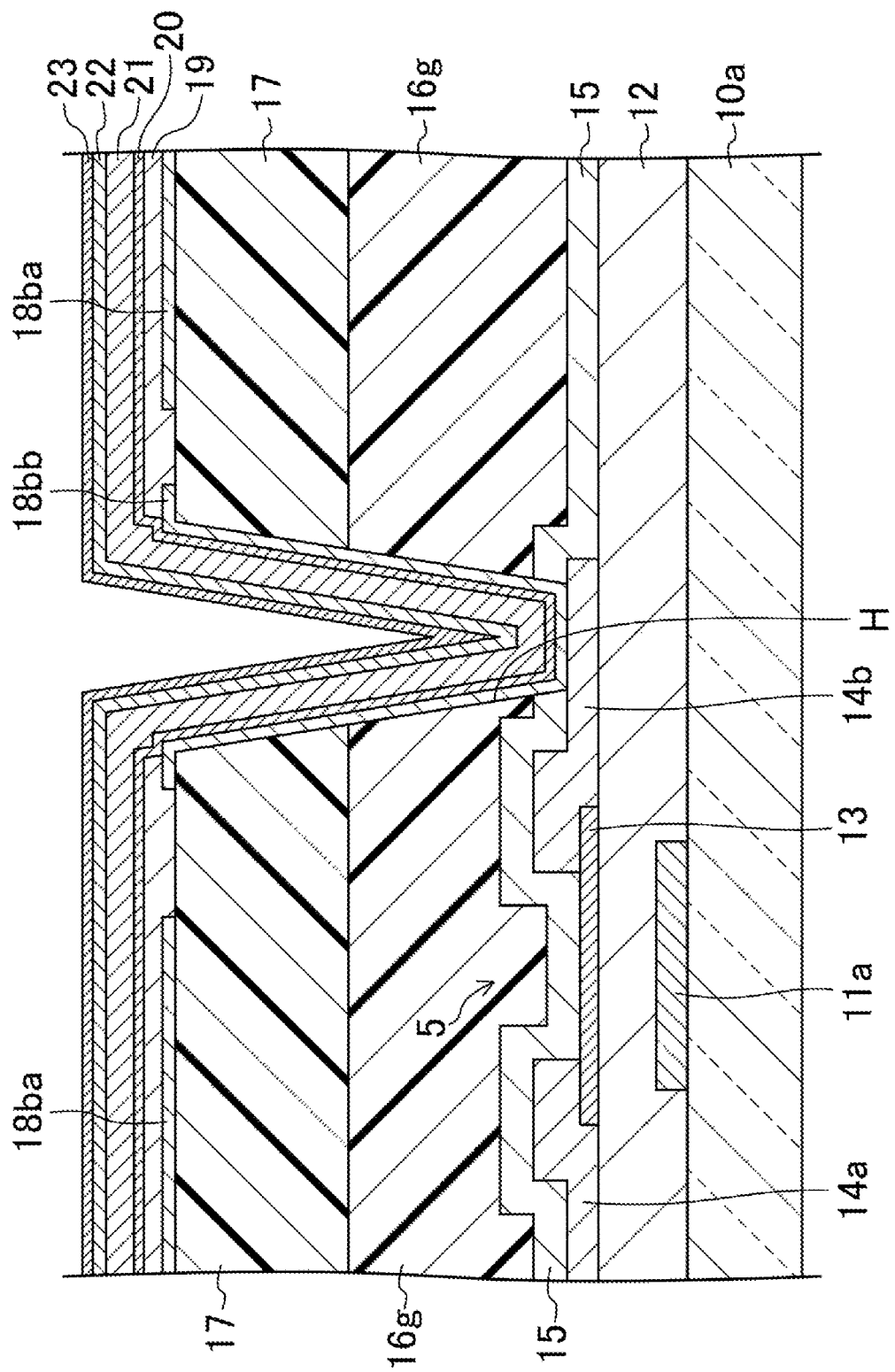
FIG. 38 is a fourth cross-sectional view of the portion corresponding to the portion illustrated in FIG. 30, subsequent to FIG. 36, illustrating part of the manufacturing process of the active matrix substrate that is a component of the liquid crystal display device according to the second embodiment of the disclosure.
Figure 39:
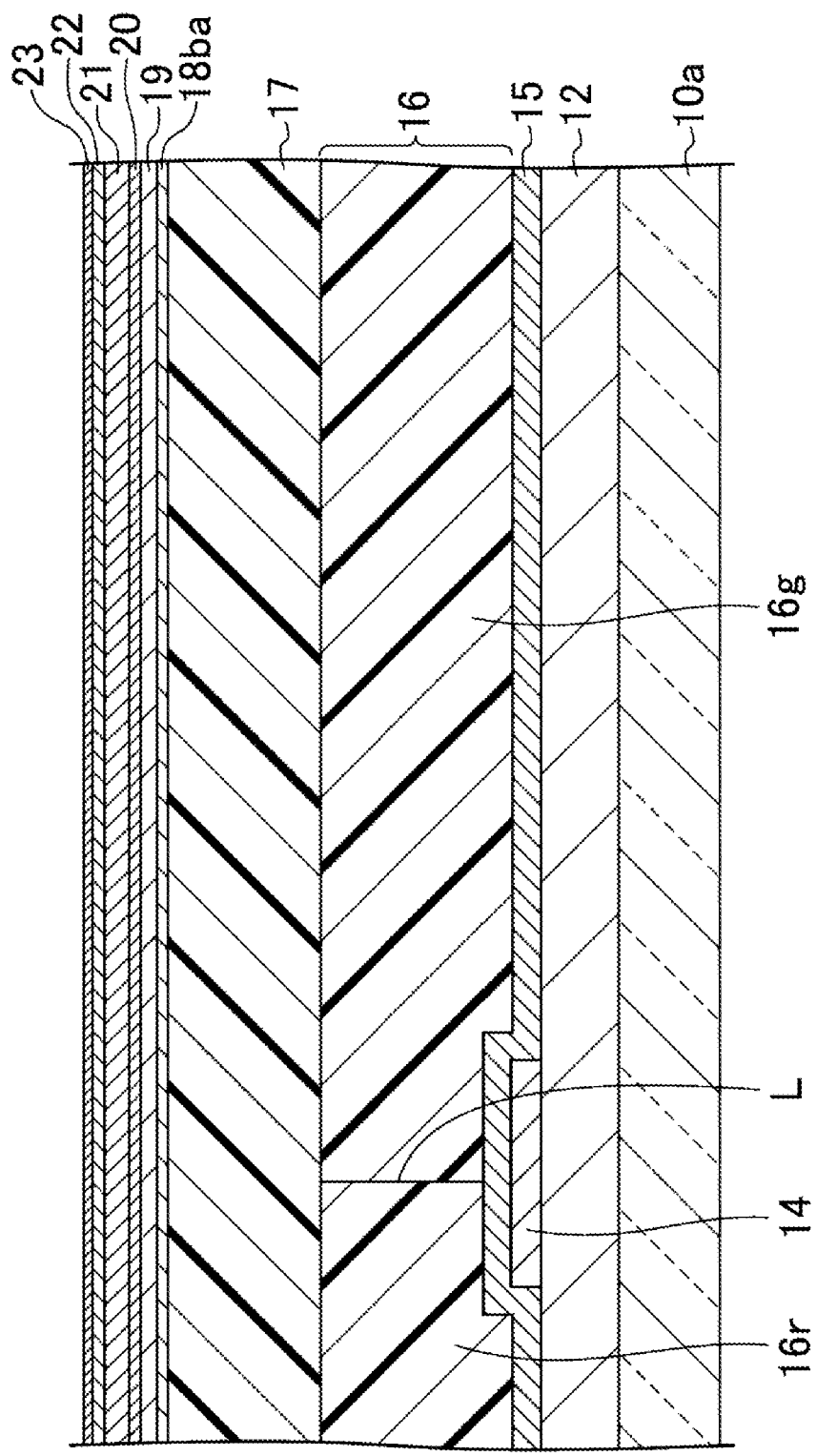
FIG. 39 is a fourth cross-sectional view of the portion corresponding to the portion illustrated in FIG. 31, subsequent to FIG. 37, illustrating part of the manufacturing process of the active matrix substrate that is a component of the liquid crystal display device according to the second embodiment of the disclosure.

Subsequently, as illustrated in FIGS. 38 and 39, a first metal film (thickness of approximately 100 nm) 21 such as a tungsten film, an inorganic insulating film (thickness of approximately 60 nm) 22 such as a silicon nitride film, and a second metal film (thickness of approximately 5 nm) 23 such as a tungsten film are formed on the surface of the substrate on which the second transparent conductive film 20 is formed by, for example, sputtering, plasma CVD, and sputtering in order.

Figure 40:
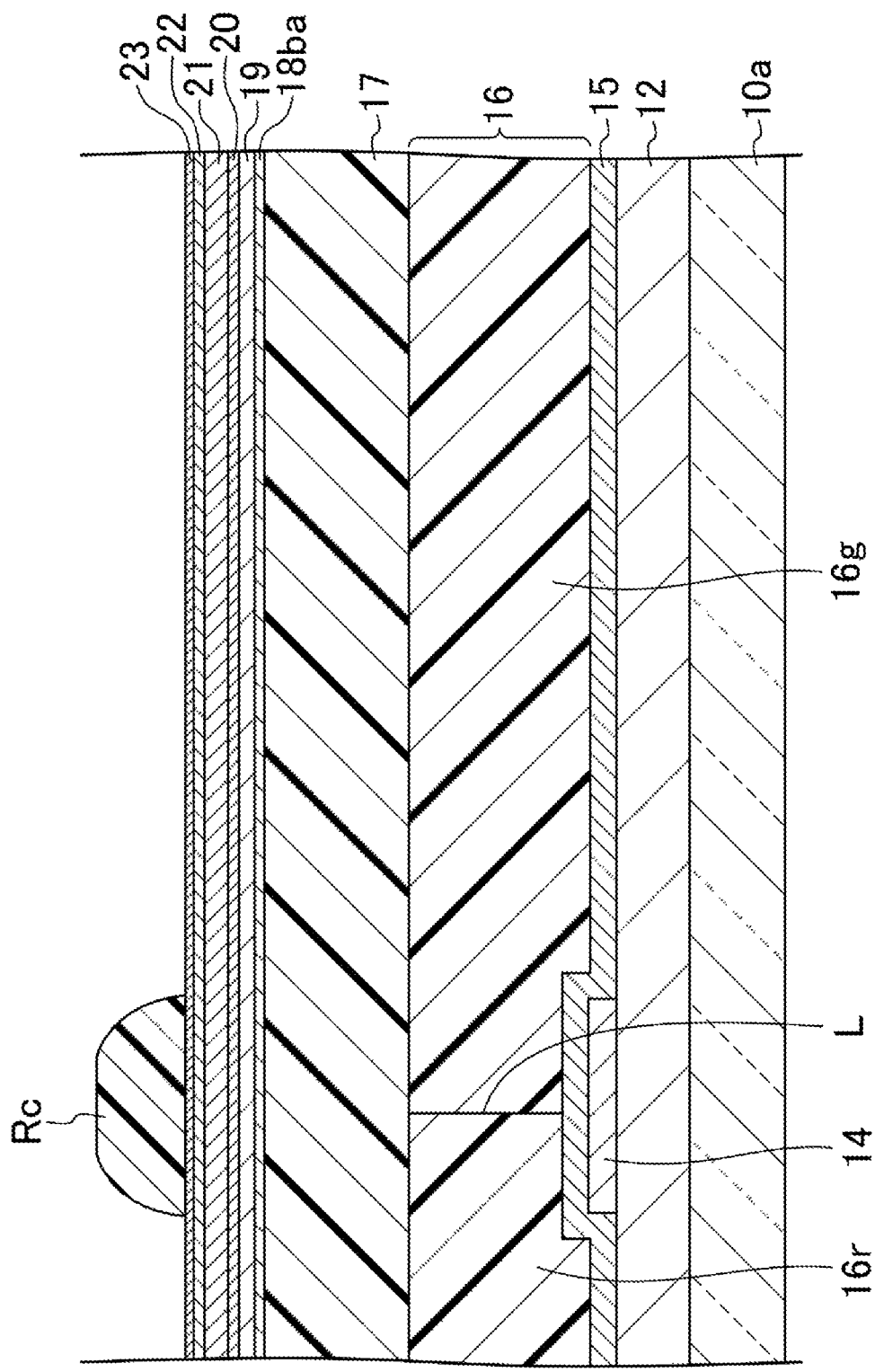
FIG. 40 is a fifth cross-sectional view of the portion corresponding to the portion illustrated in FIG. 31, subsequent to FIG. 39, illustrating part of the manufacturing process of the active matrix substrate that is a component of the liquid crystal display device according to the second embodiment of the disclosure.
Figure 41:
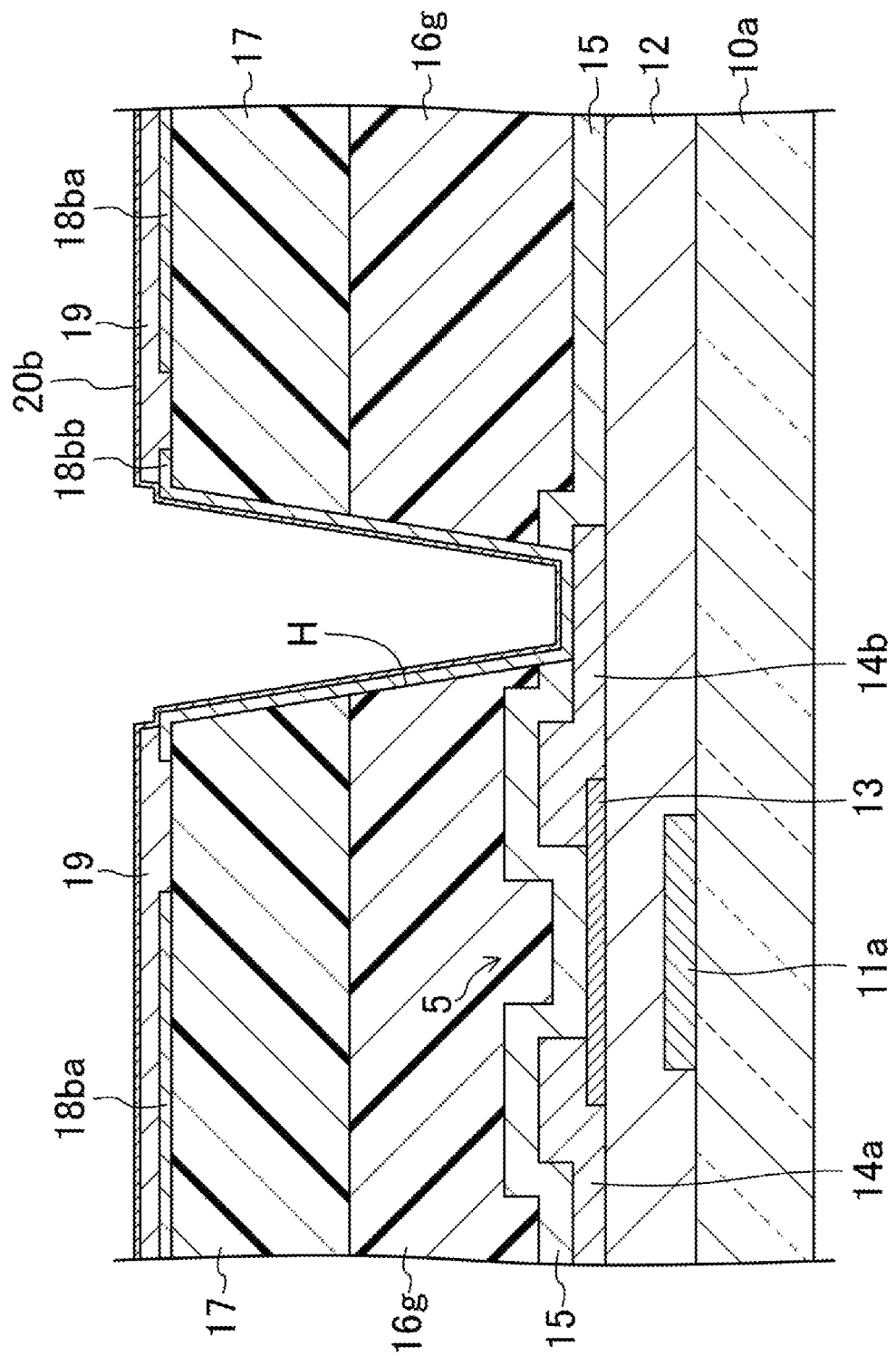
FIG. 41 is a fifth cross-sectional view of the portion corresponding to the portion illustrated in FIG. 30, subsequent to FIG. 38 illustrating part of the manufacturing process of the active matrix substrate that is a component of the liquid crystal display device according to the second embodiment of the disclosure.
Figure 42:
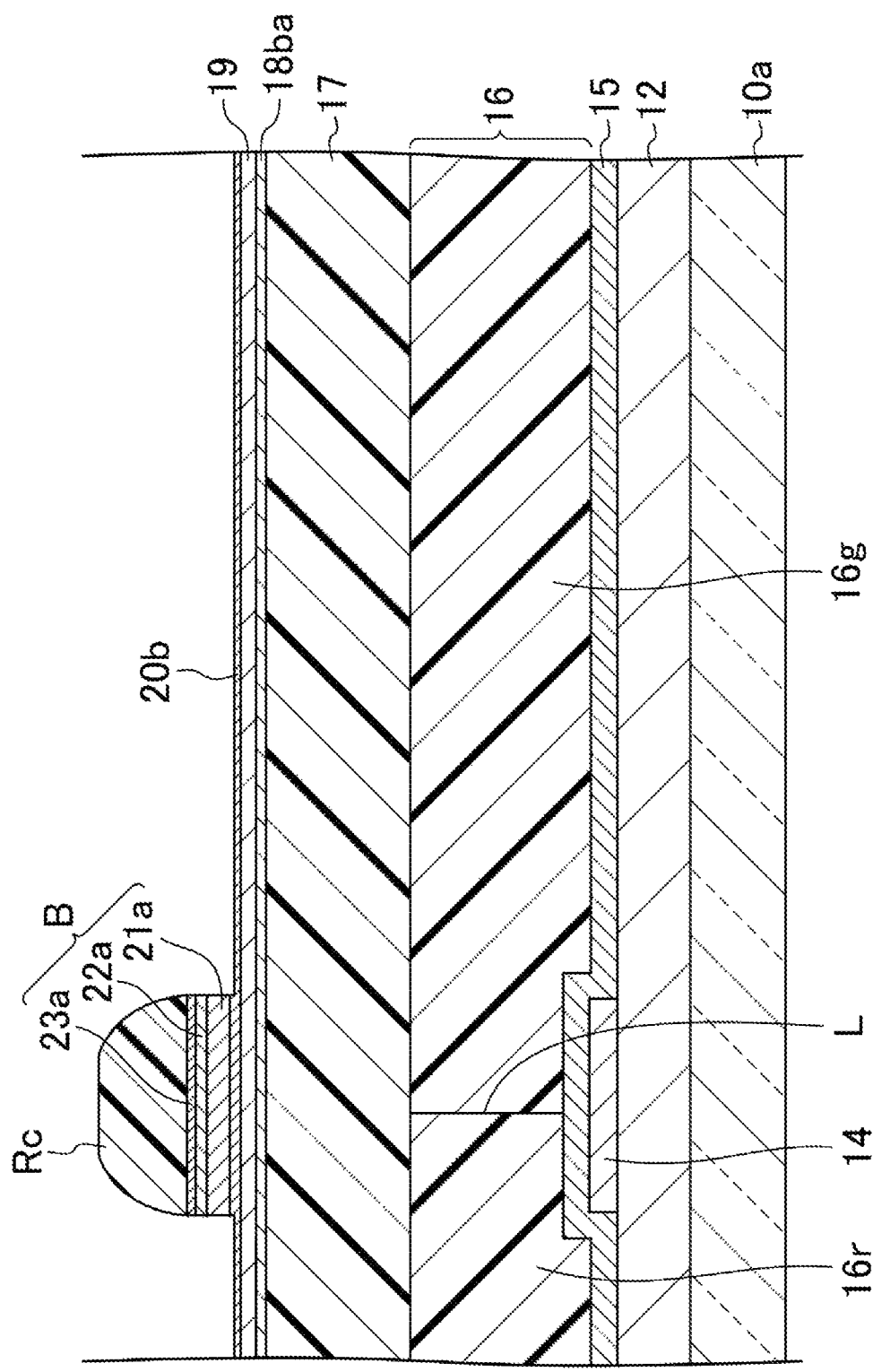
FIG. 42 is a sixth cross-sectional view of the portion corresponding to the portion illustrated in FIG. 31, subsequent to FIG. 40, illustrating part of the manufacturing process of the active matrix substrate that is a component of the liquid crystal display device according to the second embodiment of the disclosure.
Figure 43:
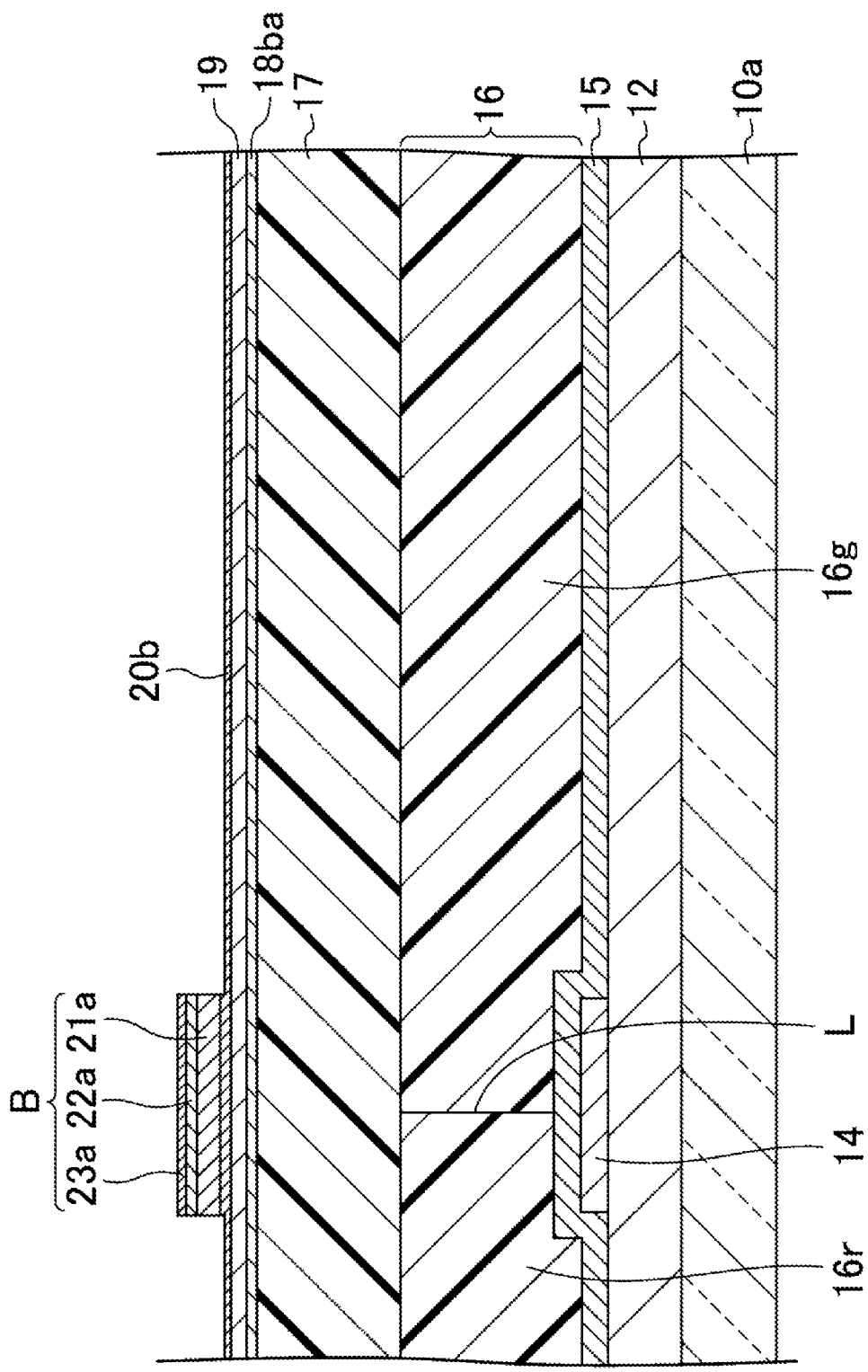
FIG. 43 is a seventh cross-sectional view of the portion corresponding to the portion illustrated in FIG. 31, subsequent to FIG. 42, illustrating part of the manufacturing process of the active matrix substrate that is a component of the liquid crystal display device according to the second embodiment of the disclosure.

Thereafter, as illustrated in FIG. 40, resists Rc are formed on the surface of the substrate on which the first metal film 21, the inorganic insulating film 22, and the second metal film 23 are formed by photolithography, and as illustrated in FIGS. 41 and 42, the first metal film 21, the inorganic insulating film 22, and the second metal film 23 exposed out of the resists Rc are subjected to dry etching using a fluorine-based gas, and the resists Rc are stripped and cleaned, thereby forming the antireflection layers B in each of which the first metal layer 21a, the inorganic insulating layer 22a, and the second metal layer 23a are layered as illustrated in FIG. 43 (antireflection layer forming step). In the antireflection layer forming step, a surface layer of the second transparent conductive film 20 exposed out of the resists Rc is also etched to form a second transparent conductive film 20b, so that a film thickness of a portion of the second transparent conductive layer 20bb in contact with the first metal layer 21a is larger than a film thickness of a portion of the second transparent conductive layer 20bb not in contact with the first metal layer 21a.

Figure 44:
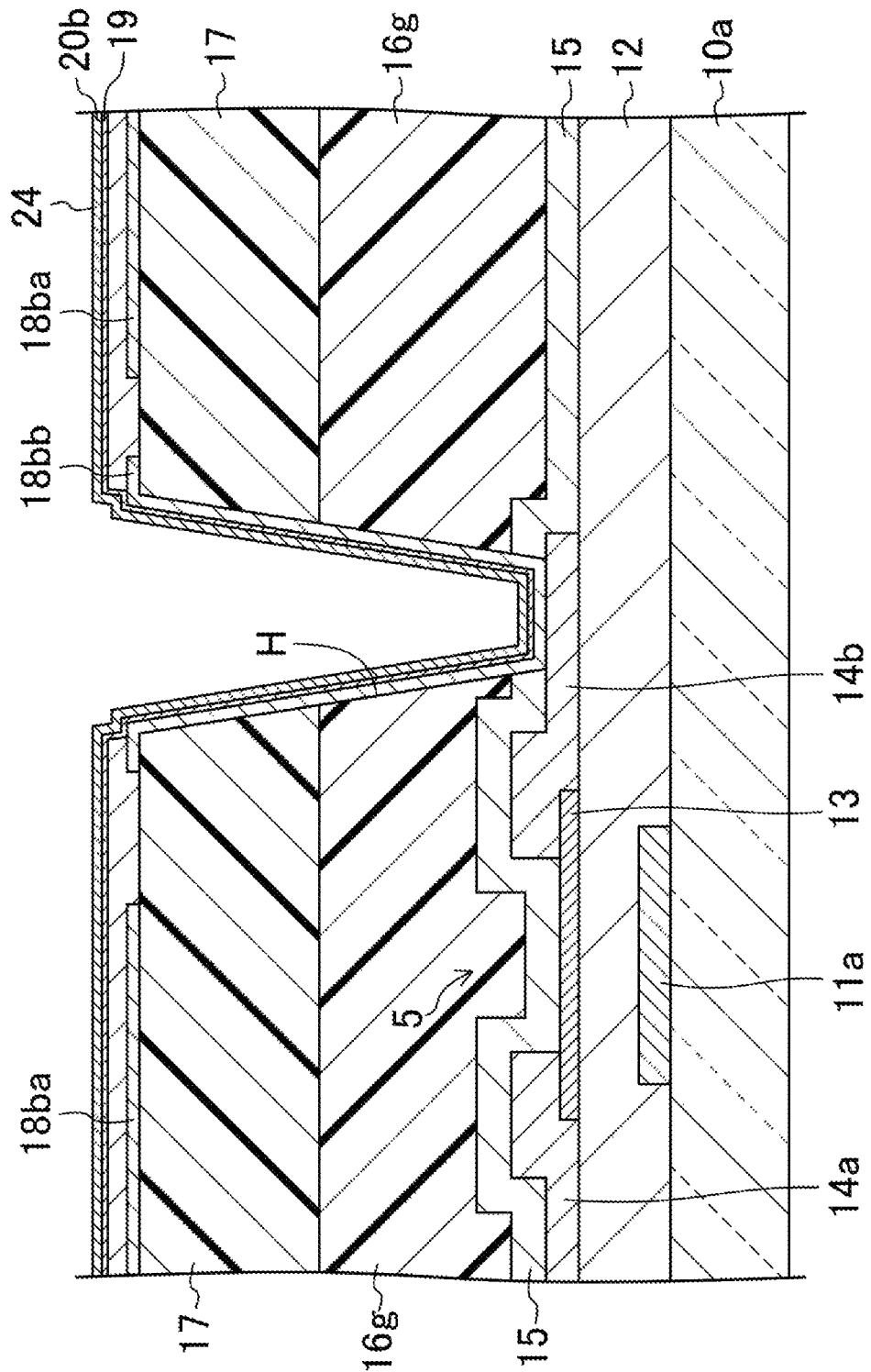
FIG. 44 is a sixth cross-sectional view of the portion corresponding to the portion illustrated in FIG. 30, subsequent to FIG. 41, illustrating part of the manufacturing process of the active matrix substrate that is a component of the liquid crystal display device according to the second embodiment of the disclosure.
Figure 45:
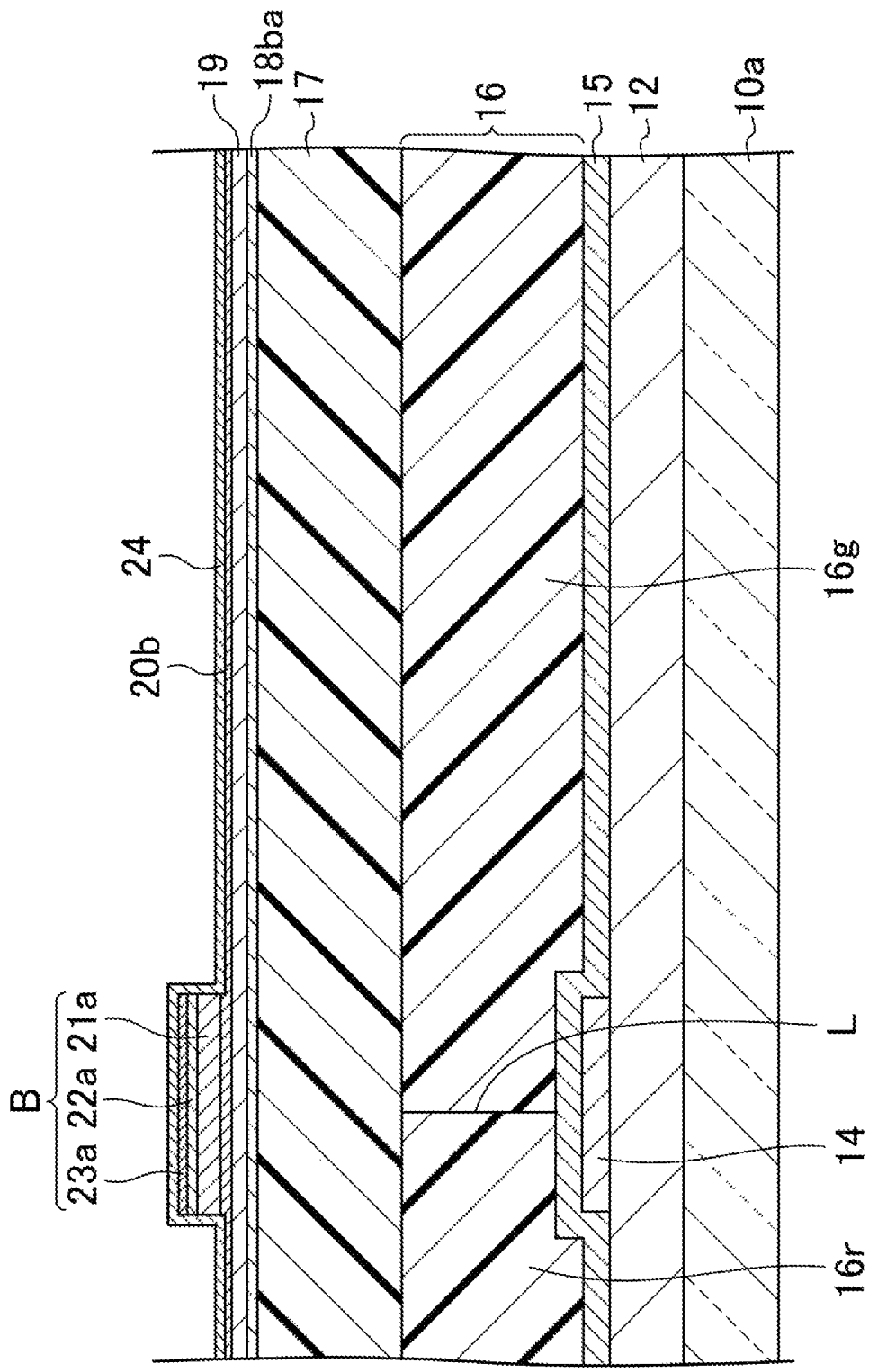
FIG. 45 is an eighth cross-sectional view of the portion corresponding to the portion illustrated in FIG. 31, subsequent to FIG. 43, illustrating part of the manufacturing process of the active matrix substrate that is a component of the liquid crystal display device according to the second embodiment of the disclosure.

Further, as illustrated in FIGS. 44 and 45, a third transparent conductive film 24 (thickness of approximately 60 nm) such as an IZO film is formed on the surface of the substrate on which the antireflection layers B are formed by, for example, sputtering (third transparent conductive film forming step).

Figure 46:
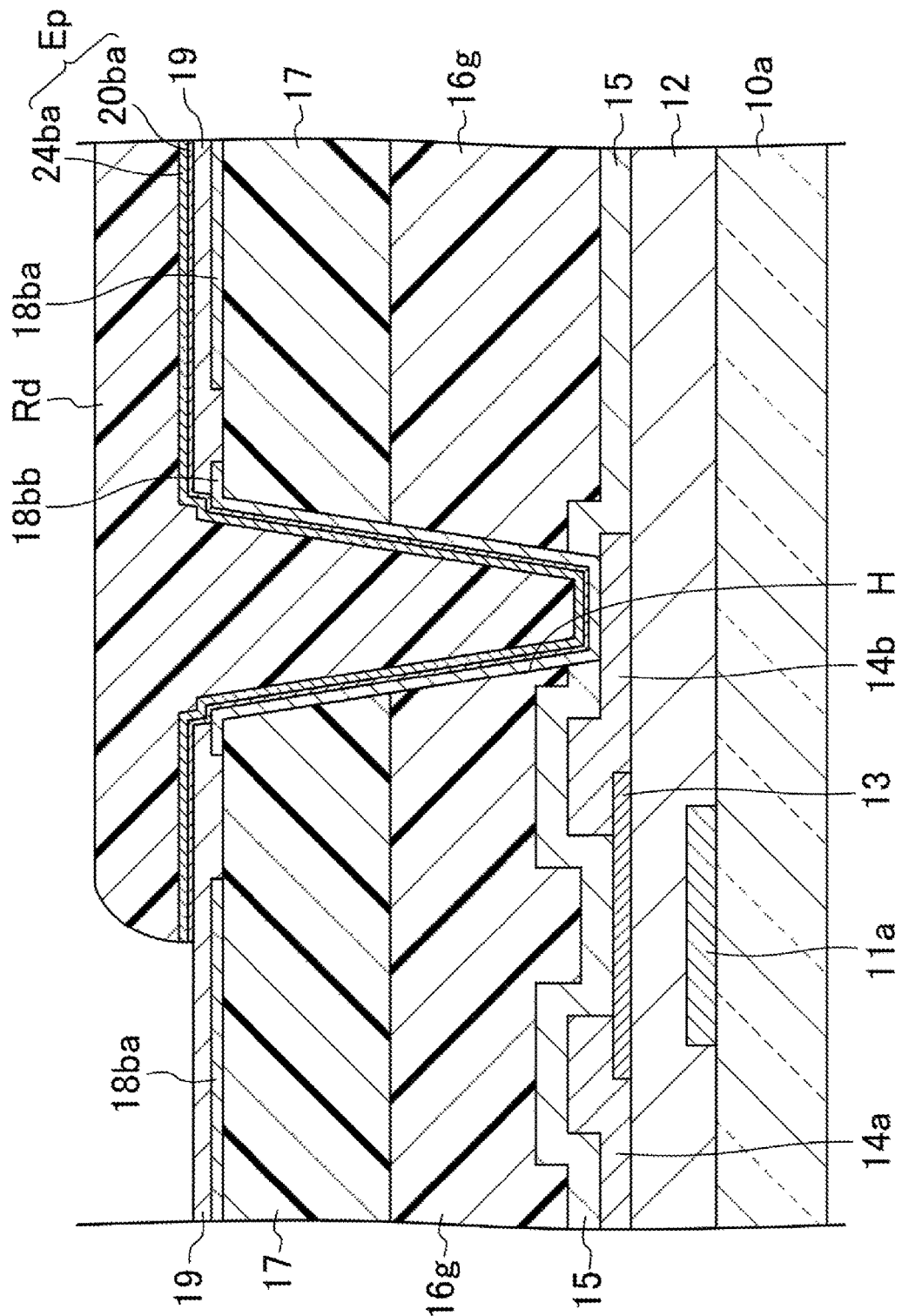
FIG. 46 is a seventh cross-sectional view of the portion corresponding to the portion illustrated in FIG. 30, subsequent to FIG. 44, illustrating part of the manufacturing process of the active matrix substrate that is a component of the liquid crystal display device according to the second embodiment of the disclosure.
Figure 47:
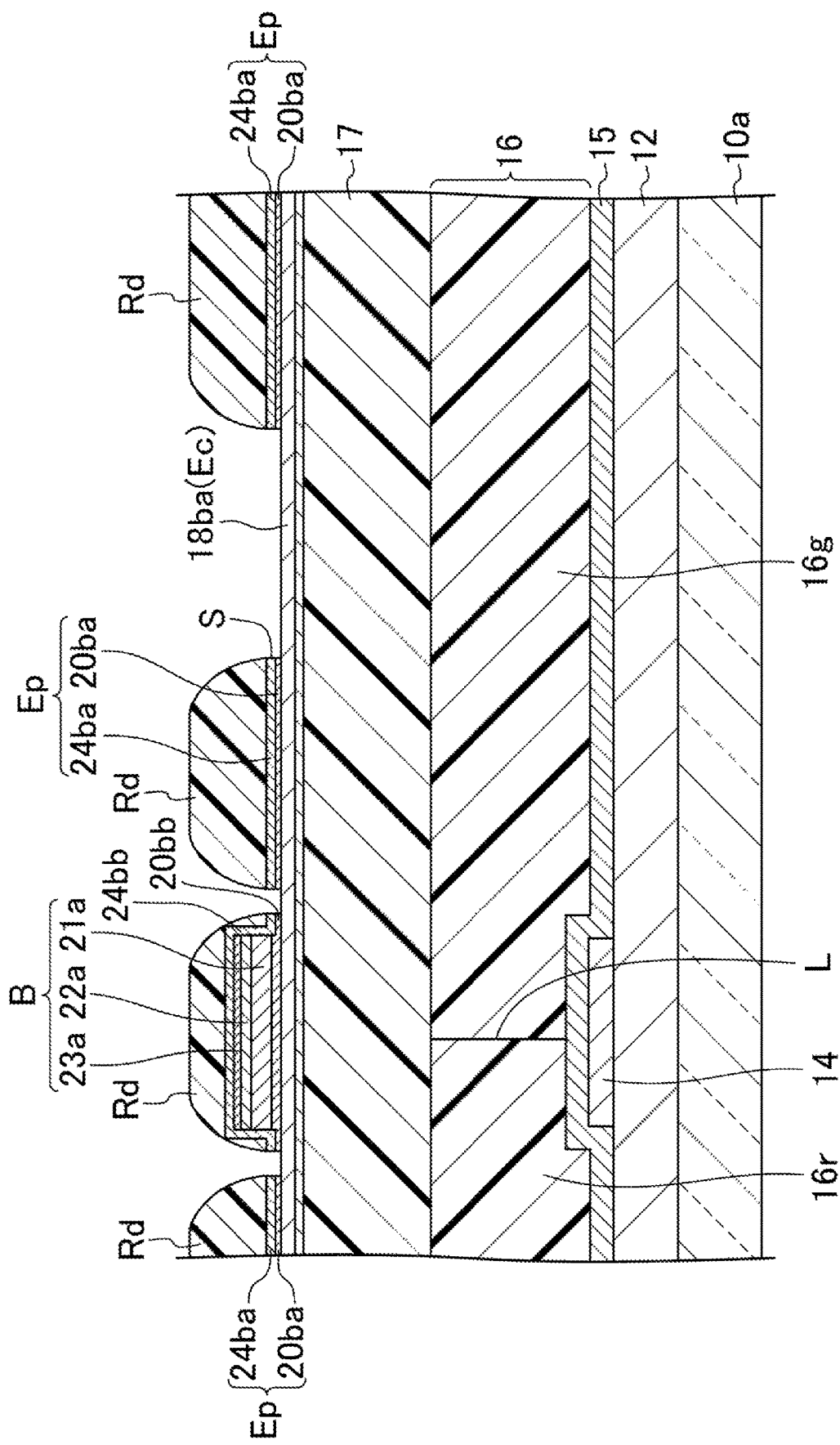
FIG. 47 is a ninth cross-sectional view of the portion corresponding to the portion illustrated in FIG. 31, subsequent to FIG. 45, illustrating part of the manufacturing process of the active matrix substrate that is a component of the liquid crystal display device according to the second embodiment of the disclosure.

Subsequently, resists Rd (see FIGS. 46 and 47) are formed by photolithography on the surface of the substrate on which the third transparent conductive film 24 is formed, and as illustrated in FIGS. 46 and 47, the third transparent conductive film 24 and the second transparent conductive film 20b exposed out of the resists Rd are subjected to wet etching using a mixed solution of phosphoric acid, nitric acid, and acetic acid, thereby forming the pixel electrodes Ep by forming the second transparent electrodes 20ba and the third transparent electrodes 24ba, and forming the second transparent conductive layers 20bb and the third transparent conductive layers 24bb (second transparent electrode forming step).

Thereafter, an acrylic photosensitive resin (thickness of approximately 2.5 μm) is applied to the surface of the substrate on which the second transparent electrodes 20ba and the like are formed by, for example, spin coating or slit coating, and the applied photosensitive resin is partially exposed and then patterned by developing, thereby forming the resin-filled layers 25.

Further, an inorganic insulating film (thickness of approximately 30 nm) such as a silicon nitride film is formed on the surface of the substrate on which the resin-filled layers 25 are formed by, for example, plasma CVD, thereby forming a surface protection film 26.

Finally, a polyimide resin film is applied to the entire substrate on which the surface protection film 26 is formed by, for example, a printing method, and then the resin film is subjected to baking and rubbing treatment, thereby forming the alignment film 27.

As described above, the active matrix substrate 30b can be manufactured. Thereafter, as in the first embodiment, the active matrix substrate 30b and the counter substrate 40 are bonded with a sealing member, and a liquid crystal material is sealed between the active matrix substrate 30b and the counter substrate 40 to form the liquid crystal layer 45, thereby manufacturing the liquid crystal display device according to the present embodiment.

As described above, according to the method of manufacturing the active matrix substrate 30b and the liquid crystal display device of the present embodiment, the second transparent conductive film 20 is formed so as to cover the inorganic protection film 19 on the first transparent electrode 18ba (common electrode Ec) in the second transparent conductive film forming step, the antireflection layers B are formed in each of which the first metal layer 21a, the inorganic insulating layer 22a, and the second metal layer 23a are layered in order on the second transparent conductive film 20 in the antireflection layer forming step, the third transparent conductive film 24 is formed so as to cover the antireflection layers B in the third transparent conductive film forming step, and the pixel electrodes Ep are formed by patterning the second transparent conductive film 20 and the third transparent conductive film 24 to form the second transparent electrodes 20ba and the third transparent electrodes 24ba in the second transparent electrode forming step. In the antireflection layer forming step, when the first metal film 21, the inorganic insulating film 22, and the second metal film 23 formed in order are patterned by dry etching to form the first metal layers 21a, the inorganic insulating layers 22a, and the second metal layers 23a, the surface layer of the second transparent conductive film 20 exposed out of the resists Rc is etched, but the inorganic protection film 19 under the second transparent conductive film 20 (second transparent conductive film 20b) is not easily etched. In the second transparent electrode forming step, the second transparent conductive film 20b (having the surface layer etched) and the third transparent conductive film 24 are patterned by wet etching to form the second transparent electrodes 20ba and the third transparent electrodes 24ba. Thus, etching of the inorganic protection film 19 exposed out of the second transparent electrodes 20ba is suppressed. Therefore, etching of the inorganic protection film 19 exposed out of the second transparent electrodes 20ba when forming the antireflection layers B by dry etching can be suppressed. As a result, steps are less likely to be formed in the inorganic protection film 19 at the edges of the second transparent electrodes 20ba, thereby suppressing the occurrence of light leakage due to alignment disorder of the liquid crystal layer 45.

Third Embodiment

Figure 48:
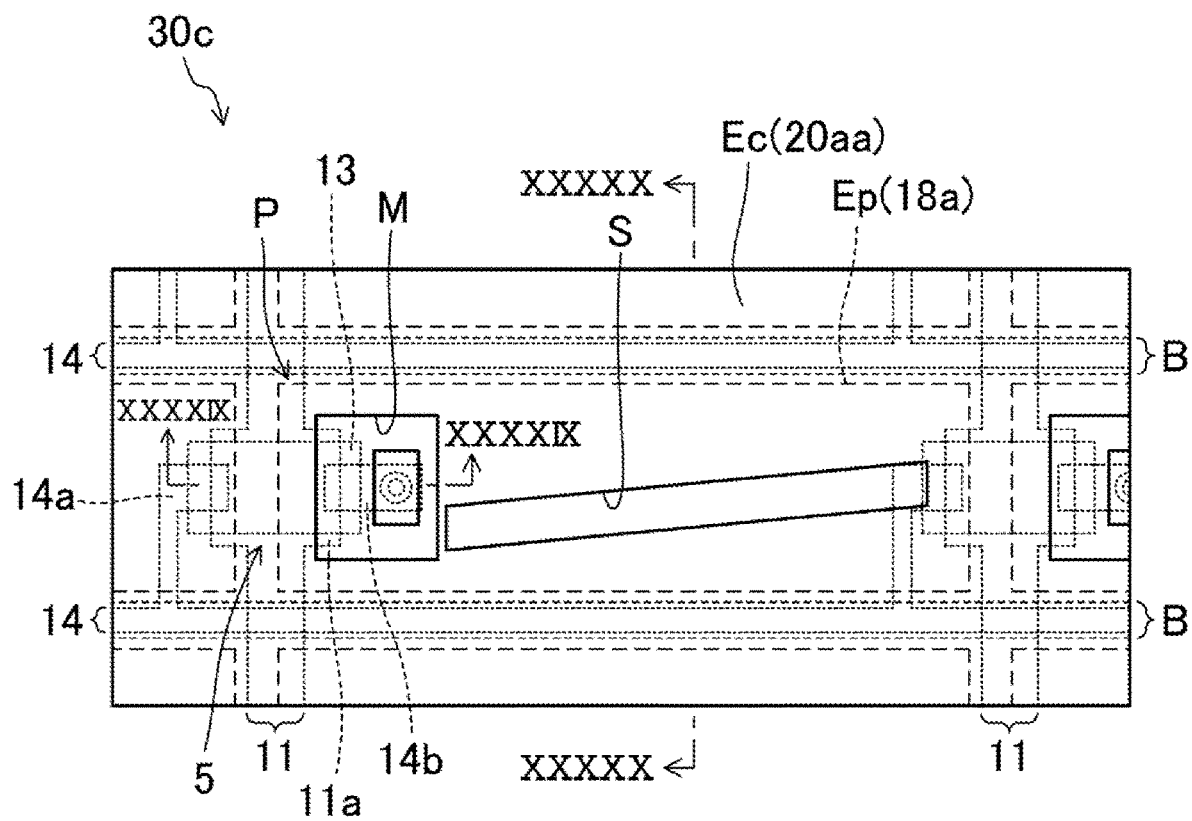
FIG. 48 is a plan view of an active matrix substrate that is a component of a liquid crystal display device according to a third embodiment of the disclosure.
Figure 49:
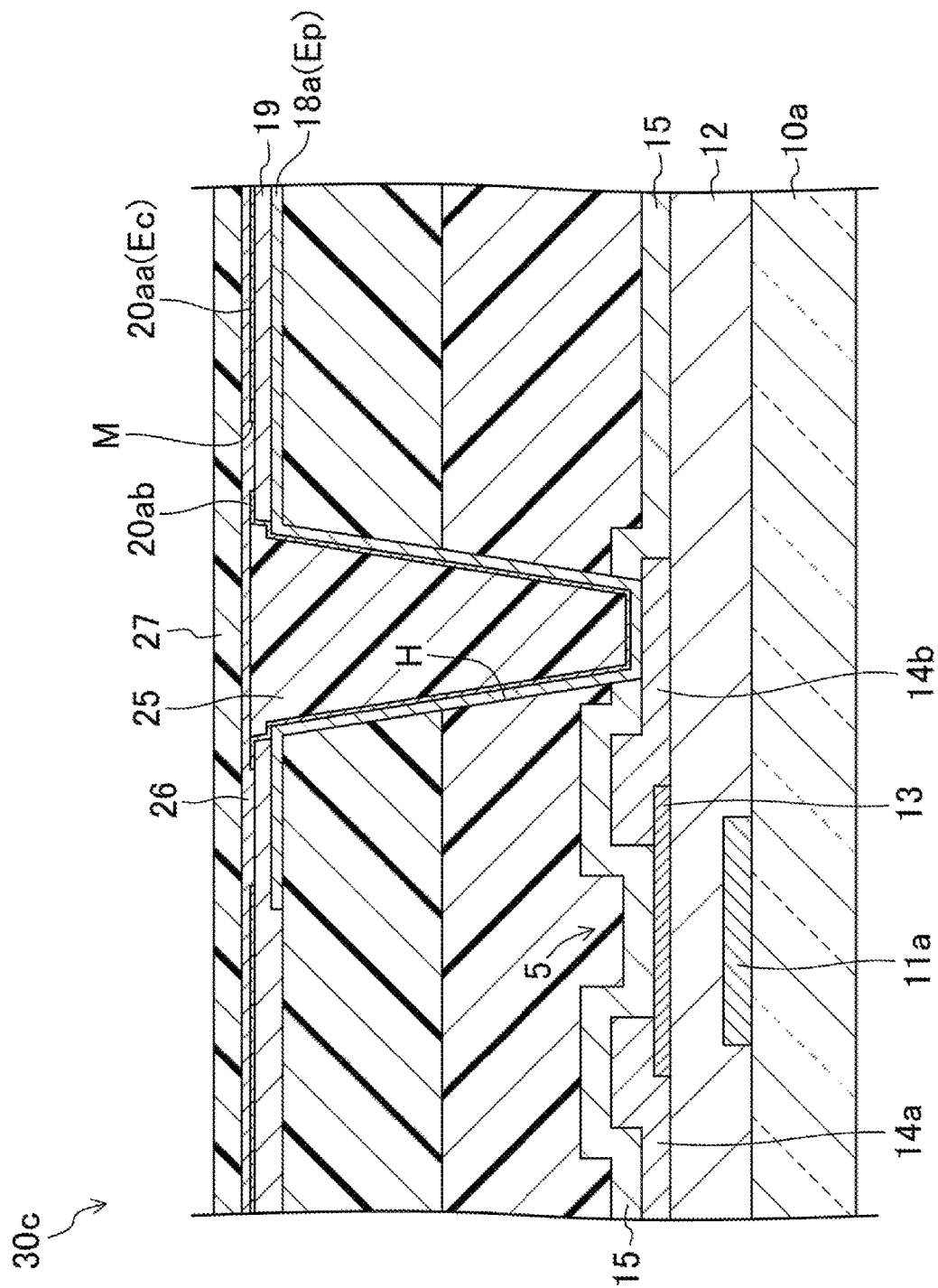
FIG. 49 is a cross-sectional view of the active matrix substrate taken along line XXXXIX-XXXXIX in FIG. 48.
Figure 50:
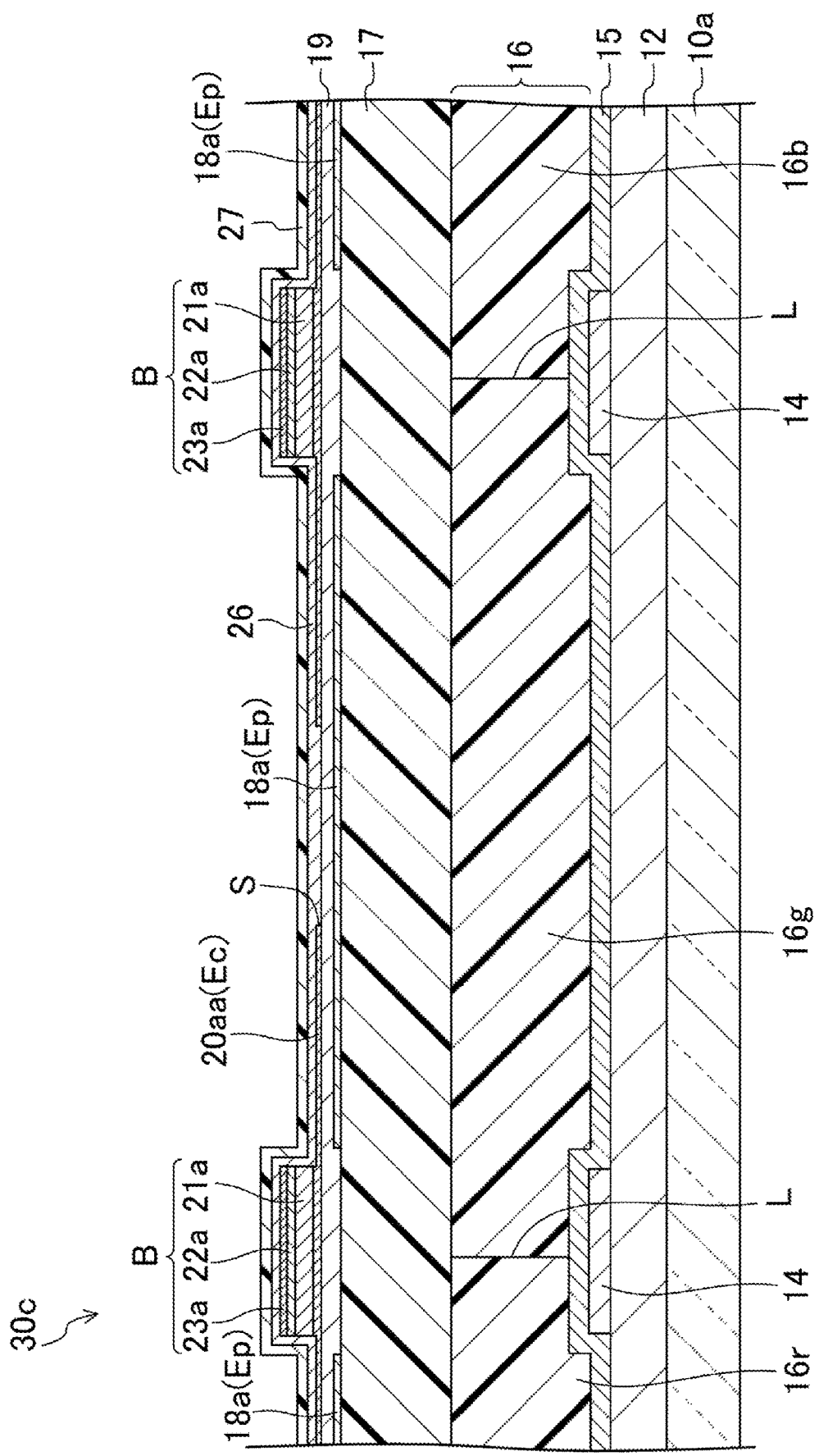
FIG. 50 is a cross-sectional view of the active matrix substrate taken along line XXXXX-XXXXX in FIG. 48.

FIGS. 48 to 50 illustrate a method of manufacturing an active matrix substrate and a liquid crystal display device according to a third embodiment of the disclosure. FIG. 48 is a plan view of an active matrix substrate 30c that is a component of the liquid crystal display device according to the present embodiment. FIGS. 49 and 50 are cross-sectional views of the active matrix substrate 30c taken along line XXXXIX-XXXXIX and line XXXXX-XXXXX in FIG. 48.

In the first embodiment, the liquid crystal display device 50 including the active matrix substrate 30a in which the common electrode Ec has a double layer structure is exemplified. In the present embodiment, the liquid crystal display device including the active matrix substrate 30c in which the common electrode Ec has a single layer structure is exemplified.

The liquid crystal display device according to the present embodiment includes the active matrix substrate 30c having a COA structure, a counter substrate 40 (see FIG. 3) provided so as to face the active matrix substrate 30c, and a liquid crystal layer 45 (see FIG. 3) provided between the active matrix substrate 30c and the counter substrate 40. In the liquid crystal display device according to the present embodiment, multiple subpixels P are arranged in a matrix in a display region D, as in the liquid crystal display device 50 according to the first embodiment. In the display region D, as in the liquid crystal display device 50 according to the first embodiment, subpixels P having red layers 16r, subpixels P having green layers 16g, and subpixels P having blue layers 16b are provided so as to be adjacent to one another.

As illustrated in FIG. 49, the active matrix substrate 30c includes a base substrate 10a such as a glass substrate, multiple TFTs 5 provided on the base substrate 10a correspond to the multiple subpixels P, color filters 16 provided on the TFTs 5, respectively, an organic protection film 17 provided on the color filters 16, multiple pixel electrodes Ep provided on the organic protection film 17, an inorganic protection film 19 provided on the pixel electrodes Ep, a common electrode Ec provided on the inorganic protection film 19, a surface protection film 26 provided on the common electrode Ec, and an alignment film 27 provided on the surface protection film 26. As illustrated in FIG. 48, the active matrix substrate 30c includes, on the base substrate 10a in the display region D, multiple gate lines 11 extending parallel to each other in the Y direction in the figure, and multiple source lines 14 extending parallel to each other in the X direction in the figure so as to intersect the gate lines 11 with the gate insulating film 12 interposed therebetween.

As illustrated in FIGS. 48 to 50, the pixel electrode Ep is configured by a first transparent electrode 18a provided in a rectangular shape on the organic protection film 17. As illustrated in FIG. 48, one pixel electrode Ep is provided for each subpixel P. The pixel electrode Ep constitutes an auxiliary capacity of each subpixel P together with the common electrode Ec and the inorganic protection film 19 provided between the pixel electrode Ep and the common electrode Ec.

As illustrated in FIGS. 48 to 50, the common electrode Ec is constituted by a second transparent electrode 20aa provided on the inorganic protection film 19. The common electrode Ec is provided in common to the multiple subpixels P. As illustrated in FIGS. 48 and 50, the common electrode Ec is provided with slits S for aligning the liquid crystal layer 45. As illustrated in FIGS. 48 and 49, openings M are formed in the common electrode Ec so as to overlap contact holes H. As illustrated in FIG. 49, inside the opening M of the common electrode Ec, a pixel electrode protection layer 20ab formed in the same layer with the same material as the second transparent electrode 20aa is provided apart from the common electrode Ec so as to overlap a bottom face and a side surface of the contact hole H. As illustrated in FIG. 49, a resin-filled layer 25 is provided between a concave portion of the pixel electrode protection layer 20ab and the surface protection film 26. As illustrated in FIG. 50, an antireflection layer B is provided on the second transparent electrode 20aa so as to overlap a boundary portion L between any two of the red layer 16r, the green layer 16g, and the blue layer 16b. As illustrated in FIG. 50, the second transparent electrode 20aa is provided so as to be in contact with a first metal layer 21a. In the second transparent electrode 20aa, a film thickness of a portion in contact with the first metal layer 21a (e.g., approximately 70 nm) is larger than a film thickness of a portion not in contact with the first metal layer 21a (e.g., approximately 50 nm).

In the liquid crystal display device of the present embodiment, as in the liquid crystal display device 50 of the first embodiment, a predetermined voltage is applied to the liquid crystal layer 45 disposed between each pixel electrode Ep and the common electrode Ec and to the auxiliary capacity, and the alignment state of the liquid crystal layer 45 is changed by an electrical field generated in a direction along the surface of the substrate, that is, in a transverse direction, thereby adjusting the transmittance of light passing through the panel of each subpixel P to display images.

Next, a method of manufacturing the liquid crystal display device of the present embodiment will be described, focusing on a method of manufacturing the active matrix substrate 30c. In the method of manufacturing the active matrix substrate 30a of the first embodiment, the active matrix substrate 30c can be manufactured by omitting the third transparent conductive film forming step after the antireflection layer forming step, and forming the common electrode Ec by forming the second transparent electrode 20aa and the pixel electrode protection layer 20ab by wet etching the second transparent conductive film 20 exposed out of resists Ra using a mixed solution of phosphoric acid, nitric acid, and acetic acid in the second transparent electrode forming step. In the present embodiment, in the antireflection layer forming step, the etching rate for a first metal film 21, an inorganic insulating film 22, and a second metal film 23 exposed out of the resists Ra is slowed down compared to the etching rate in the method of manufacturing the active matrix substrate 30a of the first embodiment by adjusting the gas flow rate, discharge power, and the like when dry etching using a fluorine-based gas. Thereafter, as in the first embodiment, the active matrix substrate 30c and the counter substrate 40 are bonded with a sealing member, and a liquid crystal material is sealed between the active matrix substrate 30c and the counter substrate 40 to form the liquid crystal layer 45, thereby manufacturing the liquid crystal display device according to the present embodiment.

As described above, according to the method of manufacturing the active matrix substrate 30c and the liquid crystal display device of the present embodiment, the second transparent conductive film 20 is formed so as to cover the inorganic protection film 19 on the first transparent electrodes 18a (pixel electrodes Ep) in the second transparent conductive film forming step, the antireflection layers B are formed in each of which the first metal layer 21a, an inorganic insulating layer 22a, and a second metal layer 23a are layered in order on the second transparent conductive film 20 in the antireflection layer forming step, and the common electrode Ec is formed by patterning the second transparent conductive film 20 to form the second transparent electrode 20aa in the second transparent electrode forming step. In the antireflection layer forming step, when the first metal film 21, the inorganic insulating film 22, and the second metal film 23 formed in order are patterned by dry etching to form the first metal layers 21a, the inorganic insulating layers 22a, and the second metal layers 23a, the surface layer of the second transparent conductive film 20 exposed out of the resists Ra is etched, but the inorganic protection film 19 under the second transparent conductive film 20 (second transparent conductive film 20a) is not easily etched. In the second transparent electrode forming step, the second transparent conductive film 20a (having the surface layer etched) is patterned by wet etching to form the second transparent electrode 20aa. Thus, etching of the inorganic protection film 19 exposed out of the second transparent electrode 20aa is suppressed. Therefore, etching of the inorganic protection film 19 exposed out of the second transparent electrode 20aa when forming the antireflection layers B by dry etching can be suppressed. As a result, steps are less likely to be formed in the inorganic protection film 19 at the edges of the second transparent electrode 20aa, thereby suppressing the occurrence of light leakage due to alignment disorder of the liquid crystal layer 45.

Other Embodiments

In each of the embodiments described above, the liquid crystal display device including the active matrix substrate with the TFTs whose drain electrodes are connected to the pixel electrodes is exemplified. The disclosure is also applicable to a liquid crystal display device including an active matrix substrate with the TFTs whose source electrodes are connected to the pixel electrodes.

INDUSTRIAL APPLICABILITY

As described above, the disclosure is useful for a liquid crystal display device with a transverse electrical field driving method and a method of manufacturing an active matrix substrate that is a component of the liquid crystal display device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of manufacturing an active matrix substrate, the method comprising:
    forming a plurality of thin film transistors corresponding to a plurality of subpixels on a base substrate;
    forming color filters provided with colored layers having predetermined colors disposed on the plurality of thin film transistors opposite the base substrate, respectively, the color filters having contact holes for electrical connection to the plurality of thin film transistors, respectively;
    forming a first transparent electrode by forming a first transparent conductive film above the color filters opposite the base substrate and patterning the first transparent conductive film;
    forming an inorganic protection film made of an inorganic insulating film on the first transparent electrodes opposite the base substrate;
    forming a second transparent conductive film on the inorganic protection film opposite the base substrate;
    forming antireflection layers on the second transparent conductive film opposite the base substrate, each of the antireflection layers formed by layering a metal layer and an inorganic insulating layer, and overlapping a boundary portion between the colored layers; and
    forming a second transparent electrode by patterning the second transparent conductive film,
    wherein in forming the second transparent electrode, the second transparent electrode is provided between the inorganic protection film and the antireflection layers.

2. The method according to claim 1, further comprising:
    forming a third transparent conductive film that covers the antireflection layers between the forming of the antireflection layers and the forming of the second transparent electrode,
    wherein, in the forming of the second transparent electrode, the second transparent electrode and a third transparent electrode are formed by patterning the second transparent conductive film and the third transparent conductive film.

3. The method according to claim 1,
    wherein in the forming of the color filters, an organic protection film made of an organic insulating film having the contact holes is formed on the color filters opposite the base substrate.

4. The method according to claim 1,
    wherein the first transparent electrode serves as pixel electrodes provided corresponding to the plurality of subpixels, respectively, and the first transparent electrode is electrically connected to the plurality of thin film transistors, respectively, via the contact holes, and
    the second transparent electrode serves as a common electrode provided in common to the multiple plurality of subpixels and the second transparent electrode is formed with slits.

5. The method according to claim 2,
    wherein the first transparent electrode serves as pixel electrodes provided corresponding to the plurality of subpixels, respectively, and the first transparent electrode is electrically connected to the plurality of thin film transistors, respectively, via the contact holes, and
    the second transparent electrode and the third transparent electrode form a common electrode provided in common to the plurality of subpixels and the second transparent electrode and the third transparent electrode are formed with slits.

6. The method according to claim 2,
    wherein the first transparent electrode serves as a common electrode provided in common to the plurality of subpixels, and
    the second transparent electrode and the third transparent electrode form pixel electrodes provided corresponding to the plurality of subpixels, respectively, and the second transparent electrode and the third transparent electrode are electrically connected to the plurality of thin film transistors, respectively, via the contact holes, and the second transparent electrode and the third transparent electrode are formed with slits.

7. A liquid crystal display device comprising:
    an active matrix substrate provided with a plurality of thin film transistors corresponding to a plurality of subpixels;
    a counter substrate facing the active matrix substrate; and
    a liquid crystal layer provided between the active matrix substrate and the counter substrate,
    wherein the active matrix substrate includes:
        color filters with colored layers having predetermined colors disposed on the plurality of thin film transistors, respectively,
        antireflection layers overlapping boundary portions of the colored layers, each of the antireflection layers including a metal layer and an inorganic insulating layer layered,
        a first transparent electrode, a second transparent electrode, and a third transparent electrode provided above the color filters in a stated order in which the first transparent electrode, the second transparent electrode, and the third transparent electrode are increasingly separated from the color filters, and an inorganic protection film made of an inorganic insulating film provided between the first transparent electrode and the second transparent electrode, the antireflection layers are provided on the second transparent electrode, the third transparent electrode is in contact with the second transparent electrode at least in the plurality of subpixels, and the second transparent electrode is provided between the inorganic protection film and the antireflection layers.

8. The liquid crystal display device according to claim 7, wherein the third transparent electrode covers the antireflection layers.

9. The liquid crystal display device according to claim 7, wherein the second transparent electrode, the antireflection layers, and the third transparent electrode are layered in a stated order in which the second transparent electrode, the antireflection layers, and the third transparent electrode are increasingly separated from the color filters.

10. The liquid crystal display device according to claim 7, wherein each of the antireflection layers further includes a first metal layer and a second metal layer provided in an order as the metal layer, and the inorganic insulating layer is provided between the first metal layer and the second metal layer, the second transparent electrode is in contact with the first metal layer, and the third transparent electrode is in contact with the second metal layer.

11. The liquid crystal display device according to claim 10, wherein in the second transparent electrode, a film thickness of a portion in contact with the first metal layer is larger than a film thickness of a portion not in contact with the first metal layer.

12. The liquid crystal display device according to claim 7, wherein the second transparent electrode and the third transparent electrode have the same shape in a plan view.

13. The liquid crystal display device according to claim 7, wherein the first transparent electrode serves as pixel electrodes provided corresponding to the multiple subpixels, respectively, and the first transparent electrodes is electrically connected to the multiple thin film transistors, respectively, and the second transparent electrode and the third transparent electrode form a common electrode provided in common to the multiple subpixels and the second transparent electrode and the third transparent electrode are formed with slits.

* * * * *